April 22, 1941. L. M. POTTS Re. 21,778

TRANSMISSION SYSTEM

Original Filed Sept. 17, 1925 11 Sheets-Sheet 1

Inventor:
Louis M. Potts
by J. W. Schmied Atty

April 22, 1941. L. M. POTTS Re. 21,778

TRANSMISSION SYSTEM

Original Filed Sept. 17, 1925 11 Sheets-Sheet 2

Inventor:
Louis M. Potts
by J. W. Schmied Att'y

TRANSMISSION SYSTEM

Original Filed Sept. 17, 1925 11 Sheets-Sheet 3

Inventor:
Louis M. Potts
by J. W. Schmied Atty.

April 22, 1941. L. M. POTTS Re. 21,778

TRANSMISSION SYSTEM

Original Filed Sept. 17, 1925 11 Sheets-Sheet 4

Inventor:
Louis M. Potts
by J. W. Schmied Att'y.

April 22, 1941. L. M. POTTS Re. 21,778

TRANSMISSION SYSTEM

Original Filed Sept. 17, 1925 11 Sheets-Sheet 5

Inventor:
Louis M. Potts
by J. W. Schmied Att'y.

April 22, 1941. L. M. POTTS Re. 21,778

TRANSMISSION SYSTEM

Original Filed Sept. 17, 1925 11 Sheets-Sheet 6

Inventor:
Louis M. Potts
by J. W. Schmied Att'y.

TRANSMISSION SYSTEM
Original Filed Sept. 17, 1925 11 Sheets-Sheet 7
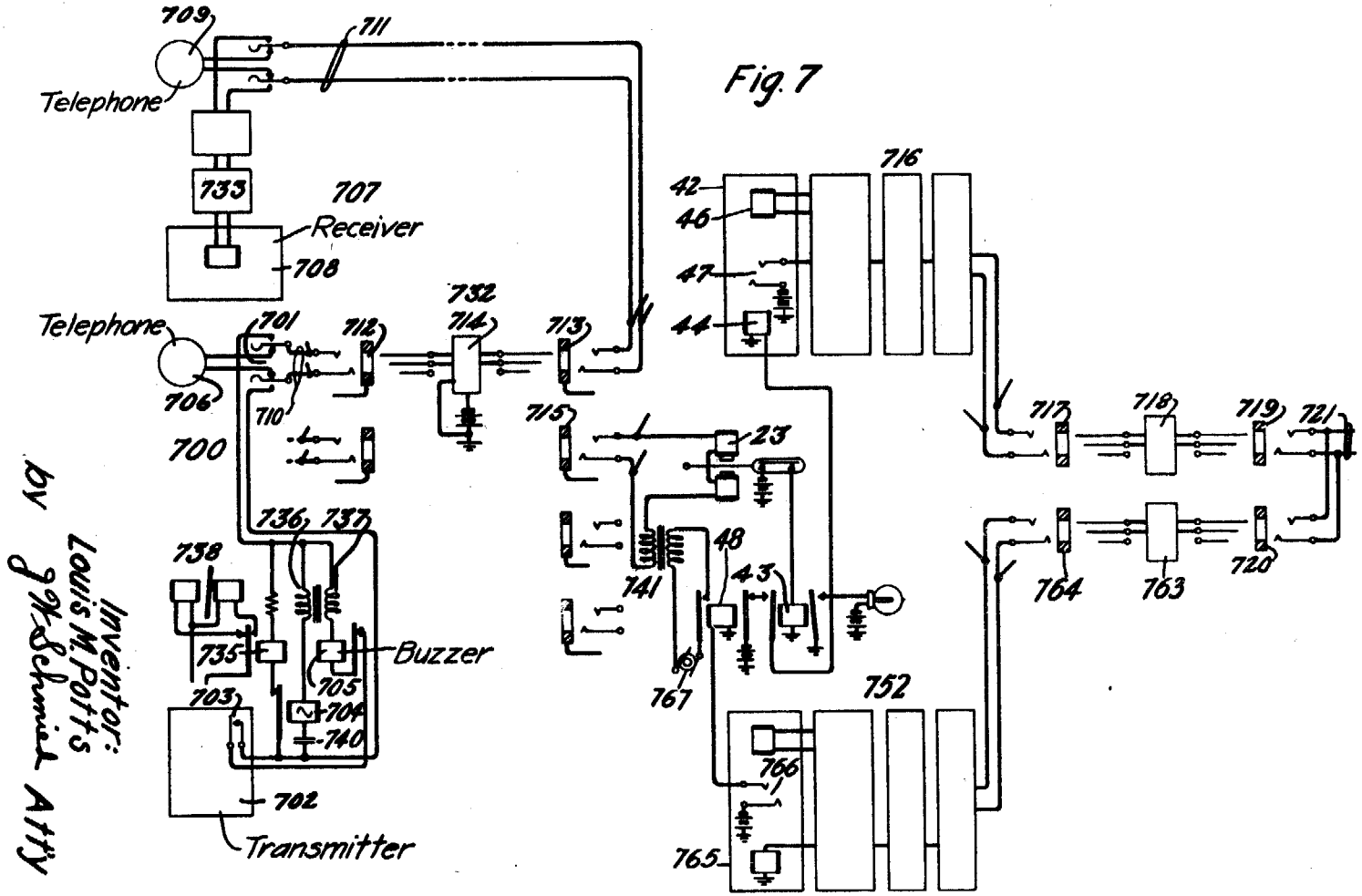
Inventor:
Louis M. Potts
by J. W. Schmied Atty

TRANSMISSION SYSTEM

Original Filed Sept. 17, 1925 11 Sheets-Sheet 8

Inventor:
Louis M. Potts
by J. W. Schmied Atty

April 22, 1941. L. M. POTTS Re. 21,778
TRANSMISSION SYSTEM
Original Filed Sept. 17, 1925 11 Sheets-Sheet 9
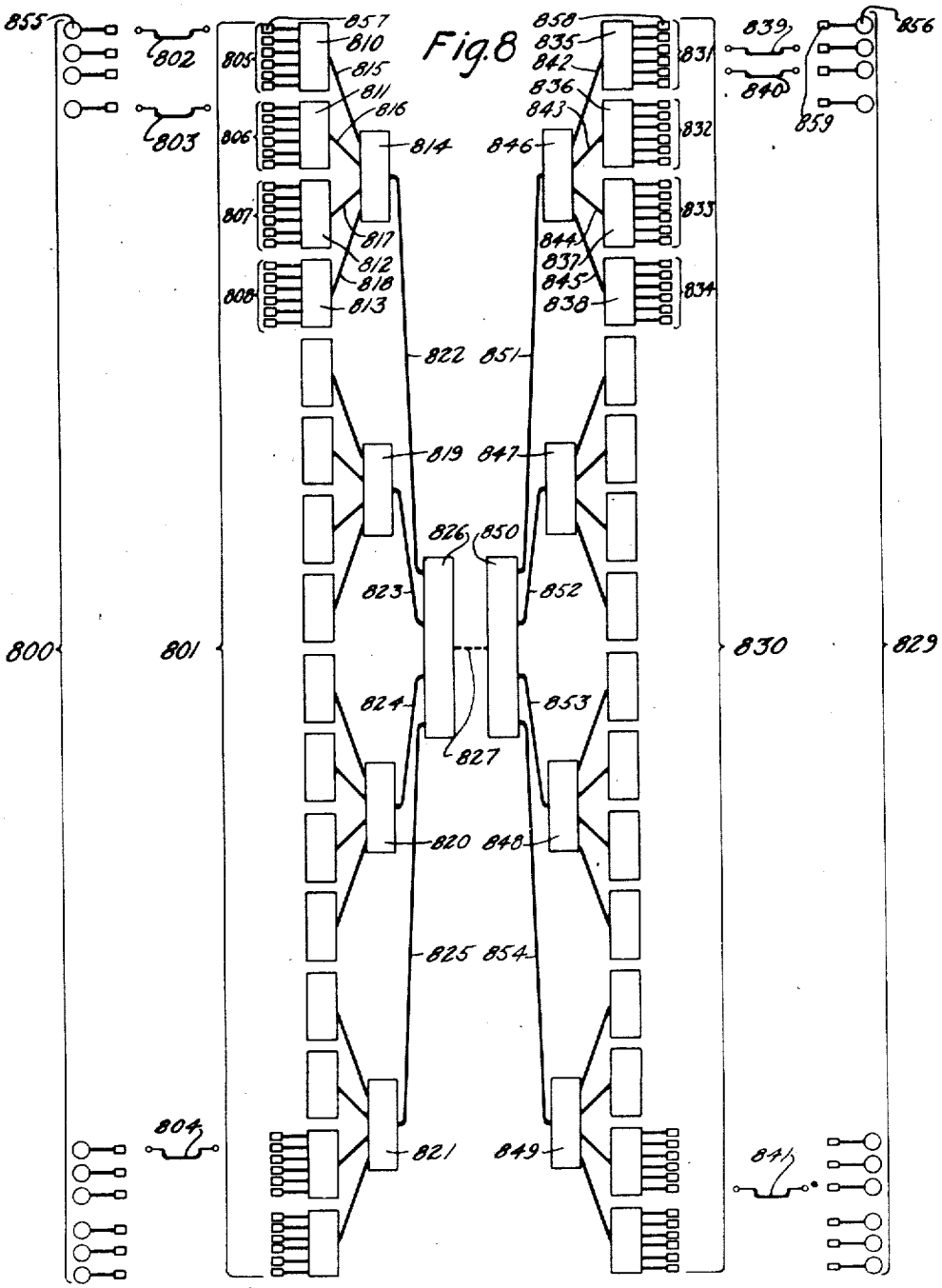
Inventor:
Louis M. Potts
by J. W. Schmied Atty.

April 22, 1941. L. M. POTTS Re. 21,778
TRANSMISSION SYSTEM
Original Filed Sept. 17, 1925 11 Sheets-Sheet 10
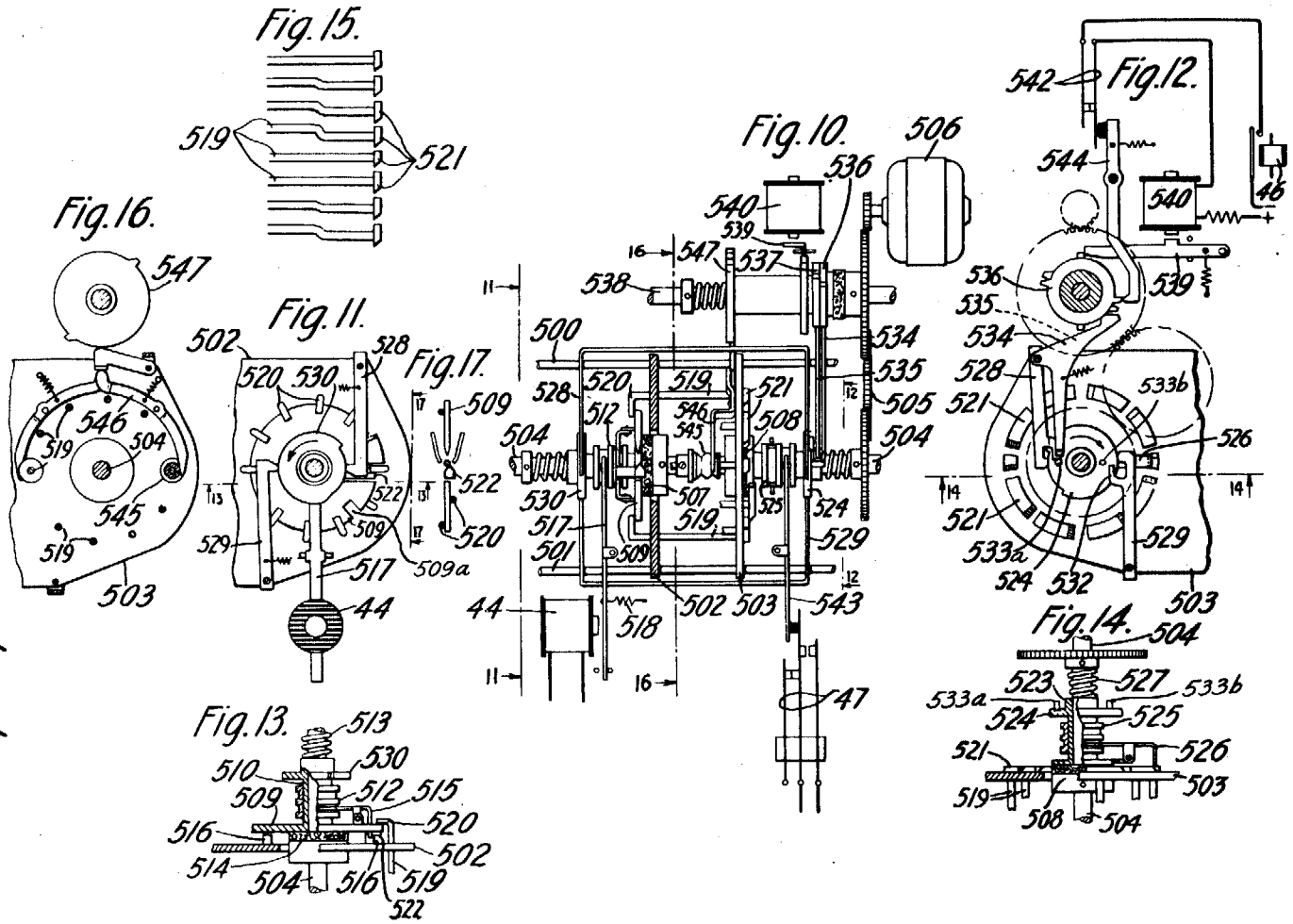
Inventor:
Louis M. Potts
by J. W. Schmied Atty.

April 22, 1941. L. M. FOTTS Re. 21,778
TRANSMISSION SYSTEM
Original Filed Sept. 17, 1925 11 Sheets-Sheet 11
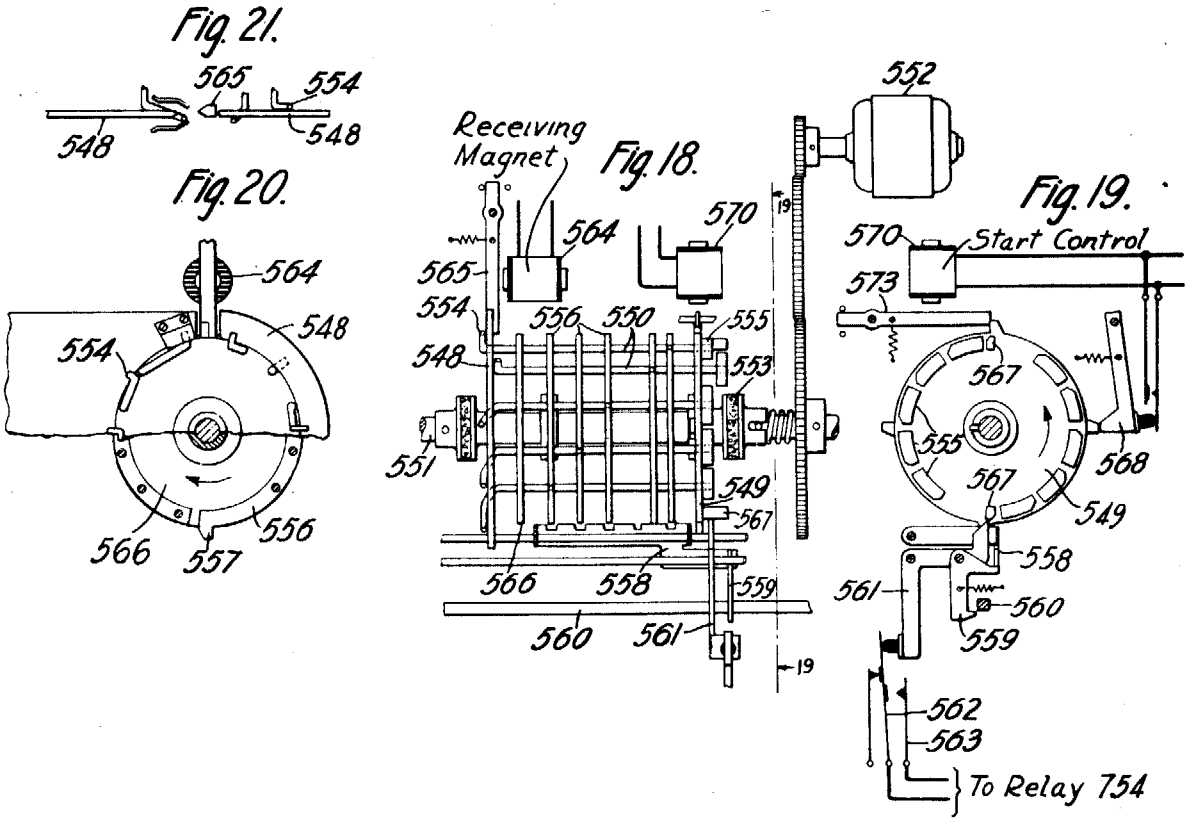
Inventor:
Louis M. Potts
by J. W. Schmied Atty.

Reissued Apr. 22, 1941

Re. 21,778

UNITED STATES PATENT OFFICE 21,778

TRANSMISSION SYSTEM

Louis M. Potts, Evanston, Ill., assignor to Western Electric Company, Incorporated, New York, N. Y., a corporation of New York Original No. 1,708,954, dated April 16, 1929, Serial No. 56,855, September 17, 1925. Application for reissue April 10, 1931, Serial No. 529,268

167 Claims. (Cl. 178—2)

This invention relates to systems for the transmission of intelligence, and more particularly to systems in which transmission is effected by varying or modifying the flow of electric currents.

It is an object of the invention to improve systems of this general character by increasing the speed of transmission, and by increasing the efficiency and serviceability thereof.

Another object of the invention is to enable a comparatively large number of channels of telegraph transmission over the same electrical transmission circuit.

A feature of the invention relates to the provision of means whereby the ordinary equipment employed in telephone exchange systems may be employed for the transmission of a large number of telegraph messages.

Another feature relates to a system in which a comparatively large number of outlying telegraph subscribers are enabled to transmit messages through the use of currents of relatively low frequency of intelligence variation over telephone lines to a central office where said currents are translated by successively increasing frequencies into a single current of relatively high frequency of intelligence variation, which is then transmitted over a telephone circuit to a distant central office where it is retranslated and separated into the several messages which it represents.

Another feature relates to a telegraph distributing mechanism which is capable of receiving a plurality of simultaneous messages each represented by code impulses of a low frequency, combining these into a number of groups each represented by currents of a higher frequency, repeating the combining operation and with each repetition decreasing the number of groups and increasing the frequency until all channels in which the individual messages originate are combined and represented by a single current of high frequency for transmission over the line.

Another feature relates to a distributing mechanism arranged to receive a large number of messages represented by code combinations of current which may be transmitted promiscuously with respect to each other and to distribute to a single line in a definite order, which may be determined by the grouping of the channels in which said messages originate, current impulses representing all of the original messages.

Another feature of the invention relates to a distributing mechanism which is capable of receiving from a single line a succession of current impulses sent at a high rate and representing a large number of messages originally translated into a given code, and to distribute to a plurality of channels or subscribers' lines at a relatively low rate of transmission the various impulses representing the messages intended for each of the successive lines.

Another feature of the invention relates to an arrangement whereby a plurality of telegraph messages are combined and represented by a single current of high frequency which serves to modulate a carrier current, together with means for transmitting over a single carrier telephone channel currents having frequencies within a desired band which are demodulated at the receiving end to give a current representing the transmitted messages, which is in turn separated by a distributor into the various messages which are thereupon distributed to the proper lines.

A feature of the original invention not claimed herein is a relay arrangement responsive to impulses of one frequency received over a circuit to deliver to another circuit impulses of another frequency, this being claimed in Patent 1,882,892, granted October 18, 1932.

A still further feature relates to a telegraph distributor for use in a system of this character comprising an arrangement of thermionic relays.

Other features relate to various subcombinations of and features of the apparatus and circuits disclosed for carrying the foregoing objects into effect such as a mechanical signal storing pulse lengthening and signal regenerating device; a start-stop mechanism controlled by the thermionic relay distributor; features of the system by which code impulses from the multiplicity of start-stop lines are relayed over a multiplex line on a time-division basis; features of the system by which the messages derived from the multiplex line at the receiving end are separated and relayed at the receiving end and each provided at the relaying point with start and stop pulses for each code combination; features of the cord circuits for connecting the subscribers' or outlying station lines to the main transmission channel features of the subscriber arrangement; and features of the thermionic relay distributor.

Referring to the drawings, Figs. 1 to 6 when taken in order disclose the equipment pertaining to six originating lines, the outgoing distributor at a central office, an interoffice telephone transmission line, the incoming distributor located at a distant central office, and six receiving lines; only one originating line has its equipment shown completely.

Fig. 1 shows schematically a start-stop storing translator pertaining to a single incoming line at the central office which is arranged with six similar start-stop translators to feed code impulses to the relay distributor shown. At the right of Fig. 1 is shown another portion of the central office distributor comprised of sets of polarized relays.

Fig. 2 at the right shows a further portion of the central office distributor consisting of a group of thermionic relays. At the left of Fig. 2 is shown a frequency changer consisting of thermionic relays.

Fig. 3 shows a telephone trunk interconnecting two central offices and arranged for the transmission of currents of ordinary telephone frequency and also of carrier frequencies.

Fig. 4 shows the incoming end of the line at the distant central office. At the left of Fig. 4 is shown a synchronizing circuit consisting of thermionic devices. At the right of this figure is shown a thermionic relay distributor.

Fig. 5 at the left shows a a frequency changer made up of thermionic devices. At the right this figure shows another portion of the distributor consisting of polarized relays.

Fig. 6 illustrates a portion of the central office distributor consisting of ordinary relays and arranged to serve six outgoing telegraph subscribers' lines.

Figs. 7 and 7[a] comprise a diagram showing the application of this invention to a telephone exchange network.

Fig. 8 is a diagram showing the manner in which the several subscribers' lines terminating in two telephone exchanges are grouped to secure the multiplex telegraph operation.

Fig. 9 illustrates one of the thermionic devices employed in the distributors.

Fig. 10 is a top plan view showing a portion of the start-stop translator employed for controlling one channel of the multiplex system, by one start-stop line.

Fig. 11 is an end view looking in the direction of the arrows 11—11 in Fig. 10, with the parts in a position to show the action of one impulse controlling the setting of a storing rod.

Fig. 12 is an end view looking in the opposite direction of Fig. 10.

Fig. 13 is a detail showing one clutch for signal reception.

Fig. 14 is a detail showing another clutch for signal transmission.

Fig. 15 shows the general plan of offsetting the selecting rods and cams.

Fig. 16 is a detail taken along the line 16—16 of Fig. 10.

Fig. 17 is a detail showing the manner in which the selecting rods are positioned.

Fig. 18 is a top plan view showing a portion of the start-stop translator for delivering multiplex signals to the start-stop lines.

Fig. 19 is an end view taken along the line 19—19 of Fig. 18.

Fig. 20 is an end view looking in the other direction of Fig. 18.

Fig. 21 is a detail showing the manner in which the selecting rods are positioned.

*General description of the system*

The multiplex telegraph system disclosed herein is designed particularly with the object in view of utilizing ordinary telephone equipment and circuits for the transmission of messages. It may be assumed, for example, that in a telephone exchange area many telephone subscribers will desire printing telegraph service as well. Each of these subscribers may have installed a printing telegraph equipment consisting of any suitable sender and receiver for five-unit code which may at will be associated with the telephone line leading to the central office. Whenever the subscriber wishes to transmit a telegraph message, he calls the central office operator in the usual manner and requests connection to a distant office, which may be in some other city, through which access may be had to the particular line to which he wishes to transmit the message. In response to this request the operator, by the use of one of her cord circuits, extends the calling subscriber's line to a distributing equipment located in the central office and in turn connects, or causes to be connected, this distributing equipment to a trunk outgoing to the desired distant office. At the distant office the necessary information is given to the operator, who thereupon connects the trunk to an incoming distributing mechanism and in turn connects, or causes to be connected, the distributing mechanism to the desired outgoing subscriber's line. Thereupon, the calling telegraph subscriber may transmit the message by means of the keyboard. This message is received by the distributor at the first central office which distributes it in the proper sequential manner to the outgoing trunk over which it is transmitted to the distant office. At the distant office the message is received by the incoming distributor which, in turn, distributes it to the called telegraph substation where it is recorded on a printer or other suitable receiving device.

Figure 7A:
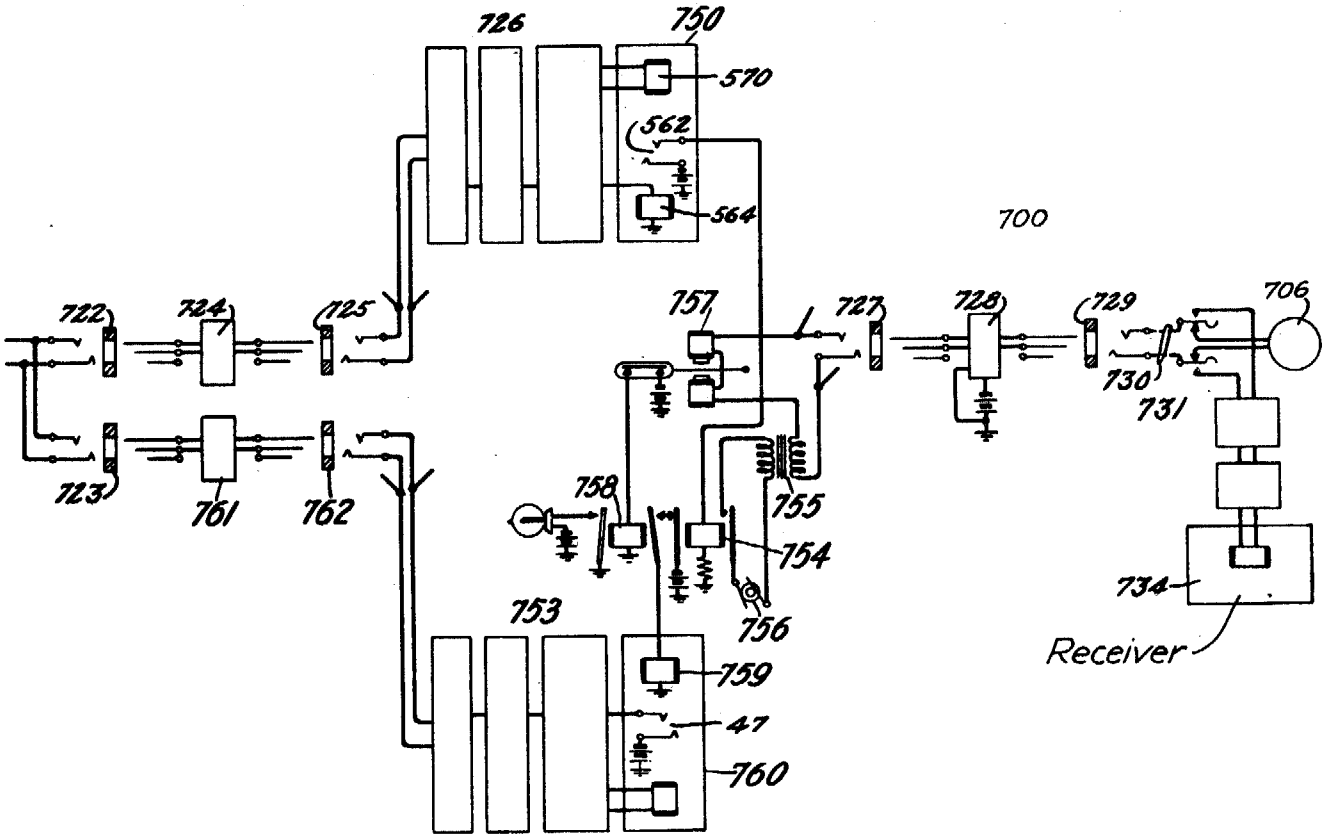

Referring particularly to the diagram of Figs. 7 and 7[a], there are shown two combined telephone and telegraph subscribers' stations, 700 and 707, which terminate in the first central office at the operator's position 732. These subscribers may, of course, converse with each other or with any of the other subscribers terminating in this office by means of their telephones 706 and 709, which are normally connected through keys or other switching devices to the respective lines 710 and 711. Moreover, if the subscriber at station 700 wishes to send a telegram to the subscriber at station 707, he calls up the central office and the operator thereat connects his line to the called subscriber's line by inserting one plug of her cord circuit 714 in the jack 712 of the calling line and the other plug in the jack 713 of the called line 711. As soon as the called subscriber is advised that a telegram is to be sent, he shifts his key 701 to connect the line 711 directly to the telegraph equipment.

At each station there is provided a suitable device such as a buzzer 705 which operates in response to current received from the central office. This buzzer may be designed to vibrate at the rate of say 800 cycles per second, thus setting up in the line a current of a frequency which may readily be transmitted through the ordinary telephone equipment, this frequency being well within the voice range. Also at each subscriber's station there is provided a relay 704 which is designed to operate in response to alternating current of a given frequency for controlling the printer or other recording device.

The calling subscriber thereupon manipulates his keyboard whereby a sending contact, such as the contact 703, completes a circuit for the buzzer relay 705 in the proper manner to send the impulse codes representing the characters of the message. At the called station, a relay or other device 733 responds to these code impulses of alternating current to operate the telegraph receiving device 708, such as a printer.

In order that the current upon the subscriber's line may be zero during idle periods a no-current stop pulse and a current start pulse are used in the start-stop telegraph printer.

If, on the other hand, the calling subscriber at station 700 wishes to send a message to a subscriber's station 731 (see Fig. 7a) appearing in a distant central office, it will be necessary for him to make use of a central office trunk. Upon receiving his request, the operator at the position 732 extends his line by means of his cord circuit over a connecting circuit, one end of which terminates in the jack 715 and the other end of which terminates in the out-going distributor 716. Moreover, the distributor 716 is connected to the outgoing line 721 by means of a cord circuit 718, one plug of which is inserted in the jack 717 and the other in the jack 719. This cord circuit 718 may be at the position 732 or it may be located at another operator's position in the same exchange, or the outgoing distributor may be connected permanently to the outgoing end of the trunk 721. The operator at the first exchange now instructs the operator at the distant exchange who extends the trunk 721 by means of the cord circuit 724 to the incoming distributor 726. This is accomplished by inserting one plug of the cord in the jack 722 and the other plug in the jack 725. Lastly, the distributor 726 is connected by means of a cord circuit 728, one plug of which is inserted in the jack 727 and the other in the jack 729, to the line 730 which has been called by the subscriber at station 700.

If desirable two main lines 721 may be used for opposite direction of transmission instead of one to decrease the possibility of interference between messages sent in opposite directions.

The calling subscriber now sets up the code combinations on his keyboard which are transmitted over the line 710 to the central office on the start-stop principle. These impulses being made up of 800 cycle alternating current, cause the operation of an alternating current relay 23 at the central office which operates the start-stop distributor 42 which receives and stores the code combinations. These code combinations, which are received and temporarily stored in the start-stop distributor, are fed into the synchronous multiplex distributor in their proper order together with similar combinations from a plurality of other incoming lines, and thereupon transmitted over the interoffice trunk 721 to the distant office. At the distant office they are received by the synchronous multiplex distributor 726 and distributed in proper order to the start-stop distributors. The message being transmitted from the station 700 is received by the start-stop distributor 750 shown at the distant office and transmitted over the line 730 to the called station 731, where it operates a receiving device such as a printer 734.

It may be desirable to provide for two-way back and forth communication between subscribers' lines involving the multiplex apparatus. To this end, each central office is equipped with a plurality of receiving multiplex distributors 752, as well as a plurality of sending distributors 716. Likewise, the terminating office is equipped with a plurality of sending distributors 753, as well as the receiving distributors 726. A pair of distributors including a sending distributor 716 and a receiving distributor 752 may be provided with a half-repeater, including the relays 23, 43, etc., whereby signals transmitted from the substation 700 to the substation 734 are repeated to the multiplex distributor 716; whereas signals transmitted from the station 734 to the station 700 are translated to start-stop code and distributed by the distributor 752 to the called line, all without interference. Likewise, at the distant terminal, signals coming from the station 700 are translated to start-stop code distributed by the distributor 726 and by means of a half-repeater delivered to the called station 734. When the station 734 desires to communicate, the distributor 753 receives the signals and transmits them to the central office at the distant end. This provision is made in order that two subscribers may communicate with each other without establishing successive connections.

For the purpose of establishing a connection in order that the called station 731 may communicate with the calling station 700, the operators at the central offices employ the cord circuits 761 and 763.

In order to conveniently explain a system of this character, certain assumptions will be made regarding the number of subscribers' lines involved, the number of channels that may be combined in a single transmission line, also with respect to the speed of transmission. For example, it may be considered that the out-going or sending end of the system may be made up of 96 different telegraph subscribers' stations each constituting a separate channel for communication, and that at the incoming or receiving end of the system there are 96 called telegraph lines with provision whereby each of the 96 calling lines may send messages simultaneously to respective ones of the 96 called lines, all over a single transmission circuit. Referring particularly to the diagram in Fig. 8, 96 calling subscribers' lines 800 may appear in jacks at the operators' switchboards in the first central office. Also appearing in the operators' switchboards are the jacks of 96 different telegraph channels 801. By means of cord circuits 718, etc., the operators may connect any of the 96 subscribers' lines to any one of the 96 different channels.

Each individual calling line may transmit telegraphic messages by means of code combinations of current sent at a relatively low frequency. For this purpose, sending current of the order of 10 or 20 code impulses per second may be employed. These character code combinations are transmitted by start-stop apparatus from the subscriber's station to the central office as groups of 800 cycle waves.

Figure 1:
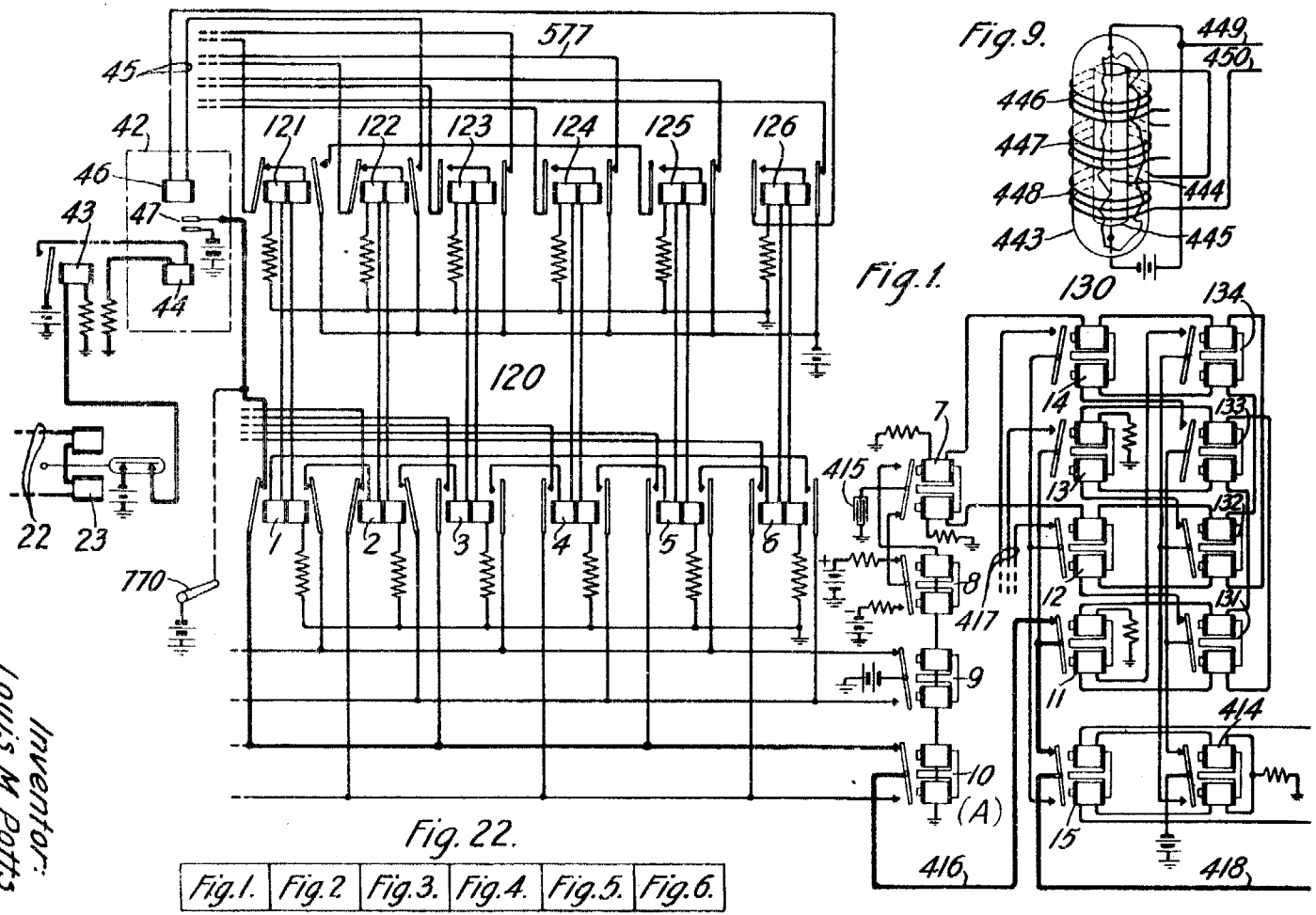

In order to secure multiplex operation at the central office, the 96 channels 801 are divided into 16 different groups of 6 channels each. For instance, the first 6 chanels 805 constitute one group and terminate in a single low speed distributing mechanism 810. The second, third, and fourth groups of channels 806, 807 and 808 terminate, respectively, in individual low speed distributors 811, 812 and 813. In a similar manner, the remaining 12 groups of 6 channels each are assigned to individual low speed distributing equipments. Each of these low speed distributors, such as the distributor 810 which is shown in detail in Fig. 1, consists of a plurality of relays forming a distributor 120 (Fig. 1).

Each of the six incoming channels terminates in a translator unit. The signals may be transmitted from the subscriber's station to the central office by the usual seven-unit start-stop signals comprising five current impulses and a start and a stop impulse. The translator unit receives and stores these signals under control of the alternating current relay 23 (Fig. 7). It delivers them to the low speed distributor 810 in the proper order and in the proper phase position.

By means of the distributor 810, the signals in all of the first 6 channels 805 are directed over a single channel 815 which leads to a second distributing unit 814 of relatively higher frequency. The current in the channel 815, which represents the message signals in all 6 channels 805, is of a greater impulse frequency than the original sending current and may be of the order of 60 impulses per second. In a similar manner, the signals in the second, third and fourth groups of channels 806, 807 and 808 are combined and directed over the respective single channels 816, 817 and 818 at 60 cycles per second. In a similar manner, the signals in each of the succeeding groups of channels are combined and directed over a less number of channels to the distributing elements 819, 820 and 821.

Thus the message signals in the 96 channels which originate by means of current of frequency of 10 impulse cycles per second, are combined in the first stage distributing mechanisms into 16 different groups each represented by a current of 60 impulse cycles per second. These 16 groups of channels are then directed to four distributing mechanisms 814, 819, 820 and 821 as explained.

Figure 2:
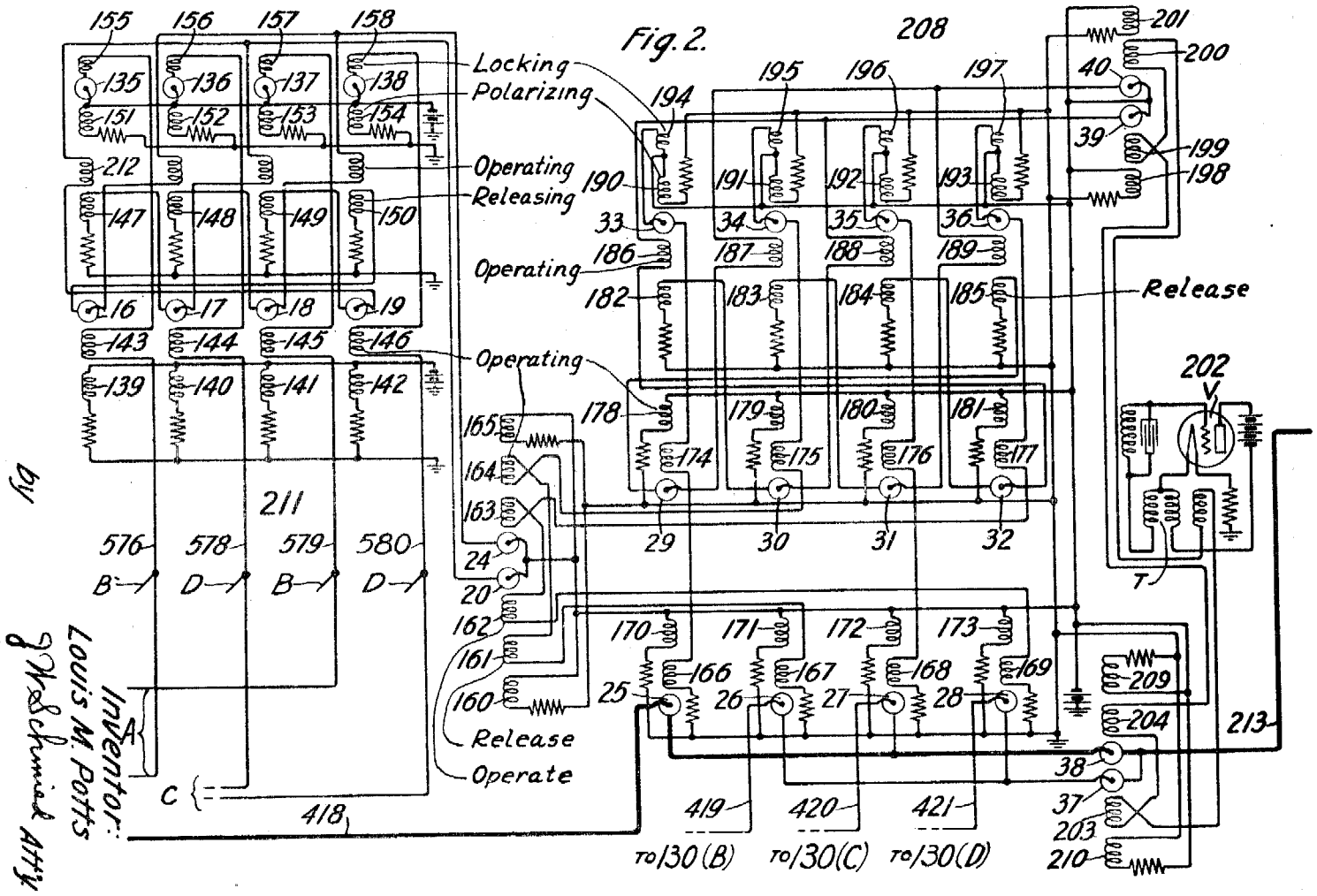

The distributor 814, for example, which is designated 130 and shown in detail at the right of Fig. 1, consists of a plurality of polarized relays. The function of this distributor is to receive the signals transmitted over the channels 815, 816, 817 and 818 by means of 60 impulse cycle current, and to combine these signals and redistribute them over the single channel 822 by means of a current having a still higher frequency, such as 240 impulse cycles per second. Similarly, the distributors 819, 820 and 821 combine the signals in four different channels and transmit them over the single respective channels 823, 824 and 825 by means of 240 impulse cycle current to a single distributing mechanism 826. The distributing mechanism 826, which is designated 208 and is shown in detail at the right of Fig. 2, consists of a plurality of therminoic or vacuum tube relays and its function is to combine the signals in each of the four channels 822, 823, 824 and 825, incoming at 240 impulse cycles per second, into a single channel 827 by means of a current of still higher frequency such as 960 impulse cycles per second.

Thus the signals incoming over 96 different lines simultaneously, originating at a relatively low frequency of sending, are combined by means of the distributing apparatus shown and transmitted over the line 827 at a comparatively high frequency.

A better understanding of the manner in which these signals are combined will be had after considering the detailed description of the apparatus given hereinafter. For the present it may be explained, however, that assuming the Baudot or five-unit code as the method of transmitting messages, the distributing apparatus is so arranged that impulse times or units of time for transmission of impulses are assigned in sequence to distributors 814, 819, 820 and 821; successive unit times for each distributor 814 are assigned to its subdistributors 810, 811, 812 and 813; and successive unit times for each distributor 810 are distributed to each of the group of lines 805. Thus the assignment of one unit time to each line requires 24 cycles of distributor 826, 6 cycles of each distributor 814, etc., and 1 cycle of each distributor 810, etc. Thus the first 96 intervals for transmission over the line 827 account for the first unit of the five-unit code in each of the 96 channels. Repeating this cycle of operations, the remaining four units of the character are accounted for in the four succeeding transmission groups of 96 intervals each.

At the distant central office the called telegraph subscribers' lines 829 terminate, of which there may, for example, be 96. There are also 96 channels 830 at the distant central office arranged in 16 groups of 6 channels each. The first four groups 831, 832, 833 and 834 appear in individual distributing mechanisms 835, 836, 837, and 838. Similarly, the remaining groups appear in other individual distributing devices. The distributing device 835, for instance, consists of a plurality of simple relays such as is designated 424 and shown in Fig. 6 and serves to distribute the message signals for the first 6 channels to start-stop translators.

The operator, by means of cord circuits 839, 840, 841, etc., may connect any of the called telegraph lines to any one of the 96 channels. Thus the signals received by the distributing mechanisms, 835, 836, 837, etc., are distributed over the proper individual channels to ordinary start-stop distributors, which in turn function with the start-stop distributors at the called telegraph stations to cause the operation of printers or other recording devices.

The low frequency distributing mechanisms 835, 836, 837, etc., are each connected by a single channel 842, 843, 844 and 845 to the distributor 846 which operates at a higher frequency. This is shown in detail in Fig. 5 and designated 423. Likewise, the remaining three groups of low frequency distributors are connected over single channels to the three distributors, respectively, 847, 848 and 849. These four distributors 846, 847, 848 and 849 are connected by single channeds each to the single distributing device 850 (designated 422 in Fig. 4) which operates at a still greater speed.

Thus the signals received over the line 827 by means of a current of 960 impulse cycle frequency are divided into four groups by the distributor 850 and sent over the four channels 851, 852, 853 and 854 by means of current of 240 impulse cycles frequency to the distributors 846, 847, 848 and 849. Each of these latter distributors, such as the distributor 846, further subdivides the signals received and directs them over four separate paths 842, 843, 844 and 845 by means of 60 impulse cycles frequency to the distributors 835, 836, 837, and 838. Finally, each of these latter distributors, such as the distributor 835, divides the signals received and directs them over the 6 different channels by means of a current having a frequency of 10 impulse cycles per second.

These ten-cycle frequency impulses of current operate the translator at the central office. The signals are stored in the translator and are retransmitted in the form of seven-unit start-stop code signals to the subscriber's station where they are recorded in a well known manner.

Inasmuch as 96 different messages may be sent over a single transmission line 827 at the same time, it becomes necessary to preserve a systematic and orderly assignment of the 96 different channels at the outgoing and incoming ends. This is taken care of by the operators at the distant central offices who may communicate with each other in any suitable way, such as by the usual order wire which exists as a part of the regular telephone equipment. For instance, if a calling subscriber 855 desires to send a telegram to a called subscriber 856, the operators may assign any channel identified as the first channel for this purpose. In this case, one of the cord circuits 802 is inserted in the jack of the calling station 855 and the other plug inserted in the jack 857 relating to the first channel. At the distant central office the operator inserts one of the plugs of her cord circuit 839 in the jack 858 of the first channel and the other plug she inserts in the jack 859 of the called telegraph subscriber's line 856. In this manner, 95 other calling and called stations may be assigned to the remaining 95 channels.

Any number of multiplex lines of this kind may be connected in tandem through ordinary telephone switchboards to provide a long distance circuit. The only condition necessary for such a connection is that all of the multiplex channels, regardless of the multiplicity, shall operate between two limiting speeds, for example, 40 and 41 words per minute. All substation transmitters should be so adjusted that they cannot transmit over a certain limit, as, for example, 39½ words per minute, and all receivers so adjusted that they will receive up to a given limit, as for example, at least 42 words per minute.

Referring to Figs. 1 to 6 inclusive, a brief description will now be given of the apparatus. At the left of Fig. 1 is shown at 22 one of a plurality of incoming signal channels such as the one associated with jack 858 of Fig. 8. The circuit leads to an alternating current relay 23 which is designed to maintain its contacts normally closed and responds to current of a given frequency, such as 800 cycles per second, to open and hold open its contacts during the time that current is flowing. Associated with the channel 22 is a start-stop translating mechanism 42 which, for the sake of convenience, has been illustrated schematically in Fig. 1. This start-stop mechanism is connected to a signal-receiving relay 43 which responds in the usual manner to open circuit conditions to cause the distributor 42, by means of the receiving magnet 44, to set up by mechanical combination means, combinations representing the characters received and control the sending contacts 47 in accordance therewith, one contact being assumed to be connected to a current source of suitable potential. The start-stop translator 42 is associated with the relay distributor 120 by means of the circuit 45, which includes the start magnet 46 of the start-stop translator. The circuit 45 is so connected to the distributor 120 that the magnet 46 is operated at a given point in the cycle of operation of the distributor 120 in order to start the start-stop translator at the proper instant. Similarly, five other channels are connected to the translator 120 at five different symmetrically spaced points. By this arrangement the 6 start-stop translators representing the 6 channels associated with the distributor 120 are started in operation in a definite sequential order under the control of the distributor 120, each beginning to operate at a different point in the cycle of operation of the distributor 120. Hence the signals stored in the distributors 42 are fed into the distributor 120 in a definite sequential order. This same arrangement is provided for each of the remaining 15 groups of channels. The signals from the start-stop distributor 42 are delivered to the relay distributor 120 by means of the usual sending contact 47 which is operated in a code-wise manner by the storing means of the start-stop translator. The timing is to be such that contact 47 of a particular channel is controlled (either open or closed) at the precise instants (with a suitable margin) a path through distributors 120, 130 and 208 is closed for the particular channel assigned to this contact; the position of the contact 47 of this channel at other times is immaterial.

Relays 1 to 6, and 121 to 126 are arranged to operate and lock in pairs, each pair causing the release of a preceding pair. The operating circuits are closed by the polarized relay 9. Relay 9 is in turn operated by relay 7, which is operated periodically by the distributor 130.

The distributing mechanism 130 consists of four pairs of polarized relays 11, 12, 13, 14, 131, 132, 133 and 134, together with an operating relay 414 and a distributing relay 15. The relays 7, 8, 9 and 10, which are also polarized, serve to interconnect the distributing mechanisms 120 and 130. These relays, together with the other polarized relays shown in other parts of the disclosure, are so arranged that the armature always stays in the position in which it was last attracted; one winding serves to attract the armature in one direction, whereas the other winding serves to attract it in the opposite direction. The four pairs of relays 11, 131, and 12, 132 and 13, 133 and 14, 134 are arranged in counting relation to be operated from the contacts of relay 414.

Assume relays 11 and 131 and relays 12 and 132 are operated and the other relays of the distributor are unoperated. Relays 13 and 133 operate and relays 11 and 131 release on the next step, and on the next succeeding step relays 14 and 134 operate and relays 12 and 132 release. This process continues as long as relay 414 receives impulses.

The relay 7 is arranged to operate through its lower winding whenever the second pair of relays 12 and 132 are energized, and through its upper winding whenever the fourth pair 14 and 134 are energized. In other words, the relay 7 operates once in each direction for every cycle of the counting relays 130. Relay 7 on closing its lower contact, charges the condenser 415 either with a positive or a negative charge depending upon the position of the armature of relay 8. When relay 7 next closes its upper contact, the condenser discharges through the windings of relays 8, 9 and 10, serving to operate these relays to their other position.

Relay 8 operates in one direction during one cycle of the distributor 130, and in the other direction for the next succeeding cycle.

The relay 9 on each operation causes an operating circuit for a pair of counting relays of the distributor 120. Thus it will be seen that the rate of operation of the counting relays 120 is reduced as compared with the rate at which the counting relays 130 are operated.

Thus, for each cycle of operation of distributor 130, distributor 120 is operated one step and distributor 130 must complete six cycles while distributor 120 completes one cycle.

All of the code impulses representing messages in the six channels leading to distributor 120 are directed through contacts of the relay 10, over conductor 416, to the contact of relay 11.

In a similar manner, the impulses for three other groups of six lines each are directed over conductors 417 to the contacts of relays 12, 13 and 14, respectively. The armatures of these relays 11, 12, 13 and 14 are connected to contacts of the relay 15, whereby all impulses representing the messages in four different groups may be directed to the single conductor 418.

The last stage of the distributor consists of a distributing mechanism 208 which is made up of a plurality of sets of thermionic relays. These relays, which will be described in detail hereinafter, consist of vacuum tubes each having a filamentary cathode, an anode and various windings which in the most general case include starting, locking and releasing windings. They are sensitive and accordingly may be operated at a high rate of speed. The thermionic relays are arranged in a counting relation similar to the relays shown in Fig. 1 and are operated cyclically by alternating current generated by an oscillation generator 202. The generator 202 consists of an ordinary three-electrode vacuum tube V which supplies space current to the middle winding of the induction coil T. The left winding of the coil supplies current to the input side of the tube, the frequency of which may be adjusted by the inductance and capacitance shown in the input circuit. The right winding of the coil T is included in series with the operating windings 200, 199, 204 and 203 of the relays 40, 39, 38 and 37, respectively.

The operating windings of these relays are so arranged that when current flows in one direction during a half cycle the relay will operate, and when it flows in the opposite direction the relay will release. By operation and release it is meant that the relay permits current to flow across the space between the cathode and anode for operation, and prevents current from flowing during the release period. As will be more fully explained hereinafter, in order that the relay may normally be released, a biasing or polarizing winding is supplied which is constantly energized. The relays 39 and 40 have their operating windings reversed whereby, when current is flowing in a given direction, one relay will be closed and the other relay open. Similarly, the relays 37 and 38 are arranged to operate and release alternately. The polarizing windings 201, 198, 209 and 210 are shown associated with their respective relays.

The relays of the distributor 208 are arranged in four sets, each set constituting a vertical row. That is, the relays 33, 29 and 25 constitute the first set; relays 34, 30 and 26 the second set; and so on. Relay 33 is provided with a polarizing winding 190, an operating winding 186, a release winding 182, and a locking winding 194. In like manner, the relays 34, 35 and 36 are similarly provided. Relay 29 has an operating winding 174 and a polarizing winding 178. The same is true of relays 30, 31 and 32. Likewise, the relay 25 is provided only with an operating winding 166 and a polarizing winding 170, which is also true of the relays 26, 27 and 28. For each closure of the relays 39 and 40, the succeeding one of the relays 33, 34, 35 and 36 is operated. The operated relay locks through its locking winding, causing the operation of the two associated relays in the same set. Also, at the time one of the relays 33, 34, etc., is operated, the second preceding relay which has been previously operated is released. This rotating action continues under the control of the oscillation generator 202.

Since the stepping rate of the distributor 208 is higher than is required for the distributor 130, a frequency changer 211 is inserted to reduce the speed of operation of the distributor 130. The frequency changer 211 consists of four pairs of thermionic relays. The relay 135 is provided with an operating winding 212, a polarizing winding 151, a locking winding 155, and a release winding 147. The same is true of the remaining three relays 136, 137 and 138. The relay 16 has only an operating winding 143 and a polarizing winding 139, and this is also true of the relays 17, 18 and 19.

Interacting between the high speed distributor 208 and the frequency changer 211 is a device consisting of two thermionic relays 20 and 24, each of which has a polarizing winding, an operating winding, and a release winding. The relays 20 and 24 are so connected to the distributor 208 that one relay operates and the other releases when relay 34 closes. When relay 36 closes, the reverse action takes place with relays 20 and 24. Thus the relays 20 and 24 each operate and release for each rotation of the distributor 208. Relays 20 and 24 govern the counting operation of the relays of the frequency changer 211. These relays 211 determine the operation of the polarized relays 15 and 414.

As the distributor 208 rotates under the control of the oscillator 202, the relays 25, 26, 27 and 28 are sequentially closed and opened at a definite rate per second. During the closed period of relays 25 jointly and 38, all message impulses on the conductor 418 are delivered through the relay 38 to the single path 213. Similarly, during the closed periods of relays 26, 27 and 28, all message impulses flowing in the conductors 419, 420 and 421 are delivered through relays 26, 27 and 28 and either through the relay 37 or the relay 38 to the single path 213.

The path 213 is connected to the transmission line 226 by means of a connecting or cord circuit 206, the plugs of which are inserted in jacks 205 and 207. At the distant central office, the transmission line 226 is connected with the path 253 by means of the connecting circuit 231, the plugs of which are inserted in jacks 230 and 232.

The transmission line 226 may be of the known character used for multiplex carrier telephone transmission. Accordingly, there is provided at the outgoing end, an oscillation generator 221 for generating a high frequency carrier current suitable for transmission over the line 226. A modulator 220 of any known type, such as a vacuum tube modulator, is employed for modulating the high frequency carrier current produced by source 221 in accordance with the telegraph signals received over the path 213 from the distributor 208. The modulated carrier current may then be amplified by an amplifier 222 of any known design and passed through a high-pass band filter 223 to the transmission line 226.

At the receiving or distant station the high frequency modulated carrier current is passed by the high-pass band filter 227 to the demodulator 228. The demodulator 228, which may also be of any known construction, demodulates the carrier current and delivers the detected telegraph signals to the amplifier 229. These signals are amplified by the amplifier 229 and then delivered to the single transmitting path 253 leading to the distributing mechanism in the incoming office.

If desirable, the transmission line 226 may also be arranged to transmit ordinary voice frequency telephone currents without interference. This is accomplished by employing low-pass band filters 224 and 233. These filters are designed to pass the comparatively low frequency voice currents but to exclude the high frequency carrier telegraph currents. By making suitable connection with the jacks 225 and 234, ordinary telephone conversations may be held over the transmission line 226.

At the receiving office, the distributors 422, 423 and 424 are similar in function to those shown at the sending office and serve to receive the signals of all 96 different channels and distribute them to the corresponding called telegraph subscribers' lines.

The distributor 422, which operates at high speed, corresponds to the distributor 208 at the sending end and is made up of a plurality of sets of thermionic relays. However, instead of having four sets of relays as in the case of distributor 208, the distributor 422 is provided with eight sets, these sets occurring in vertical rows. The reason for having eight sets instead of four is to facilitate the maintenance of synchronism between the equipment at the sending end and at the receiving end. Another reason is that, with proper phase relation within a signal impulse period, a central and hence more reliable portion of impulses may be used for signal reception. The relay distributor 422 is driven by an oscillation generator 252 which comprises a vacuum tube X having input and output circuits associated with the inductance Y, together with an inductance and capacity in the input circuit for securing the desired frequency. It is found that synchronism may be maintained conveniently by driving the oscillator 252 at a frequency which is double the frequency of the oscillation generator at the sending end. Accordingly, twice the number of such relays are needed for the distributor 422 in order that the frequency changer 425 may be driven at half the speed of the distributor 422, or, in other words, at a speed equal to the speed of sending at the transmitting station.

The first set of relays in the distributor 422 consists of relays 340, 260, 72, 72 and 80 and 81. Similarly, the third, fifth and seventh sets of relays consist of as many as the first set. The second set of relays, however, consists of only two, namely, the relays 341 and 60. In like manner, the fourth, sixth, and eighth sets each have two relays. The relay 340 has an operating winding 332, a polarizing winding 348, a release winding 324, and a locking winding 316. Each of the relays 341, 342, 343, 344, 345, 346 and 347 have similar windings. Relays 260 and 73 are each provided with an operating winding 308 and 604, respectively. The same is true of relays 60, 261, 61, 262, 62, 263, 63, 75, 77, 79, 72, 74, 76 and 78. Although the polarizing windings are not shown for several of these latter mentioned relays it is to be understood that these windings will be provided to maintain the relays normally open. When relay 340 is operated, relay 260 is operated and relays 72 and 73 are prepared for operation; which of 72 and 73 will be operated depends on which of 65 and 66 is operated and this in turn depends upon whether a marking or spacing signal has caused one or the other of 435 or 436 to be operated.

The distributor 422 is driven by the oscillator 252 under control of the thermionic relays 69 and 68. Upon the occurrence of an oscillation in the output circuit of the generator 252 one of the relays, 69 for instance, is closed and the other relay 68 is held open. Upon the next oscillation, the reverse process takes place, namely, the relay 69 is opened and the relay 68 is closed. This continues, the relays alternating throughout each successive cycle of the current produced by the generator 252. Upon each closure of each of the relays 68 and 69, a succeeding one of the relays 340, 341, 342, etc., is operated and a second preceding relay is released. Therefore, it will be noted that a succeeding one of these relays operates upon each half-cycle of the current produced by the generator 252. It will also be noted that the relays 73, 75, 77 and 79 and also relays 72, 74, 76 and 78 are conditioned for operation at the rate of one pair of relays per cycle of the oscillatory current. Also included in the output circuit of the generator 252 is a relay 67, which is conditioned to pass current in a given direction once per cycle and accordingly is closed once during each cycle of the current. The relay 67 supplies voltage to the relays 65 and 66, one of which latter relays is operated in response to incoming signals, as will be explained hereinafter, for determining the operation of one or the other of each of the pairs of relays 80 and 81, 82 and 83, 84 and 85, 86 and 87. Relays 80 and 81, when operated, complete a circuit through the winding of the polarized relay 94 to determine its operation in one direction or the other according to which of the two relays was closed. Relay 94 determines the application of plus or minus battery to some polar relay of the set 102, etc. In similar manner, the remaining three pairs of relays 82 and 83, 84 and 85, etc., determine the operation of three other relays similar to the relay 94.

The second portion of the main receiving distributor consisting of distributor 423 consists of four pairs of polarized relays 98 and 398, 99 and 399, 100 and 400, and 101 and 401, together with four polarized relays 102, 103, 104 and 105. The relays 98, 398, etc., are operated in sequential fashion by means of the frequency changer 425. The frequency changer 425 is made up of four sets of thermionic relays which are driven in a cyclical manner by means of the two relays 88 and 89. The relays 88 and 89 have their operating and releasing windings connected to two different points in the distributor 422. Thus for each rotation of the distributor 422, relays 88 and 89 are each operated to determine the sequential operation of the relays of the frequency changer 425. The frequency changer 425 has two of its relays 380 and 382 connected to windings of polarized relays 95 and 96. By this means the relays 95 and 96 are operated once in each direction for each rotation of the frequency changer 425.

The relays 102, 103, 104 and 105 are selected sequentially, however, by the counting operation of the relays 98, 398, etc., and are operated in either one or the other direction by circuits closed through the contacts of relays 94 and 95, according to whether there are signals in the conductors 426 or 427. The relay 102, when operated in either one or the other direction, applies either positive or negative current to the conductor 429. The signals thus produced in the conductor 429 are directed through one or the other of the contacts of relay 106 to the contacts of the relays of the distributor 424. In a similar manner, the relays 103, 104 and 105 receive signals from contacts of relay 94 and in turn apply plus or minus battery to the conductors 430, each of which leads to the armature of a relay similar to relay 106 associated with three distributing mechanisms similar to the mechanism 424.

The distributing device 424, similar to the distributor 120 at the sending station, consists of six pairs of simple relays. These relays are arranged in counting relation to each other and are operated and released sequentially at a given rate which is a function of the rate of rotation of the relays of the distributor 422. In 96 unit signal periods or 192 half periods the distributor 424 passes through a complete cycle, and distributor 423 and other similar distributors pass through 6 complete cycles. For operating the relays 424 in sequential manner, polarized relays 107, 180 and 181 are provided. The relay 107 operates to close its upper and lower contacts once for each rotation of the distributor 423. On closing its lower contact, the relay 107 permits the condenser 431 to charge either positively or negatively according to the position of relay 180. On subsequently closing its upper contact, relay 107 closes an operating circuit for relays 180, 181 and 106 which operate in a direction depending upon the nature of the charge which the condenser 431 discharges through their windings. For each operation of relay 181 in either direction, a pair of the counting relays 108, 408 and 109, 409, etc., are energized and a preceding pair are released.

The signals occurring in the conductor 429 are directed through contacts of relay 106 to the closed contacts of relays 108, 109, 110, etc. Whenever marking signals are present in conductor 429 at the time relay 106 closes its upper contact and relay 108 is operated, these signals are directed over the path 432 to the windings of the polarized relay 114. Relay 114 completes a circuit through the windings of polarized relays 115 and 116 and through the code magnet 564 of the start-stop translator associated with the channel identified by the relay 108. Likewise, the signals intended for the following five channels are directed through contacts of the relays 109, 110, etc., to the respective conductors 434.

In order that synchronism may be maintained between the sending and receiving ends, means is provided for adjusting automatically the speed of the oscillator 252 whenever it varies from the frequency established by the oscillator 202 at the transmitting station. For this purpose, the thermionic relays 239 and 238 have their operating windings 246 and 247 included in series with the output circuit of the oscillator 252. Accordingly, these relays will both be operated once for each cycle of the oscillatory current 252.

The signals, after detection and amplification, delivered to the conductor 253, are directed to the operating windings of the thermionic relays 435 and 436. The relay 435 is so arranged that the polarizing and operating windings both act in the same direction. The polarizing winding is adjusted so that it almost opens the relay normally. Thus when a slight current is flowing through the operating winding, the relay will open. Conversely, the operating and polarizing windings of the relay 436 are in opposition to each other and the polarizing winding is adjusted so that it is just strong enough to hold the relay open. Accordingly, a small amount of current through the operating winding will close the relay. Accordingly, whenever a signal occurs in the conductor 253, the relay 435 opens and relay 436 closes. In this condition, current flows through the left winding of the transformer 235 in a given direction. Following the signal when an absence of current occurs, relay 436 opens and relay 435 closes. This reverses the direction of the current through the winding of the transformer 235. Thus for each signaling current impulse, there is a reversal of the direction through the left-hand winding of the transformer 235. Accordingly, an alternating current is induced in the right-hand winding of the transformer, the direction of which alternates through the operating windings 242 and 243 of the thermionic relays 236 and 237. This current is composed of short pulses separated by much longer intervals of no current.

The frequency of the current produced by the oscillator 252 is twice the frequency of the incoming signals from the transmitting station. Accordingly the relays 238 and 239 will open and close at twice the rate of the relays 236 and 237. These relays are adjusted in such manner that when the transmitting and receiving stations are in synchronism the closed period for each of the relays 236 and 237 occurs between the closed periods of the relays 238 and 239.

When condenser 438 is out of the circuit, the frequency of the oscillator is slightly greater than that of the incoming signals; and when the condenser is in the circuit, the frequency of the oscillator is slightly less than that of the incoming signals. While switching condenser 438 in and out at rapidly recurring intervals, the intervals may be so regulated in lengths that the average frequency of the oscillator will be exactly the same as that of the incoming signals. The relays 236 and 237 close for very short intervals for each reversal of the current in line 253. This short impulse is delivered by relay 238 or 239 into the winding 250 or 251 of relay 240, depending upon the phase of the oscillator with respect to the incoming signals. For a certain interval pulses will go through relay 238 and for a certain interval through relay 239, and condenser 438 will be in and out of the circuit accordingly. If any factor affects the rate of the incoming signals or the rate of the oscillator, the relative length of the two sets of intervals will automatically readjust itself to maintain synchronism. By this means is the average frequency of the oscillator made twice that of the signals, to maintain a substantially fixed phase relation.

In order that a better understanding may be had of the cooperation between the different stages of distributors, certain assumptions will now be made regarding the speed at which these mechanisms are driven. These speeds are purely relative and may be of any value so long as the whole system is varied in the same ratio. Assume that the oscillation generator 202 generates alternating current having a frequency of 960 cycles per second. This means that the direction of the current changes twice during each cycle, or 1920 times per second. Accordingly, the control relays 39 and 40 each close once and open once during each cycle, giving 1920 closures per second. Since one of the relays 33, 34, 35 and 36 operates for each operation of one of the relays 39 and 40, the relays 33, 34, 35, etc., of the distributor 208 will operate at the rate of one relay in each $1/1920$ of a second.

The relays 20 and 24 are so connected to the distributor 208 that each of these relays operates and releases once during a complete cycle of the distributor 208, or, in other words, during each interval of 1/480 of a second. For each operation of the relays 20 and 24, a set of the relays of the frequency changer 211 is operated. Therefore, in order to operate all four of the sets of relays of the frequency changer 211, it will be necessary to operate each of the relays 20 and 24 twice. Accordingly, it requires 1/240 of a second to complete a cycle of the frequency changer 211.

The frequency changer 211 is so connected to the polarized relay 414 that this relay is operated once in each direction for a complete cycle of the changer 211, giving two operations of the relay 414 in 1/240 of a second. Since it is necessary for the relay 414 to operate four times to complete a cycle of the distributor 130, said distributor requires 1/120 of a second per cycle. Due to the manner in which the relay 7 is connected to the distributor 130, said relay operates once in each direction for each cycle of said distributor. Inasmuch as the relay 9 operates once for every two operations of the relay 7, it follows that each of the counting relays 1, 2, 3, 4, etc., of the distributor 120 requires two operations of the relay 7. Accordingly, for each cycle of the distributor 130, a pair of the counting relays 120 will be operated. This means that the distributor 120 requires 1/20 of a second per cycle.

From the foregoing assumptions, it will be seen that the start-stop distributors 42 associated with each of the 96 sending channels may be arranged to send other code impulses to the 16 different distributors 120 at the rate of 20 impulses per second. These impulses are delivered in the proper sequential order to four separate second-stage distributors 130 operating at a high rate of speed. The impulses from the four distributors 130 are delivered in proper sequential order over four separate conductors 418, 419, 420 and 421 to the single third-stage distributor 208, which operates at a still greater speed and distributes all impulses from 96 different channels in the proper sequential order to the input circuit of the modulator 220 in order to modulate the high frequency carrier current for transmission over the signal line 226.

If desirable, the speed of all four distributors 130 may be governed by the single frequency changer 211. This may be accomplished by multipling each pair of leads 576 to 580, inclusive, from the changer 211 to separate distributors 130, the connection being taken off at the proper point to give the correct phase relation for each distributor. In Fig. 1 the leads are designated as going to distributors 130 designated A, B, C and D.

At the receiving central office, it may be assumed that the oscillator 252 generates an alternating current at a frequency of 1920 cycles per second. Accordingly, the relays 68 and 69 operate and release once per cycle. This means that the relays of the distributor 422 operate at the rate of two relays per 1/920 of a second. In other words, it requires 1/480 of a second for each cycle of the distributor 422.

The distributor 422 is so connected to the frequency changer 425 that two sets of relays of the changer 425 are operated for each cycle of the distributor 422. This means that the frequency changer 425 requires 1/240 of a second for each cycle. The changer 425 is in turn so connected to the polarized relay 96 that this relay performs an operation in each direction for each cycle of the changer 425. Accordingly, the distributor 423 requires 1/120 of a second for each cycle of operation.

Similar to the manner in which the relay 107 is connected to the distributor 423, this relay operates once in each direction for each cycle of said distributor d, accordingly, the final distributor 424 requires 1/20 of a second for each cycle.

It follows from these assumptions that the multiplex distributor apparatus at the receiving central office is capable of distributing code impulses to each of the 96 separate receiving channels at the rate of 20 impulses per second.

The assumptions made for the speed of operation of the equipment shown are arbitrary and that this equipment may be driven at higher or lower speeds according to the requirements.

At the receiving end of the multiplex system, a phasing arrangement is provided. This consists of the keys 440, 441 and 442, which in reality may be assembled to constitute a single key. The function of the phasing key is to arrest the operation of the distributors 422, 423 and 424 and cause these distributors to start in operation at a definite point in their cycles which will be exactly in synchronism with the rotation of the corresponding distributors at the transmitting station. A more detailed explanation will be given of the phasing operation hereinafter.

*Description of the thermionic relays*

As already explained, certain of the distributing mechanisms are composed of thermionic relays. One of these relays is illustrated somewhat in detail in Fig. 9. It consists of an evacuated vessel 443 within which is enclosed a thermionic cathode 444 which may be heated by a suitable source of electric current. For convenience this heating source has not been shown throughout the drawings. Also within the vessel 443 and surrounding the cathode 444, is an anode 445 cylindrical in shape. This anode may comprise a solid metal cylinder or it may be made up of a cylindrical cage of spaced metallic members. Surrounding the glass vessel 443 are a number of coils 446, 447 and 448 designed to carry electric currents. If a potential difference is applied across the terminals 449 and 450 with the cathode heated, an electric current will flow due to the discharge of electrons into the evacuated space. By energizing one of the windings 446 with electric current of the proper value and in the proper direction, the stream of electrons flowing between the electrons may be so controlled and restricted that no current flows in the circuit 449, 450. By passing an electric current through a second one of the windings 447 as an operating winding in the proper direction, the polarizing effect of the first winding 446 may be overcome, whereby current again flows in the circuit 449, 450. Once the circuit is closed, it should be maintained in a closed condition by the flow of current through the locking winding 448. The effect of this locking winding is to counteract the polarizing winding 446, whereby the current flowing therethrough is sufficient to maintain the electron flow between the electrodes of the tube. For a further description of relays of this type, reference is made to the patent to A. W. Hull, No. 1,387,985, granted August 16, 1921.

*Detailed description of the start-stop distributors*

A detailed description will now be given of the start-stop distributor which receives start-stop impulses from a subscriber's line and delivers them to the multiplex distributing mechanism. Referring to Figs. 10 to 17 inclusive, there is shown a stationary frame or cage consisting of rods 500 and 501 upon which are mounted the stationary plates 502 and 503. Extending through the center of the plates 502 and 503 is a shaft 504 which is constantly driven through a chain of gears 505 by a governed motor 506.

The shaft 504 carries two friction clutches 507 and 508. The clutch 507, better shown in Fig. 13, includes a plate 509 which is loosely journaled upon the shaft 504 by means of a sleeve portion 510. On the other end of the sleeve portion 510 there is formed integrally therewith a cam 530, the purpose of which will be explained later. Surrounding the sleeve 510 is a second sleeve 512 having two peripheral slots therein. The sleeve 512 is loosely mounted on the hub 510 for relative motion. A coil spring 513 presses the plate 509 against the friction material 514 which is rotating constantly with the shaft 504. In this manner, the tendency is to drive the plate 509 with the shaft. The plate is normally held from rotation by means of a bell crank lever 515 which is pivotally mounted on the plate 509 and has one arm engaging one of the slots in the sleeve 512. With the sleeve 512 in its normal position, the other arm of the bell crank lever 515 is rotated to a position where it encounters one of two stop pins 516 attached to the stationary plate 502. In this manner, the plate 509 is held from rotation.

Engaging the other slot in the sleeve 512 is the armature 517 of the receiving magnet 44. When no impulses are being received by the magnet 44, spring 518 holds the armature 517 in its retracted position, drawing the sleeve 512 to the left as seen in Fig. 10 and thereby positioning the lever 515 to encounter one of the stop pins 516. When a start impulse is received by the magnet 44, the sleeve 512 is drawn to the other position, allowing the lever 515 to disengage the stop pin whereby the plate 509 rotates through a half revolution with the shaft 504. During the rotation of the plate 509 through a half revolution, the code impulses may be received by the magnet in any number up to five, causing the successive movement of the sleeve 512 in accordance with the receipt of the impulses. The manner in which this sleeve causes the selecting rods to be positioned will be described presently.

The start-stop code impulses are stored for subsequent transmission through the multiplex system by means of two series of slidable rods. There are five of these rods 519 in each set, each set of five occupying one-half of a circumference about the shaft 504. The rods 519 are slidably mounted in the stationary plates 502 and 503 and each has one end bent to form a right angle portion 520. Each of the rods carries at its opposite end a camming member 521. The length of these cams is uniform with the exception of the cam attached to the fifth rod, which is seen to be considerably shorter than the other four. This is to enable the maintenance of the proper phase relation between the distributor and the multiplex unit.

The rods 519 are designed to be moved to either one of two positions with respect to the plate 509 by means of the beveled end or rod setting cam 522 of the bell crank lever 515. (See Fig. 17.) To this end, the plate 509 has a slot or opening therein through which the beveled cam end 522 of the lever 515 passes, as the lever is rotated by the plate 509, under the influence of the magnet 44. Following the start impulse the plate 509 rotates 180 degrees, bringing each of the bent ends 520 of the rods 519 successively into registration with the opening in said plate. Depending upon the position of the beveled end 522 at the instant any particular rod is brought in proximity with the opening in the plate 509, such rod is deflected by said beveled end either to one or to the other side of the plate. Accordingly, after a half revolution has been made, a set of rods is positioned to record the combination of impulses received by the magnet 44.

As will be seen later on, two sets of rods are provided in order that a signal received over the start-stop line may be stored momentarily, provided the distributor is not in the exact phase relation with respect to the multiplex for the immediate delivery of said signal to the multiplex distributor. Thus the transmission over the start-stop line is entirely independent of the phase relation of the multiplex apparatus with respect to the individual code combinations of the signals.

The delivery of the signals from the start-stop distributor to the multiplex distributor necessarily depends upon two factors: first, there must be a signal stored in the start-stop distributor, and the multiplex distributor must have reached the proper phase relation before delivery can commence. For this purpose, clutch 508 is provided and is under the joint control of the start-stop distributor and the multiplex distributor. This clutch, which is shown in detail in Fig. 14, consists of a hub-shaped member 523 carrying an integral cam 524. Loosely fitted around the hub 523 is a sleeve 525 having two slots therein. A cam lever 526 pivoted to the hub 523 has one of its extremities projecting to arrive in one of the slots in the sleeve 525. The other end of the lever 526 described a circumference coincident with the surface of the cams 521 on the slidable rods 519. Whenever one of these rods is projected forward, the cam extends to a position where it is encountered by the lever 526 during the rotation of the latter; whereas if the rod is in its normal position, the lever 526 does not engage the same at the end of said rod. The coil spring 527 urges the hub 523 against friction material which is constantly rotating with the shaft 504. Thus the tendency is for the shaft 504 to drive the hub 523 therewith. Said hub, however, is restrained normally from rotating by means of the lever 528 or 529. The lever 528 is U-shaped, one end of which engages the cam 524 on the hub 525. The other end of this lever engages the cam 530. In a similar manner, the lever 529 is U-shaped, one end engaging the cam 524 and the other the cam 530. The cam 530 is so shaped that when the plate 509 is in one of its two normal positions, one or the other of the levers 528 or 529 is permitted to tilt toward the center slightly, thereby bringing one end of such lever to a position where a projection 532 is caused to engage a stop pin 533a carried by the hub 523. Thus the lever 528 or 529, as the case may be, restrains the hub 523 from rotation, provided the cam 524 is also in its normal position. In other words, one of the levers 528 or 529 can only be tilted toward the center if both cams 530 and 524 are in normal positions.

In addition to the levers 528 and 529 for holding the hub 523 from rotation, there are provided two other levers 534 and 535, the lever 534 being slightly shorter than the lever 535. Normally, both of these levers extend to a point where their ends are in alignment with a stop pin 533a or 533b. The opposite ends of levers 534 and 535 cooperate with cams 536 and 537, respectively. These cams are loosely mounted on the shaft 538, and when released are driven through a friction clutch by the motor 506. Normally, the cams are held by a lever 539 controlled by the stop magnet 540.

As soon as the distributor has commenced to record a start-stop signal, the cam 530 rotates through a sufficient distance to elevate the particular lever 528 or 529 which has been holding the hub 523 from rotation. This removes the finger 532 from engagement with the holding stop pin 533a, thus releasing the hub 523 which commences to rotate with the friction clutch driven by the shaft 504. The hub 523 no sooner commences rotation, however before a pin 533a or 533b engages the lever 535 and the hub thereupon ceases to rotate. As soon thereafter as the multiplex distributor is in its right phase relation, the relay 46 is operated, closing a circuit including the contacts 542 for the start magnet 540. The magnet 540 withdraws the lever 539, permitting the cams 537 and 536 to begin rotation. Cam 537 immediately rotates the lever 535 whereupon the hub 523 is again released and once more starts to rotate. It is immediately arrested, however, by the lever 534 but, since the cam 536 is now in motion, this lever is at once withdrawn, whereupon the hub 523 is free and may now rotate to complete a half revolution to transmit the signal which either has been recorded or is being recorded by the start-stop distributor. During the rotation of the hub 523, the lever 526 engages such of the cams 521 as have been pushed forward into its path by the selecting rods in accordance with the signal combination recorded. The lever 526, therefore, moves the sleeve 525 forward whenever it encounters one of the cams 521. Engaging the other slot of the sleeve 525 is a lever 543 which actuates the sending contacts 47. Thus the sending contacts 47 are caused to open and close to transmit signals to the multiplex distributor 120 in accordance with the nature of the combination set up by the selecting rods 519.

When the hub 523 has completed a half revolution, it is arrested by one of the levers 528 or 529 provided the storing of another signal has in the meantime not reached the stage necessary to prevent one of these levers from rotating inwardly a sufficient distance to engage stop pin 533a. A lever 544 is provided to maintain the contacts 542 closed only when the cams 536 and 537 have reached their normal position. As soon as the storing of the next signal has progressed to the proper position the hub 523 is again released and at the proper phase of the multiplex system levers 535 and 534 are moved from in front of stop pin 533a or 533b whereupon another half revolution takes place to deliver this signal to the multiplex distributor 120.

Should any given signal code combination involving a marking fifth selecting rod 519 not be followed immediately by another code combination, the lever 526, after a half revolution has been made to send the given signal code combination, would stop on the fifth cam 521 and continue to send marking impulses were some other provision not made to prevent it from doing so. To obviate this undesirable feature, the fifth rod in each set carries a jockey member 545 having sloping slots. A lever 546 pivoted on the frame has one end extending into a slot in member 545 and another end controlled by the cam 547 which is mounted for rotation on the shaft 538. As soon as the cam 537 has left its normal position, a lever 546 rotates its end into the slot in member 545 and locks the fifth rod 519 in its operated position while the signal combination is being sent. As soon as the signal combination has been sent and a half revolution has been made, the cam 547 returns to normal, removing the lever 546 and unlocking the fifth rod. At this time the bent end 520 of said rod is opposite a restoring slot 509a in the plate 509, and thus the pressure of the contact springs 47 is sufficient to restore said rod to its normal position, thus preventing the sending of a marking impulse.

Next, a description will be given of the start-stop distributor used for delivering signals from the multiplex distributor, such as that shown in Fig. 6, to the called subscriber's line. This distributor which is shown in Fig. 18 consists of a rotatable cage comprising end plates 566 and 549 and two sets of slidable rods 550. The plates 566 and 549 are mounted for rotation with the shaft 551, which is driven by a governed motor 552 through a chain of gears and a friction clutch 553. The rods 550, of which there are five in each set, have one end bent to form an angle portion 554 and at the other end each of these rods carries a cam 555. Two sets of cams and rods are properly spaced to allow the maintenance of the necessary phase relation between the start-stop and multiplex equipments. In addition, each of the rods carries a semicircular plate or disc 556 arranged to slide with the rod to which it is individual. Each plate slides freely upon the other rods to which it is not attached; the rods pass through holes for this purpose. Each of the discs 556 carries a projection 557 which registers with a notch in the plate 558 when the rod 550 is in its normal position. Thus when no impulses have been received, if the cage is rotated the projections 557 pass through the notches in the plate 558 without disturbing the same. Under these conditions the axis of the lever 559 is carried down and is held in the position shown to hold the lever 561 in a position to maintain the contacts 562 and 563 open but the hook 559 engages the rod 560 to prevent the transmission of a start pulse upon the subsequent half revolution.

To receive and store a signal combination from the multiplex system, the stop magnet 570 is energized when the multiplex distributor 424 reaches its proper position in its cycle. Magnet 570 operates its armature 573 to release the cage for rotation with the shaft 551. As the cage rotates, the magnet 564 is energized and deenergized in accordance with the code impulses to position its wedge-shaped armature 565 either to the one or the other side of an opening in the stationary plate 548. As the cage rotates, the bent ends 554 of the rods 550 are brought into engagement with the wedge-shaped armature 565 by the guide plates shown in Fig. 21 and are thus deflected either to the one or to the other side of the plate 548.

Just after the fifth impulse period has passed, the projections 557 on any one of the rotating discs 556 which are out of registration with the slots in the plate 558, engage said plate and rotate the same to release the pawl 559. At this time the lever 561 has just disengaged one of the stationary cams 567, and since the lever 559 is also released as shown for the position in which a signal has been stored the lever 561 now permits the contacts 562 and 563 to close to send a start impulse over the start-stop line. To do this the upper end of the lever enters the blank space for a start impulse which precedes the first cam 556 of one of the sets. The continued rotation of the cage causes the cams 556 positioned to the left to engage the end of lever 561, whereby contacts 562 and 563 are opened and closed to transmit impulses representing the signal previously stored in the distributor. So that this signal retransmission may take place in a proper manner the rims of the elements 556 extend through substantially a semi-circumference and maintain the plate 558 tilted throughout the half revolution in which a code combination is retransmitted. Thus, while one signal is being transmitted, another may be stored in the start-stop distributor. The lever 568 is actuated by a nub on plate 549 which must be offset with respect to the nub engaging armature 573 and serves to short-circuit the stop magnet 570 except when the distributor is in one of its normal positions. Cams 567 send a stop pulse after each code combination.

The speed of the start-stop motor is such that the translator shafts make slightly more than one revolution while the distributors 130 and 424 are completing ten cycles.

*Transmission of signals from the substation to the storing start-stop distributor*

If the subscriber at substation 700 desires to send a telegram to a distant subscriber through the multiplex equipment, he will first communicate with the operator at position 732 by means of his telephone 706. The operator upon receiving the information communicates with an operator at a distant exchange, whereby the called substation 731, for instance, is connected to the same channel to which the calling line 710 has been assigned by the first exchange. This may be any one of the 96 channels selected at random, the only requirement being that the channel be idle at the time and that both calling and called lines be assigned to the same channel. After the connection has been established, the subscriber at station 700 throws the key 701 to its alternate position, thus disconnecting the telephone set 706 and connecting the telegraph equipment to the line 710. A ground potential may be connected to the tip and ring conductors of the line 710 at the central office, as, for example, by means of the operators' connecting circuit 714. Accordingly, a circuit is traceable from battery, over one side of the line 710, through the contacts of key 701, winding of relay 735, closed contact of the alternating current relay 704, lower contact of key 701, and thence over the other side of the line 710 to ground. The relay 735 will operate its armature to its front contact, energizing the right winding of the printer magnet 738. The subscriber transmits the signals representing the message by means of any known keyboard which operates a sending contact 703. Upon each closure of the contact 703, a circuit may be traced from battery at the central office, over one side of the line, through the upper contacts of key 701, coil 737, winding and contact of the interrupter relay 705, contact 703, and thence over the other side of the line to ground. Relay 705 is designed to interrupt its own circuit at the rate of the order of 800 cycles per second. The interruption of the circuit by relay 705 sets up an oscillatory current in the line which is transmitted through the operator's connecting circuit 714 and jack 715 to the relay 23, including the left winding of coil 741. The relay 23 has its armature tuned in such a manner that it will respond to currents of the order of 800 cycles per second. It will not be operated by direct currents or currents of other frequencies.

For a more detailed description of the construction of relay 23, reference is made to U. S. Patent 1,607,910 to H. W. O'Neill, November 23, 1926.

Each time the relay 23 opens its contacts, relay 43 releases its armatures and a circuit is closed from battery, through the right contact of relay 46, left contact of relay 43, winding of the code magnet 44 of the start-stop distributor 42. In the manner hereinbefore explained, the magnet 44 causes the signals to be stored in the start-stop distributor, from which they are delivered in turn to the multiplex distributor 716.

At the distant central office, signals are received by the multiplex distributor 726 and delivered to the start-stop distributor 750 of the proper channel. The start-stop distributor 750, by means of its sending contacts 562, closes a circuit from battery through said contacts, winding of relay 754, to ground. The relay 754 is designed to open its left contact slightly prior to the closing of its right contact. Each time the relay 754 operates, a circuit is closed including the alternating current generator 756 and the left winding of the transformer 755. The generator 756 produces an alternating current of the order of 800 cycles suitable for transmission over telephone lines. This alternating current induces a current in the right winding of the transformer 755 which is transmitted over the called subscriber's line 730 to operate the printer at the station 731. The relay 757 operates in response to the current flowing through its windings and causes the release of relay 758. Since, however, the left-hand contacts of relay 754 have already been opened, relay 758 is ineffective to close the circuit for the code magnet 759 of the start-stop distributor 760.

If the subscriber at station 731 wishes to reply to the subscriber at station 700, a connection is established over the cord circuit 761 and the jacks 762 and 723 to the transmission line 721. At the distant station, the line 721 is connected to the receiving multiplex distributor 752 by means of the cord circuit 763 and the jacks 720 and 764. Signals transmitted from the substation 731 pass through the relay 757 which actuates the relay 758 to in turn cause the operation of the code magnet 759. At the receiving end, shown in Fig. 7, the signals sent over the line are received by the distributor 752, and the start-stop distributor 765 operates its contacts 766 to close a circuit for the relay 46. Relay 46 connects the alternating current generator 767 to the right winding of the transformer 741, whereupon signals are induced in the left winding and transmitted to the substation 700.

Thus the system is so arranged that direct current is supplied from the central offices to operate the buzzers 705 and relays 735. The buzzers 705 in turn produce alternating current signals for operating relays 704 which interrupt the circuits of relays 735.

*Table showing the operation of the relays of the multiplex distributors*

The detailed operation of the multiplex distributor at the sending end may be explained by means of a table showing the condition of the relays over a period of time. Table 1, which is prepared without allowance for operating or releasing times is such a table. The table will show what relays are operated during each successive interval of time over period necessary to indicate the rotation of the relays of the distributor 120 through a complete cycle. One cycle of the distributor 120 represents a single impulse period for each of the six different channels leading in to said distributor. In order to send a complete signal on the basis of the Baudot or five-unit code, it will be necessary for the distributor 120 to pass through five such cycles in order to provide five impulse periods for each of the six different channels.. Since each of the five different units of the code are repetitions of each other, the table is applicable to any unit. Inasmuch as the fast distributor 208 must be prepared to deliver to the line 96 impulses in the time that one of the slow distributors 120 is passing through a single cycle, in order to show the sequential operation of relays of the distributor 208 it is necessary to divide up the total time into 96 impulse intervals or periods. For each of these impulse periods, the table may be extended to show what relays of all three distributors are operated. For brevity, the table only shows the condition of relays 25, 26, 27 and 28 of the vertical rows of distributor 208, it being understood that whenever one of these relays is operated the remaining relays of the vertical set are also operated. Likewise, the condition only of relays 16, 17, 18, and 19 of the frequency changer 211 is given in the table.

In this table dashes and underscoring indicate passage of a signal pulse through the relay in question at the time indicated.

Refer now to Table 1 which is made fragmentary to save space and is prepared with certain conventions. Column 1 designates the 96 periods with a starting point conveniently chosen. Each relay of the table is shown in the position it assumes at the starting period or has previously assumed if continuous operation is proceeding; it is not repeated in the table until some change occurs; "L" indicates closure of a lower contact and "U" an upper contact; thus, relay 10A1 closes its lower contact at the seventh period and remains so until the twenty-third period when it closes its upper contact. There is some flexibility in assembling and assuming starting relations between the various relays of the four distributors 130 and the sixteen distributors 120. For explanatory purposes we will assume that distributor 130 shown is designated 130A and will have its relays designated 15A, 11A, 12A, etc.; the relays of the other distributor 130 connected to leads 576 and 579 are designated B; and the distributor connected to the conductors 578 and 580 are designated 130B and 130C, respectively. Conductors 418, 419, 420 and 421 may be assigned as shown on the drawings. Relays of distributors 120 shown are designated 1A1, 1A2, etc.; those of a distributor connected to a contact of relay 12 would be 2A1, 2A2, etc.; those associated with a distributor associated with a distributor 130 associated with a distributor connected to leads 576B and 579B would be 1B1, 1B2, etc.

TABLE 1

| Period | Tube relays operated | 15A | 130A | 10A1 | 10A2 | 10A3 | 10A4 | Relays of 120(A)1 | 15B of 130B | 15C of 130C | 15D of 130D |
|---|---|---|---|---|---|---|---|---|---|---|---|
| 1 | 24 38 25 26 16 17 | U | 11A 12A | U | U | L | | 1A1 2A1 | L | L | U |
| 2 | 37 26 27 16 17 | | | | | | | | — | | |
| 3 | 20 38 27 28 17 18 | L | 12A 13A | | | | | | U | — | |
| 4 | 37 28 25 17 18 | | | | | | | | | | — |
| 5 | 24 38 25 26 18 19 | | 12A 13A | | | | L | | | U | L |
| 6 | 37 26 27 18 19 | | | | | | | | — | | |
| 7 | 20 38 27 28 19 16 | U | 13A 14A | L | | | | 2A1 3A1 | L | — | |
| 8 | 37 28 25 19 16 | | | | | | | | | | — |
| 9 | 24 38 25 26 16 17 | | 13A 14A | | | — | | | | L | U |
| 10 | 37 26 27 16 17 | | | | | | | | — | | |
| 11 | 20 38 27 28 17 18 | L | 14A 11A | | L | | | | U | — | |
| 12 | 37 28 25 17 18 | | | | | | | | | | — |
| 13 | 24 38 25 26 18 19 | | 14A 11A | | | | — | | | U | L |
| 14 | 37 26 27 18 19 | | | | | | | | — | | |
| 15 | 20 38 27 28 19 16 | U | 11A 12A | | | U | | | L | — | |
| 16 | 37 28 25 19 16 | | | | | | | | | | — |
| 17 | 24 38 25 26 16 17 | | 11A 12A | — | | | | — | | L | U |
| 18 | 37 26 27 16 17 | | | | | | | | — | | |
| 19 | 20 38 27 28 17 18 | L | 12A 13A | | | | U | | U | — | |
| 20 | 37 28 25 17 18 | | | | | | | | | | — |
| 21 | 24 38 25 26 18 19 | | 12A 13A | | — | | | | | U | L |
| 22 | 37 26 27 18 19 | | | | | | | | — | | |
| 23 | 20 38 27 28 19 16 | U | 13A 14A | U | | | | 3A1 4A1 | L | — | |
| 24 | 37 28 25 19 16 | | | | | | | | | | — |
| 25 | 24 28 25 26 16 17 | | 13A 14A | | | — | | | | L | U |
| 26 | 37 26 27 16 17 | | | | | | | | — | | |
| 27 | 20 38 27 28 17 18 | L | 14A 11A | | U | | | | U | — | |
| 90 | 37 26 27 16 17 | | | | U | | | | | | |
| 91 | 20 38 27 28 17 18 | L | 14A 11A | | | | | | U | — | |
| 92 | 37 28 25 17 18 | | | | | | | | | | — |
| 93 | 24 38 25 26 18 19 | | 14A 11A | | | | — | | | U | L |
| 94 | 37 26 27 18 19 | | | | | | | | — | | |
| 95 | 20 38 27 28 19 16 | U | 11A 12A | | | L | | | L | — | |
| 96 | 37 28 25 19 16 | | | | | | | | | | — |
| 1 | 24 38 25 26 16 17 | | 11A 12A | — | | | | — | L | L | U |

Relays 38 and 40 energize together; relays 37 and 39 energize together.

In Table 1:

Column 1 indicates the period.

Column 2 indicates which relay 20 or 24 is operated.

Column 3 indicates which relay 37 or 38 is operated.

Columns 4 and 5 show which relays 25, 26, 27 and 28 are conditioned to transmit an impulse (designated as operative instead of conditioned in other places).

Columns 6 and 7 relate to relays 16 to 19, inclusive.

Column 8 relates to relay 15 of distributor 130 (designated 15A) and shows whether its upper or its lower contact is closed.

Columns 9 and 10 relate to the relays 11 to 14 of distributor 130A designated 11A to 14A, inclusive (being the distributor of the drawings).

Columns 11, 12, 13 and 14 relate to relay 10 of distributor 130 designated A101 and three other relays associated preferably in a symmetrical manner with conductors 417, designated 10A2, 10A3, and 10A4. Four sets of relays 7, 8, 9, and 10 are assumed to be symmetrically connected to be controlled by the leads through the windings of the stepping relays of distributor 130.

Columns 15 and 16 relate to relays 1 to 6, inclusive, of distributor 120 whose relays are designated 1A1, 2A1, etc.

Column 17 relates to relay 15 of distributor 130B, designated 15B.

Column 18 relates to relay 15 of distributor 130C, designated 15C.

Column 19 relates to relay 15 of distributor 130D, designated 15D.

A tabulation of all relays for all distributors would be too cumbersome for reproduction in a patent and, moreover, is unnecessary. Furthermore, the six-channel system with one idle distributor shown in the drawings is a complete and operative system in itself.

Consider now the transmission of signal pulses according to the Table 1 which is based upon the assumed phasing and relations of relays and distributors:

In period 1 a signal channel is present through relays 38, 25, 15A, 11A, 10A1 (upper) and 1A1. Relay 26 is conditioned on the preceding period, 38 for this period only and all the other relays have assumed the required position at some earlier time and remain fixed for the period of transmission of the impulse.

In period 2 a signal channel is present through relays 37, 26, 15B (15 of 130B) and other relays associated with distributor 130B.

Each of four successive impulses will be routed over a different distributor 130; each of four successive impulses to a distributor 130 to a different relay 11, 12, 13 and 14 and each successive impulse to any given relay of this set to a different relay 1, 2, 3, 4, 5 or 6. Thus in the table the impulse of the first period is routed over relays 11A, 10A1 and 1A; of the fifth period over relays 12A, relay 10A2, and perforce to another distributor 120. In the seventeenth period when an impulse is again routed over relays 11A and 10A1, the relay 10A1 has changed to its lower contact and relay 2 has long previously been operated to establish a channel for control by a different start-stop translator-distributor 42 connected over contacts of relay 2.

This description together with the Table 2 is considered to adequately illustrate the operation. However, other methods of connecting the distributors may be used with equivalent or satisfactory results.

Table 2 covers in a similar manner the operation of the distributor at the receiving end. The same amount of time is required for the distributing mechanism 424 to complete a cycle as is required for the distributor 120 at the sending end. Since, however, the distributor 422 has twice as many sets of relays, it has been found convenient to divide the time given in Table 2 into twice as many half periods as was the case for the whole periods in the first table. As in the first table, several of the relays of the set are not mentioned but it will be clear from the relays mentioned and the text what sets of relays are operated at the time. Throughout the table the letters "U" and "L" will be found. "U" means the upper contact is closed, whereas "L" means the lower contact is closed.

TABLE 2

| Half period | Relays of 422 and 425 | Signal relays | 95 (A) | Relays of 423A | 106A1 | Relays of 424 (A)1 | 106A2 | Relays of 424 (A) 2 | 95 (B) | 95 (C) | 95 (D) |
|---|---|---|---|---|---|---|---|---|---|---|---|
| 1 | 260 63 88 90 93 | 80, 81 | L | 98 99 | U | 108 109 | U | 108 109 | U | L | U |
| 2 | 260 60 | 80, 81 | | | | | | | | | |
| 3 | 261 60 | 82, 83 | | | | | | | | | |
| 4 | 261 61 89 91 90 | 82, 83 | | | | | | | L | U | |
| 5 | 262 61 89 | 84, 85 | | | | | | | | | |
| 6 | 262 62 | 84, 85 | | | | | | | | | |
| 7 | 263 62 | 86, 87 | | | | | | | | | |
| 8 | 263 63 88 92 91 | 86, 87 | U | 99 100 | | | | | | | L |
| 9 | 260 63 88 | 80, 81 | | | | | | | | | |
| 10 | 260 60 | 80, 81 | | | | | | | | | |
| 11 | 261 60 | 82, 83 | | | | | | | | | |
| 12 | 261 61 89 93 92 | 82, 83 | | | | | | | U | L | |
| 13 | 262 61 89 | 84, 85 | | | | | | | | | |
| 14 | 262 62 | 84, 85 | | | | | | | | | |
| 15 | 263 62 | 86, 87 | | | | | | | | | |
| 16 | 263 63 88 90 93 | 86, 87 | L | 100 101 | | | | | | | U |
| 17 | 260 63 88 | 80, 81 | | | | | | | | | |
| 18 | 260 60 | 80, 81 | | | | | | | | | |
| 19 | 261 60 | 82, 83 | | | | | | | | | |
| 20 | 261 61 89 91 90 | 82, 83 | | | | | | | L | U | |
| 21 | 262 61 89 | 84, 85 | | | | | | | | | |
| 22 | 262 62 | 84, 85 | | | | | | | | | |
| 23 | 263 62 | 86, 87 | | | | | | | | | |
| 24 | 263 63 88 92 91 | 86, 87 | U | 101 98 | L | 109 110 | | | | | L |
| 25 | 260 63 88 | 80, 81 | | | | | | | | | |
| 26 | 260 etc. | 80, 81 | | | | | | | | | |
| 27 | 261 | 82, 83 | | | | | | | | | |
| 28 | 261 89 93 92 | 82, 83 | | | | | | | | L | |
| 29 | 262 89 | 84, 85 | | | | | | | | | |
| 30 | 262 etc. | 84, 85 | | | | | | | | | |
| 31 | 263 | 86, 87 | | | | | | | | | |
| 32 | 263 90 93 | 86, 87 | L | 98 99 | | | L | 109 110 | | | U |
| 33 | 260 | 80, 81 | | | | | | | | | |

| Half period | Relays of 422 and 425 | Signal relays | 95 (A) | Relays of 423A | 106A1 | Relays of 424 (A)1 | 106A2 | Relays of 424 (A) 2 | 95 (B) | 95 (C) | 95 (D) |
|---|---|---|---|---|---|---|---|---|---|---|---|
| 34 | 260 | 80, 81 | | | | | | | | | |
| 35 | 261 | 82, 83 | | | | | | | L | U | |
| 36 | 261 91 90 | 82, 83 | | | | | | | | | |
| 37 | 262 | 84, 85 | | | | | | | | | |
| 38 | 262 | 84, 85 | | | | | | | | | |
| 39 | 263 | 86, 87 | | | | | | | | | L |
| 40 | 263 92 91 | 86, 87 | U | 99 100 | | | | | | | |
| 41 | 260 | 80, 81 | | | | | | | | | |
| 42 | 260 | 80, 81 | | | | | | | | | |
| 43 | 261 | 82, 83 | | | | | | | U | L | |
| 44 | 261 93 92 | 82, 83 | | | | | | | | | |
| 45 | 262 | etc. | | | | | | | | | |
| 46 | 262 | | | | | | | | | | U |
| 47 | 263 | | | | | | | | | | |
| 48 | 263 90 93 | | L | 100 101 | | | | | | | |
| 49 | 260 | | | | | | | | | | |
| 50 | 260 | | | | | | | | | | |
| 51 | 261 | | | | | | | | L | U | |
| 52 | 261 91 90 | | | | | | | | | | |
| 53 | 262 | | | | | | | | | | |
| 54 | 263 | | | | | | | | | | L |
| 55 | 260 | | | | | | | | | | |
| 56 | 260 92 91 | | U | 101 98 | U | 110 111 | | | | | |
| 57 | 261 | | | | | | | | | | |
| 58 | 261 | | | | | | | | U | L | U |
| 59 | 262 | | | | | | | | L | U | |
| 60 | 262 | | | | | | | | | | |
| 180 | 261 61 89 91 90 | 82, 83 | | | | | | | | | |
| 181 | 262 61 89 | 84, 85 | | | | | | | | | |
| 182 | 262 62 | 84, 85 | | | | | | | | | |
| 183 | 263 62 | 86, 87 | | | | | | | | | L |
| 184 | 263 63 88 92 91 | 86, 87 | U | 101 98 | U | 108 109 | | | | | |
| 185 | 260 63 88 | 80, 81 | | | | | | | | | |
| 186 | 260 60 | 80, 81 | | | | | | | | | |
| 187 | 261 60 | 82, 83 | | | | | | | U | L | |
| 188 | 261 61 89 93 92 | 82, 83 | | | | | | | | | |
| 189 | 262 61 89 | 84, 85 | | | | | | | | | |
| 190 | 262 62 | 84, 85 | | | | | | | | | |
| 191 | 263 62 | 86, 87 | | | | | U | 108 109 | | | U |
| 192 | 263 63 88 90 93 | 86, 87 | L | 98 99 | | | | | | | |
| 1 | 260 63 88 | 80, 81 | | | | | | | | | |

*Detailed description of the operation of the multiplex distributors*

A detailed description will now be given of the manner in which the distributors operate. For this purpose, reference will be had to the tables. Consider first the distributing equipment (Figs. 1 and 2) at the transmitting station. Assume that at a given instant the current generated by the oscillator 202 is in such a direction as to close the thermionic relays 38 and 40. With relay 40 closed, a circuit may be traced from battery, through the relay 40, operating winding 187 of the relay 34, through the relay 29, release winding 185 of the relay 36, and thence to ground. The relay 29 has been previously operated and accordingly the relay 34 operates, and relay 36, which was also previously operated, releases. Relay 34 closes a locking circuit from battery, through its locking winding 195, thence through the relay 34, operating winding 175 of relay 30, operating winding 164 of relay 24, release winding 161 of relay 20, operating winding 167 of relay 26, to ground. Relay 26 operates in this circuit, relay 24 operates, and relay 20 is released. With relay 24 closed, a circuit may be traced from battery, through the relay 24, thence through the operating winding of relay 136, relay 16, release winding 150 of relay 138, to ground. Relay 16 has been previously operated and accordingly the relay 136 is closed and relay 138 is released. Relay 136 in operating locks in a circuit from battery, through said relay, thence through its locking winding 156, operating winding 144 of relay 17, conductor 578, lower windings of a pair of relays 15 and 414, to ground. Relay 16 operates in this circuit. Relays 15 and 414 of two distributors 130 operate also. The release of relay 138 also opens the operating circuit of the associated relay 19.

Since relays 11 and 131 as well as relay 15 shown in the drawing have been previously operated, a circuit may now be traced from battery, through the upper contact of relay 414, contact of relay 131, lower operating windings of relays 12 and 132, upper release windings of relays 134 and 130, upper winding of relay 7, to ground. Relays 12 and 132 are operated and relays 14 and 134 are released. Relay 7 is operated to close its lower contact to charge the condenser 415. It may also be assumed that the relay 9 is in the position shown with its upper contact closed, and that when the relay was actuated to this position it caused the actuation of the counting relays 2 and 122. The circuit may be traced from battery, through the upper contact of relay 9, right contact of relay 1, which has been operated previously, left windings of relays 2 and 122, to ground. These relays operate and lock in a circuit from ground, through their right windings, left contact of relay 122, and thence through a relay 46 on the start-stop distributor associated with the second channel, and returning over conductor 577, through the right contact of relay 124, to battery. Relay 122 in operating opens at its right contact the locking circuit for relays 6 and 126 which includes the relay 46 at the start-stop translator or distributor 42. Relays 6 and 126 thereupon release. Thus, for the first half-cycle of current generated by the oscillator 202, relays 38, 40, 25, 26, 24, 16, 17, 15, 414, 11, 131, 12, 132, 7, 8, 9, 10, 1 and 2 are in operated condition. This information corresponds to Table 1.

Upon the next reversal of current at the oscillator 202, relays 38 and 40 are released and relays 37 and 39 are closed. With relay 39 closed, a circuit may be traced from battery, through said relay, operating winding 188 of relay 35, through the relay 30, release winding 182 of relay 33, to ground. Relay 35 is operated and relay 33 released. Relay 33 in releasing opens the circuit through the operating windings of relays 29 and 25, and these two latter relays are opened. Relay 35 in operating locks through its locking winding 196 in a circuit traceable through the operating winding 176 of relay 31 and the operating winding 168 of relay 27 to ground. Relays 31 and 27 also operate. Since the relays 20 and 24 are left in the same condition as during the previous period, no further change takes place during this second period. That is, the relays 24, 16, 17, 15, 11, 12, 7, 10, 1 and 2 are operated the same as during the first period. This information corresponds to Table 1.

On the next change in direction of the oscillator current, relays 38 and 40 are closed again. A circuit may now be closed from battery, through relay 40, operating winding 189 of the relay 36, through the relay 31, release winding 183 of relay 34, to ground. Relays 36, 32 and 28 are operated and relays 34, 30 and 26 release. The locking circuit for relay 36 may be traced from battery, through the locking winding 197, the operating winding 177 of relay 32, thence through the release winding 163 of relay 24, and the operate winding 162 of relay 20. Accordingly, the relay 20 operates and relay 24 releases. Relay 20 closes a circuit from battery, and thence through the operating winding of relay 137, through the relay 17, and the release winding 147 of relay 135 to ground. Relay 137 operates and relays 135 and 16 release. Relay 137 locks in a circuit from battery, through said relay, locking winding 157, operating winding of relay 18, thence over conductor 579 to the windings of polarized relays 15 and 414 and windings of other relays similar to relays 15 and 414 associated with a distributor similar to the distributor 130. Accordingly, the relays 15 and 414 operate for the first time to close their lower contacts. A circuit may now be traced from battery, through the lower contact of relay 414, contact of relay 132, lower operating windings of relays 13 and 133, release windings of relays 131 and 11, to ground. Relays 13 and 133 close their contacts, and relays 11 and 131 release. It will be noted that the remaining relays remain as in the preceding impulse period.

During the fourth period the current again changes, relays 38 and 40 are released, and relays 37 and 39 are operated. A circuit is closed from battery, through the relay 39, operating winding 186 of relay 33, through the relay 32, release winding 184 of relay 35, to ground. Relays 33, 29 and 25 are operated, and relays 35, 31 and 27 are released. Since the relays 24 and 20 remain as during the last period, no other change takes place in the frequency changer 211 or in the distributors 130 and 120 for the fourth period. Thus, in four impulse periods the distributor 208 has made a complete revolution and is ready to perform a second cycle.

During the fifth period, it will be noted from the table that relay 24 operates and accordingly a circuit is closed from battery, through said relay, through the operating winding of relay 138, to the relay 18 and the release winding 148 of relay 136, to ground. Relays 138 and 19 operate, and relays 136 and 17 release. The locking circuit of relay 138 is traceable from battery, through said relay, locking winding 158, operating winding 146 of relay 19, conductor 580, to the windings of relays 15 and 414 of other distributors 130 designated 130(C) and 130(D) and cause the relays of these distributors to advance one step, to ground.

During the next or sixth impulse period, only the relays of the distributor 208 change their operated condition, the remaining relays remaining the same.

During the seventh period, relay 20 is again operated, and in a manner now clear the relays 137 and 18 of the frequency changer 211 are released and relays 135 and 16 are operated. Relays 15 and 414 are operated to close their upper contacts. A circuit may now be traced from battery, through the upper contact of relay 414, contact of relay 133, operating windings of relays 14 and 134, release windings of relays 132 and 12, lower winding of relay 7, to ground. Relays 14 and 134 operate, and relays 12 and 132 release. Also the relay 7 operates to close its upper contact, whereby the charge on condenser 415 is discharged through the relays 8, 9 and 10. Due to the polarity of this discharge, the relays 9 and 10 are operated to close their lower contacts. A circuit may now be traced from battery, through the lower contact of relay 9, right contact of relay 2, left winding of relays 3 and 123, to ground. Relays 3 and 123 operate and lock in the manner above explained, and relays 1 and 121 are released. Thus, for the first time, a single step is taken in the counting operation of the slow-acting distributor 120.

During the eighth period relays 37, 39, 33, 29 and 25 operate, relays 36, 32 and 28 remain operated.

During the ninth period relays 38 and 40, 26, 34 and 30 operate; relay 24 operates and relay 20 releases; relays 17 and 136 operate and relays 19 and 138 release; the distributor 130 shown is not changed.

During the tenth period relays 37 and 39 operate; relays 27, 35 and 31 operate.

During period 11, the relay 18 of the frequency changer is operated, and accordingly relays 15 and 414 are energized to close their lower contacts. A circuit may now be traced from battery, through the lower contact of relay 414, contact of relay 134, lower operating windings of relays 11 and 131, release windings of relays 133 and 13, to ground. Thus, relays 131 and 11 are again operated and relays 133 and 13 are released. No change, however, takes place in the slow distributor 120.

During the twelfth period relays 37, 39 and 25 operate; relay 28 remains operated; relay 20 remains operated.

During the thirteenth period relays 38 and 40 operate; relays 26, 34 and 30 operate; relay 24 operates; relays 138 and 19 operate.

It is believed that the continued operation of the distributing mechanism may now be followed from Table 1, each step of which shows the exact condition of the important relays.

In the table the twenty-eighth to the eighty-ninth periods are omitted.

It will be noted that relays 38 and 40 operate together and relays 37 and 39 together.

Relays 15 operate to a new position each four periods; relays 11, 12, etc., return to their operated position each sixteen periods; relays 10 operate each sixteen periods; and relays 1, 2, etc., complete a cycle each ninety-six periods.

For convenient reference distributor 130 and its relays are designated (A); other distributors 130 are designated 130(B), 130(C), 130(D).

Distributor 120 associated with relay 10A may be designated 120A1; similar distributors 10A2, 10A3, 10A4 may be assumed to be associated with relays 10A2, 10A3 and 10A4 which are symmetrically and in succession connected to conductors 417, relays 10A1, etc., being connected to relays 7 operating in symmetrical succession with respect to the relays 11, 12, etc., of its associated distributor and other distributors are connected accordingly.

Dashes and underscoring on Table 1 indicate closure of the path for a signal pulse, thus, for example, in the seventeenth period a path is closed through relay 25, relay 38, relay 15(A) upper, relay 11A, relay 10(A)1, relay 2(A)1.

In the eighteenth period the path is through the lower contact of a relay 15(B) to some other relay 11(B), 12(B), etc., to some other distributor 120(B)1.

Each fourth pulse is closed through a given relay 15; each sixteenth through a given relay 11, 12, etc.; each sixteenth through a given relay 10; and each ninety-sixth through a given relay 1, 2, etc.

Referring now to the distributing equipment at the receiving end, a description will be given in conjunction with Table 2. This table does not allow for operating or releasing times for which adjustments are made in practice. Assume that at a given instant the direction of the current generated by the oscillator 252 is such as to cause the closure of relay 68 and the opening of relay 69. Assume, also, that relays 347 and 63 have been previously operated. A circuit may be traced from battery, through the normally closed relay 70, relay 68, operating winding 332 of relay 340, relay 63, release winding 330 of relay 262, to ground. Relay 340 operates and relay 346 releases, in turn releasing the relay 263. Relay 340 completes a circuit from battery, through its locking winding 316, operating winding 308 of relay 260, operating winding 604 of relay 73, operating winding 304 of relay 72, to ground. Thus, the relays 340, 260, 73 and 72 are closed.

Assume, also, that the relay 88 has been previously closed and that relays 90, 380, 93 and 383 have also been closed. The relay 383 in operating completed a circuit from battery, through its locking winding 391, operating winding 367 of relay 93, a conductor to lower windings of relays 95 and 96 of a distributor similar to 423, to ground.

In Table 2 periods 61 to 179, inclusive, have been omitted and numerous relays have been omitted to condense the table to convenient proportions.

Column 1 indicates the period.

Columns 2 and 3 indicate which relays of distributor 422 are operated.

Column 4 relates to stepping tubes 88, 89.

Columns 5 and 6 relate to tubes of frequency changer 425.

Columns 7 and 8 relate to the pairs of signal relays 80, 81, etc.

Column 9 applies to the relay 95 of distributor 423 shown, designated 95(A).

Columns 10 and 11 relate to the stepping relays 98, 99, etc. of distributor 98, 99.

Column 12 relates to the position of relay 106 shown, designated 106(A)1.

Columns 13 and 14 relate to relay 108, 109, etc. of distributor 424, designated 424(A)1, associated with relay 102(A).

Column 15 relates to relay 106(A)2 of distributor 424 associated with relay 103(A) of distributor 423(A).

Columns 16 and 17 relate to relays 108 and 109, etc. associated with relay 106(A)2.

Columns 18, 19 and 20 relate to the position of other relays 95, designated 95(B) 95(C) and 95(D).

In this first period, it is assumed, of the relays shown on the drawing, that relays 68, 347, 63, 340, 260 and 88 are operated; 72, 73 are conditioned for operation. Relay 88 is assumed to be causing relay 380 to be operated; relay 88 having been operated by relay 347 over a path through relay 347, winding 323, winding 315, release winding 395 of relay 89, operating winding 393 of relay 88, to ground. Relay 380 locks up through its locking winding 388 and operates relay 90 over a path through the upper winding of relays 95 and 96 to ground. Relays 95 and 96 have their lower contacts closed; relays 98, 99, 398 and 399 are assumed to be operated.

Relays 95 and 96 move together and the pairs of relays 98, 398, etc. move together.

Relay 68 operates in all odd-numbered periods, 69 in all even-numbered periods.

Each time a relay 68 or 69 operates it energizes one tube in advance of the previous tube of the series 340, 341, 342, etc., each over a path through the starting winding such as 333 and the preceding energized relay such as 260. Each tube 260, 261, 262 and 263 conditions its respective pair of tubes 72, 73, etc. Upon the next half period after each pair is energized tubes 67 and 69 are operated to supply a portion of a signal pulse, preferably the central portion to the selected one of the energized pair.

Tubes 343 and 347 advance tubes 89 and 88, respectively, one step through the operating winding 396 of tube 89, operating winding 393 of tube 88, release winding 396 of tube 89 and release winding 394 of tube 88.

Each alternation of tubes 88, 89 advances frequency changer 425 one step by operating the next tube of the series 380, 381, etc., each of which operates the corresponding tube directly below it; thus, tube 381 locks itself operated over winding 389 and operates tube 91 by means of the start winding 365. Each tube 380, 381, etc., is started over a circuit through the preceding tube; thus, the start circuit of tube 380 extends from battery, through tube 88, start winding 376, tube 93, release winding 374 of tube 92, to ground.

Each tube 380 and 382 operates relays 95 and 96 (and other similar relays) and relays 381 and 383 may be connected to relays 95(B) and 95(C) of the other distributors 423(B) and 423(C) which are not shown.

Repeating, therefore, the situation for an arbitrarily selected start period (or rather half period), there being 192 such half periods, we have operated or conditioned relays 68, 260, 63, 88, 72, 73, 90, 93, 380, 383, 95 and 96 on lower contacts, 99, 100, 398, 399.

In the second half period tube 68 is released and 69 energized and relay 67 is always energized with relay 69. A marking or spacing line impulse may at this time energize one of tubes 80 or 81 which are locked in for about eight half periods until reselected by a new line impulse of another channel; selection of either tube 80 or 81 discontinues the discharge of the other. Relay 94 is set according to the selection of tube 80 or 81. No other change occurs in the second half period. See Table 2.

At the time relays 98 and 398 operated, relay 107 had previously been operated in the following circuit: battery, through the contact of relay 97, lower contact of relay 96, contact of relay 101, lower winding of relay 107, closed contacts of key 441, lower windings of relays 398 and 98, upper windings of relays 100 and 400, to ground. Accordingly, relay 107 closed its upper contact, in which condition we find it during the period now under discussion. On closing its upper contact, the relay 107 connected the condenser 431 to the windings of relays 180, 181 and 106, and the charge in said condenser is discharged through these relays. This discharge causes said relays to operate to close their upper contacts. Consequently, relays 106 and 181 advance one step each time associated relay 107 closes its upper contact.

Assume, further, that at this time the relays 108 and 408 and 113 and 413 have been previously operated. When therefore, the relay 181 closed its upper contact, a circuit was completed from battery, through the contact of relay 116, conductor 451, upper contact of relay 181, right contact of relay 108, left windings of relays 109 and 409, to ground. Relays 109 and 409 lock through their right-hand windings. The locking circuit of these relays is not shown complete but it may be understood by tracing the locking circuit for relays 113 and 413. The locking circuit of these latter relays leads from ground, through their right-hand windings, right front contact of relay 413, thence through the release winding 570 of the start-stop distributor in the associated channel, contact of relay 115, left contact of relay 409, to battery through the key 442. In the case of the locking circuit for relays 109 and 409, however, this will extend through the left contact of relay 411. Thus, the relays 109 and 409 are locked, and the start magnet is also energized. Furthermore, relays 113 and 413 are released.

The foregoing condition of the relays described will be found in Table 2 under the first impulse period.

During the second impulse period, the current from the oscillator 252 changes direction, relay 68 releases, and relay 69 operates. A circuit is thereupon closed from battery, through the relay 69, operating winding 333 of relay 341, relay 260, release winding 331 of relay 347, to ground. Relays 341 and 60 are therefore closed and relays 347 and 63 are opened. Since the relay 88 remains in the same condition, the relays of the frequency changer 425 and the distributors 423 and 424 do not change.

In the third period, relay 68 operates again and relay 69 opens, whereupon a circuit is closed from battery, through said relay 68, operating winding 334 of relay 342, through the relay 60, release winding 324 of relay 340, to ground. Thus, relays 342, 261, 75 and 74 are closed, and relays 340, 260, 73 and 72 are opened. Again, relay 88 remains in its same condition and no change takes place in the remainder of the distributing mechanism.

In the fourth period relay 69 is closed and a circuit is traced from battery, through said relay, operating winding 335 of relay 343, relay 261, release winding 325 of relay 341, to ground. Relays 343 and 61 operated and relays 341 and 60 release. The relay 343 in operating closes a locking circuit from battery, through said relay, thence through the locking winding 319, operating winding 311 of relay 61, release winding 395 of relay 88, operating winding 396 of relay 89, to ground. Therefore, relay 88 releases and relay 89 closes.

With relay 89 closed, a circuit may be traced from battery, through relay 89, operating winding 377 of relay 381, relay 90, release winding 375 of relay 383, to ground. Relay 381 completes a circuit from battery, through its locking winding 389, relay 381, operating winding 365 of relay 91, windings of relays 95 and 96 of distributors 423(B), 423(C), to ground. Relay 91 operates and relays 95 and 96 of their connected distributors step. Also, the relays 383 and 93 release. The remaining relays shown on the drawing are not changed during this period.

Coming to the fifth period, relay 68 is closed and a circuit is completed through the operating winding 336 of relay 344, relay 61, release winding 326 of relay 342, to ground. Relays 344, 262 are closed and relays 342, 261, 75 and 74 are opened. Relays 77 and 76 are conditioned. The relay 89 remains closed and consequently no other change takes place in the distributors 423 and 424.

In the sixth period, relay 69 is closed and a circuit is traceable therethrough, operating winding 337 of relay 345, relay 262, release winding 327 of relay 343, to ground. Relays 345 and 62 are operated, and relays 343 and 61 release. No other change takes place in the distributors during this period.

In the seventh impulse period, relay 68 is closed (operated) and relay 69 opened (released). A circuit is completed through the relay 68, operating winding 338 of relay 346, relay 62, release winding 328 of relay 344, to ground. Relays 346, 263, 79 and 78 are closed, and relays 344, 262 are released and 77 and 76 are conditioned. No other change takes place in the equipment during this period.

In the eighth period, relay 69 is closed and a circuit may be traced through the operating winding 339 of relay 347, through the relay 263, release winding 329 of relay 345, to ground. Relays 345 and 62 are released. Relay 347 closes and locks in a circuit from battery, through said relay, locking winding 323, operating winding 315 of relay 63, through the release winding 395 of relay 89, and operating winding 393 of relay 88, to ground. Relay 63 closes, relay 88 closes, and relay 89 opens. With relay 88 closed, a circuit is traceable from battery, through said relay, operating winding 378 of relay 382, to the relay 91, release winding 372 of relay 380, to ground. Relays 382 and 92 are closed, and relays 380 and 90 are opened. The path through winding 366 to ground is through the lower windings of relays 95 and 96 and the upper windings of other relays 95(D) and 96(D). Another circuit may be traced from battery, through the contact of relay 97, lower contact of relay 96, contact of relay 99, operating windings of relays 400 and 100, upper release windings of relays 98 and 398, to ground. Relays 100 and 400 operate and relays 98 and 398 release.

During the ninth interval the relays 340, 260, 73 and 72 are again closed. Relays 80 and 81 are conditioned. The relay 88 remains closed and no further change takes place in the equipment.

No change takes place during the tenth and eleventh periods except in the distributor 422.

In the twelfth period, the relay 89 is closed and a circuit may be traced from battery, through said relay, operating winding 379 of relay 383, relay 92, release winding 373 of relay 91, to ground. Relays 381 and 91 release. Relay 383 in operating locks in a circuit from battery, through its locking winding 391, thence through the relay, operating winding 367 of relay 93, windings of relays 95 and 96 of distributors 423(B) and 423(C), causing these relays to advance one step.

During periods 13, 14 and 15 no change takes place except in the fast distributor 422.

In the sixteenth period, relay 88 is operated and a circuit is closed from battery, through said relay, operating winding 376 of relay 380, relay 93, release winding 374 of relay 382, to ground through windings of relays 95 and 96. Relays 380 and 90 are operated, and relays 382 and 92 are released. Relay 92 operates and relays 95 and 96 operate to close their lower contacts. With relay 96 operated, a circuit is traceable from battery, through the lower contact thereof, contact of relay 100, lower operating winding of relay 401, upper winding of relay 107, lower operating winding of relay 101, upper release windings of relays 99 and 399, to ground. Relays 99 and 399 release and relays 101 and 401 operate. Relay 107 also operates to close its lower contact. The condenser 431 is now charged in the opposite direction and no further change takes place in the distributor 424.

Thus, the frequency changer 425 has completed a cycle and is beginning a second cycle. During the periods 17, 18 and 19 no change takes place except in the distributor 422.

In the twentieth period, relays 93, 380 and 90 are closed and relays 95 and 96 of distributors 423(B) and 423(C) are operated to their opposite positions.

Only relays of distributor 422 change in the twenty-first, twenty-second and twenty-third periods.

In the twenty-fourth period relays 95 and 96 of distributor 423(A) again operate. With relay 96 thus operated, a circuit is closed from battery, through its upper contact, contact of relay 101, lower winding of relay 107, contact of key 441, operating windings of relays 398 and 98, release windings of relays 100 and 400, to ground. Relays 98 and 398 are operated and relays 100 and 400 are released. With the upper contact of relay 107 closed, condenser 431 discharges through the relays 180, 181 and 106, and these relays operate to close their lower contacts. A circuit may now be traced from battery, over conductor 451, lower contact of relay 181, right contact of relay 109, left windings of relays 110 and 410, to ground. Relays 110 and 410 operate and lock as above explained and open the locking circuit of relays 108 and 408. Thus, the first step has been taken by the slow-acting distributor 424.

In this manner, the counting action of the distributors continues cycle after cycle, the distributor 422 acting at a greater speed than the distributors 423, and the distributors 423 in turn acting at a greater speed than the distributors 424. By consulting or extending the table, the exact condition of all of the important relays associated with these distributors may be ascertained for any given impulse period.

The subsequent operation may be followed from the table.

Relays 88, 89 change every fourth half period.

A new relay pair 90, 380; 91, 381 is operated every fourth half period.

Relay 95 reverses at the eighth half period and every eighth half period thereafter; the other relay 95 which we may designate 95D moves oppositely to relay 95 and at the same instant.

Relays 95(B) and 95(C), if present, move at the fourth, twelfth, etc. periods.

Relays 106(A)1 and 181(A)1 operate every thirty-second period and relay chain 108, 109, etc. advances one step.

Signal pulses pass the pairs of relays 80, 81; 82, 83 in succession.

Each succeeding impulse of the 80, 81 path is assigned to a succeeding relay 102, 103, 104, 105; likewise for each pair 82, 83 and other similar relay pairs with respect to other distributors 423.

Figure 5:
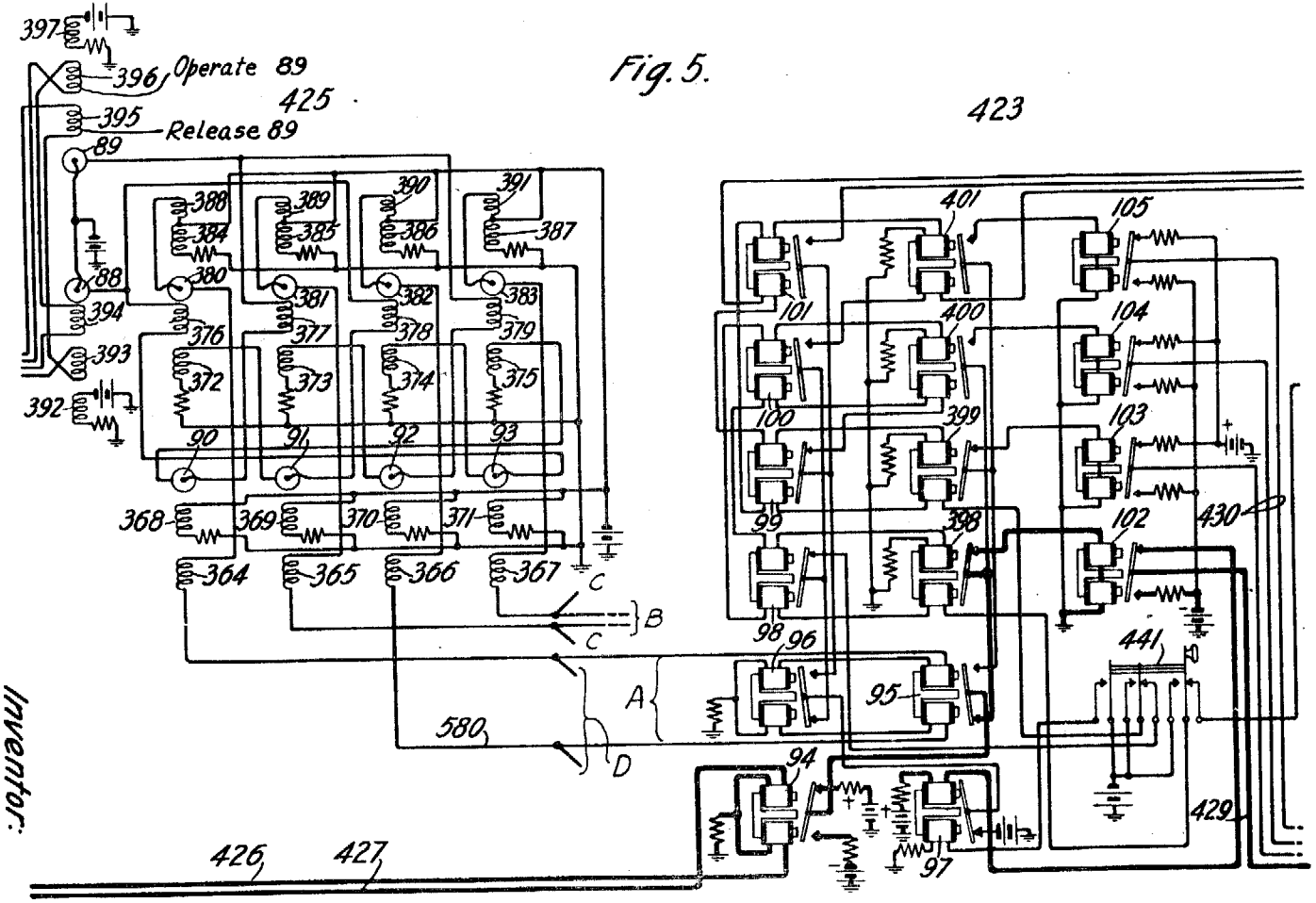

If the distributor 423 shown be designated 423A, then the connections for 423B, 423C and 423D are indicated on Fig. 5.

If the distributor 423 be designated 423(A), its relays designated with an (A), then relays 106, 181, 180 and 107 may be designated 106(A)1, 181(A)1, 180(A)1 and 107(A)1 to distinguish them from other similar relays associated symmetrically in succession with relays 103, 104 and 105 which may be designated 106(A)2, 181(A)2, etc., 106(A)3, 181(A)3, etc., 106(A)4, 181(A)4, etc. Each relay 106(A)2, 106(A)3, 106(A)4 will be associated with corresponding relays 107(A)2, 107(A)3, 107(A)4 each of which is symmetrically and in succession associated with relays 98, 398, 99, 399, 100, 400, 101, 401 to operate in the same relation with respect to their respective groups of channels. Thus relay 106(A)2 should operate as many half periods after 106(A)1 as relay 399(A) operates after relay 398(A) and relay 107(A)2 is connected in appropriate operating windings of the relays of distributor 423(A) to cause this to happen. It will be obvious that functions of some relays which move simultaneously might be combined.

From what has been said hereinbefore, it will now appear that as the distributors 120, 130 and 208 at the sending end rotate, they cooperate with each other synchronously in such a manner, or, stated in other words, each distributor is at the proper point in its cycle once every so often, to establish an impulse circuit from each incoming channel through to the single line 213. Inasmuch as there are 96 of these channels, the distributors are so timed in their operation that no two channels are closed through to the line 213 simultaneously. Instead, the closures take place in an orderly and sequential fashion, one after the other. The duration of closure is determined by the duration of closure of the relays 37 and 38, which are fast-operating relays. It is at these points that the changes in the impulse circuits are most rapid. In the distributor 130, the impulse circuits are closed for a considerable period before a signal is to go through the relays 25 and 38 and are not changed until the signal period is complete. Likewise, the impulse circuits through the distributor 120 are closed for at least as soon as they are completed at the distributor 130. Thus, the distributor 120 has a considerable amount of overlap allowing more or less inaccurate operation without detrimental effects. Also, the distributor 130 has a considerable amount of overlap with respect to the distributor 208.

To consider a specific instance, assume that the apparatus has reached the precise point in its operation for completing the first channel 22 through to the line 213. The impulse circuit for the transmission of a signal impulse from this channel is indicated by the heavy line and is seen to lead from the sending contacts 47 of the start-stop distributor through the left contact of relay 1, upper contacts of relays 10, 11, and 15, conductor 418, through the relay 25, relay 38, to the line 213. Thus, it is necessary that the relay 1 be operated, that the relays 10, 11 and 15 be operated to close their upper contacts, and that the relays 25 and 38 be closed. From an examination of the table hereinbefore given, it will be found that these conditions exist during the first impulse period in the table. Inspecting the table on both sides of the first impulse period, it will be found that some of the slower acting relays have been energized for a considerable time prior to the arrival of the equipment in the first period and will also remain energized for a considerable time subsequent to the first period. The fast-operating relay 25 is closed for twice as long as relay 38. The interval during which the circuit is complete is determined by relay 38.

On the receiving end, distributor 422 takes only half the time for one step that distributor 208 requires for one step, and relays 65 and 66 which determine the length of the operating pulses for relays 80, 81, 82, etc., operate twice as fast as relays 37, 38, etc., so that relays 80 and 81, etc., are under the control of the pulses for only half of the signal pulse period. By proper phasing with respect to the transmission time and operating times, the phase relation between receiving and sending distributors may be made such that only the central or best portion of the impulses is used.

In a similar manner, it may be noted that the second channel which leads through the left contact of relay 2 has access to the line 213 during the seventeenth impulse period, or exactly sixteen periods later. In like manner, the third, fourth, fifth and sixth channels gain access in succession to the line 213 at intervals of sixteen impulse periods apart. This may be verified by consulting Table 2.

The same general explanation may be given with respect to the distributing equipment at the receiving end of the line. The distributors rotate with respect to one another at such speeds and are so timed that the impulses incoming on the single line 253 representing a maximum of 96 sending channels are distributed in sequential order to the corresponding 96 receiving channels.

It was explained that the relays 435 and 436 are so adjusted that a succession of current impulses and spaces cause corresponding reversals of current through the left winding of the transformer 235 and also through the windings 266 and 264. The winding 266 belongs to the relay 66 and the winding 264 to the relay 65. The relays 66 and 65 are so adjusted that one of these relays closes and the other opens in response to a current impulse in the line 253, and reverse this operation in response to a succeeding space of no current. When, therefore, the distributor 422 is in a position where relays 72 and 69 are closed as hereinbefore explained, either the relay 65 or the relay 66 will discharge and the other relay remain inoperative depending upon whether the signal impulse received over the line 253 is marking or spacing. If the relay 66 is closed, then a circuit may be traced from battery, through the relay 67, relay 66, relay 73, winding 275, operating winding 280 of the relay 80, release winding 283 of the relay 81, to ground. Relay 80, therefore, is energized and relay 81 is de-energized or released. With relay 80 energized, a circuit is closed from battery, through said relay, thence over the conductor 427, through the locking winding of said relay, upper winding of polarized relay 94, to ground.

Had the relay 65 been closed instead, then a circuit would have been traced from battery, through the relay 67, relay 65, relay 72, release winding 281 of relay 80, operating winding 282 of relay 81, to ground. In this case, the relay 81 is energized and a circuit is traceable over conductor 426, through the lower winding of the polarized relay 94, to ground.

In like manner, the relays 82 and 83, 84 and 85, and 86 and 87 close impulse circuits through to three other relays similar to relay 94 during the sequential operation of distributor 422.

According to whether the relay 94 is operated to close its upper or lower contacts, either positive or negative polarity is connected through the upper or lower contacts of relay 95 depending upon the position of this relay, and thence through the sequentially closed contacts of relays 398, 399, 400 and 401 to the windings of relays 102, 103, 104 and 105. Assuming the distributor 423 is in such a position that relay 398 is operated, a circuit may be traced over the heavy line to the winding of relay 102. According, therefore, to whether the relay 102 is operated at its upper or lower contacts, plus or minus potential is applied to the conductor 429 through one or the other of the contacts 106 and thence through contacts of the sequentially closed relays 108, 109, etc., through the windings of relays similar to the relay 114. If relay 106 has its upper contact closed and the relay 108 is operated at this time, the impulse circuit leads over the heavy conductor 432 to the winding of relay 114 shown. If the polarity is in the proper direction, the relay 114 closes its contact and completes a circuit for the code magnet 564 of the start-stop distributor associated with the corresponding channel. Once relay 114 is set and either relay 106 or 108 changes its condition the setting of relay 114 cannot be disturbed until relays 106 and 108 return to their original condition.

Considering the condition of the distributors at the instant a circuit is completed for associating the first channel with the line 253, it will be found that relay 108 is operated; relay 106 operated to close its upper contact; relay 107 operated to close its upper contact; relays 98, 398, 101 and 401 operated; relay 95 is operated to close its lower contact; relays 93 and 90 of the frequency changer 425 are closed; relay 88 closed; relays 72, 73 and 269 of the distributor 422 are closed; and relay 69 is closed. From an examination of the second portion of the above table, it is seen that this set of conditions occurs during the second impulse period. From the drawing it will be seen that the circuit of relay 114 is maintained until either the relay 108 releases, or the relay 106 operates to close its lower contact. By inspecting the table, it appears that relay 108 remains operated through to the twenty-fourth impulse period. The relay 106 does not change its condition until the twenty-fourth impulse period. Moreover, the relay 102 will not change until the relays 398 and 98 are again operated, which does not occur until the thirty-second period of the succeeding cycle. Relay 114 remains as selected for a much longer period. Accordingly, the operating circuits for the start-stop equipment are maintained closed for an ample time to insure their operation, notwithstanding the high rate of speed at which the fast distributors are rotating.

Consider now the reception of a signal pulse with specific reference to the elements of the drawing. In the second period let tube 81 be selected. It sets relay 94, as shown, and this applies battery over lower contact of relay 95, and relay 398 to set relay 102. The setting of relay 102 (for example) continues from the second to through the seventh period whereupon relay 95 moves to its upper contact, eighth period. Relay 102 is now connected over relays 106(A) and 108(A) to relay 114(A) and sets relay 114(A) in accordance with the signal. At the twenty-fourth period relay 106(A), being the relay 106(A)

shown on the drawing, moves and thereafter relay 114(A) cannot be disturbed until relay 108(A) 1 is again operated while relay 106(A) 1 is on its upper contact and this does not transpire until the 184th half period. Thus relay 114(A) is being correctly influenced or left correctly set for roughly 180 half periods or $$\frac{180}{192}=\frac{15}{16}$$

of the time. One of rods 550 (Fig. 18) moves past the setting cam 565 during the whole 192 half periods and it is seen that 180 half periods is so adequately long that the middle portion of the time during which the magnet 564 is correctly set by relay 114 may be used to set a rod correctly.

It will be noted that tubes 86, 87 are two half periods different in phase with respect to their relay 95(D) than are tubes 80, 81 with respect to 95(A). Thus in the 192nd period tubes 86, 87 are selected as relay 95(D) steps from its lower to its upper contact. Relay 102(D) continues for about eight periods to receive a setting signal from its associated relay 94 whereup the relay 95(D) moves from its upper to its lower contact in the twenty-fourth period and no path for again influencing the relay 102(D) is closed until the 184th period of the next cycle, when relay 106(D) 1 and 108(D) 1 are again respectively upon their upper contact and closed and a path is formed through relays 95(D) and 398(D). Similar statements apply to other channels. Interference between channels, by some termed split impulses, therefore, does not impair the operation with a proper setting and correlation of the apparatus, even though the entire maximum number of channels be employed. This is because the longest false setting of a relay 114 which can occur is only eight or ten half periods and always occurs at an immaterial time. The false setting will be of no importance because too short to effect magnet 564, and, second, because this occurs at a time when the armature 565 of the magnet is half way, more or less, between the moving rod ends. Magnet 564 has a rather ponderable armature and requires some time to operate. As previously pointed out the correct signal is applied to relay 114 within a few half periods and remains effective thereafter for the necessary time. Obviously the distributor phasing may be varied or adjusted in several ways.

In a similar manner, it will be found by inspecting the table that the delivery of a signal to the second, third, fourth, fifth and sixth channels represented by the conductors 434 commences respectively each thirty-two half periods later in succession.

It will be understood that the tables may be commenced at any point other than those selected. These tables, in effect, represent closed operations. That is to say, the termination of a table may be considered as joined to the beginning to give a closed series.

It will be clear that many modification may be made of the system herein disclosed. It may be arranged to drive the distributors at greater or less speeds, as the transmission system requires. Moreover, it may be desirable to transmit the impulse directly from the first centrol office to the second central office over a properly designed transmission line without the use of high frequency carrier currents.

Line 418 may be used to modulate a carrier current or to send signals directly to a trunk line, giving a multiplex of twenty-four channels, or line 416 may be used in a similar manner to obtain a multiplex of six channels. The amount of traffic and values of the circuit determine the multiplicity used. The distributors 120 and 424 may be added as desired to accommodate the traffic.

Figure 3:
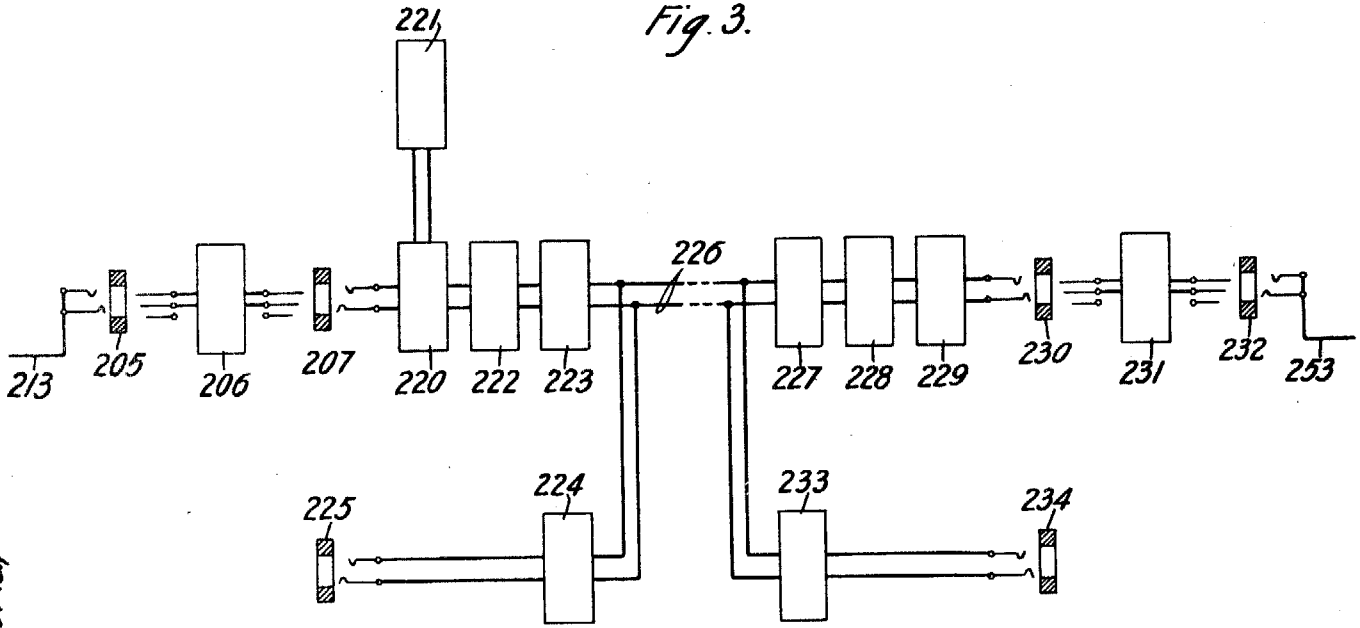

While the apparatus in Fig. 3 has been shown in a diagrammatic manner, it will be clear to those skilled in the art that any suitable type of high frequency channels, modulators, and any suitable design of amplifiers and filters may be employed. Furthermore, the oscillators 202 and 252 are merely shown as indicating one type which may be used at these stations. Any other suitable design whatsoever, of course, could be employed.

*Starting the sending and receiving apparatus*

Figure 4:
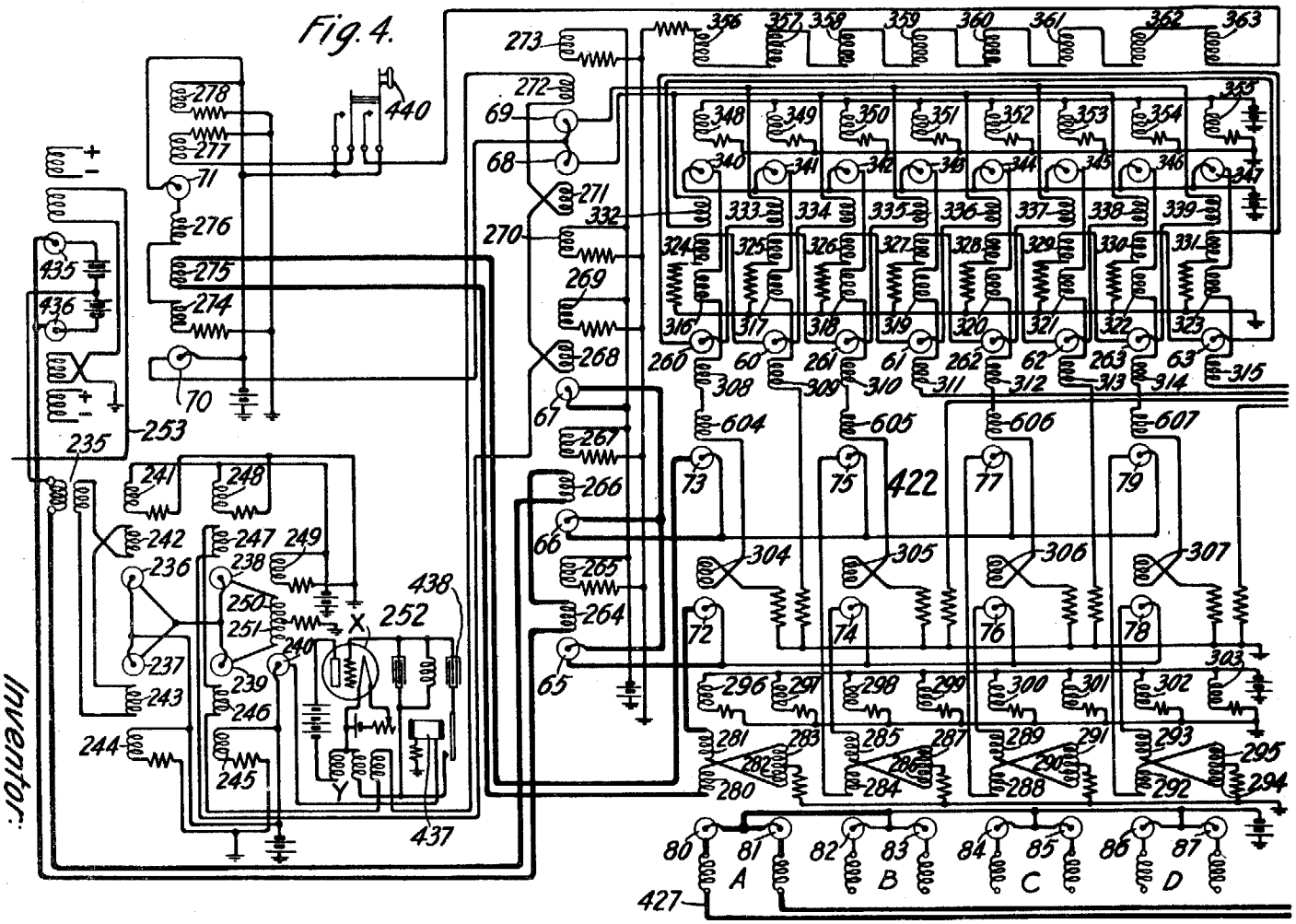
Figure 6:
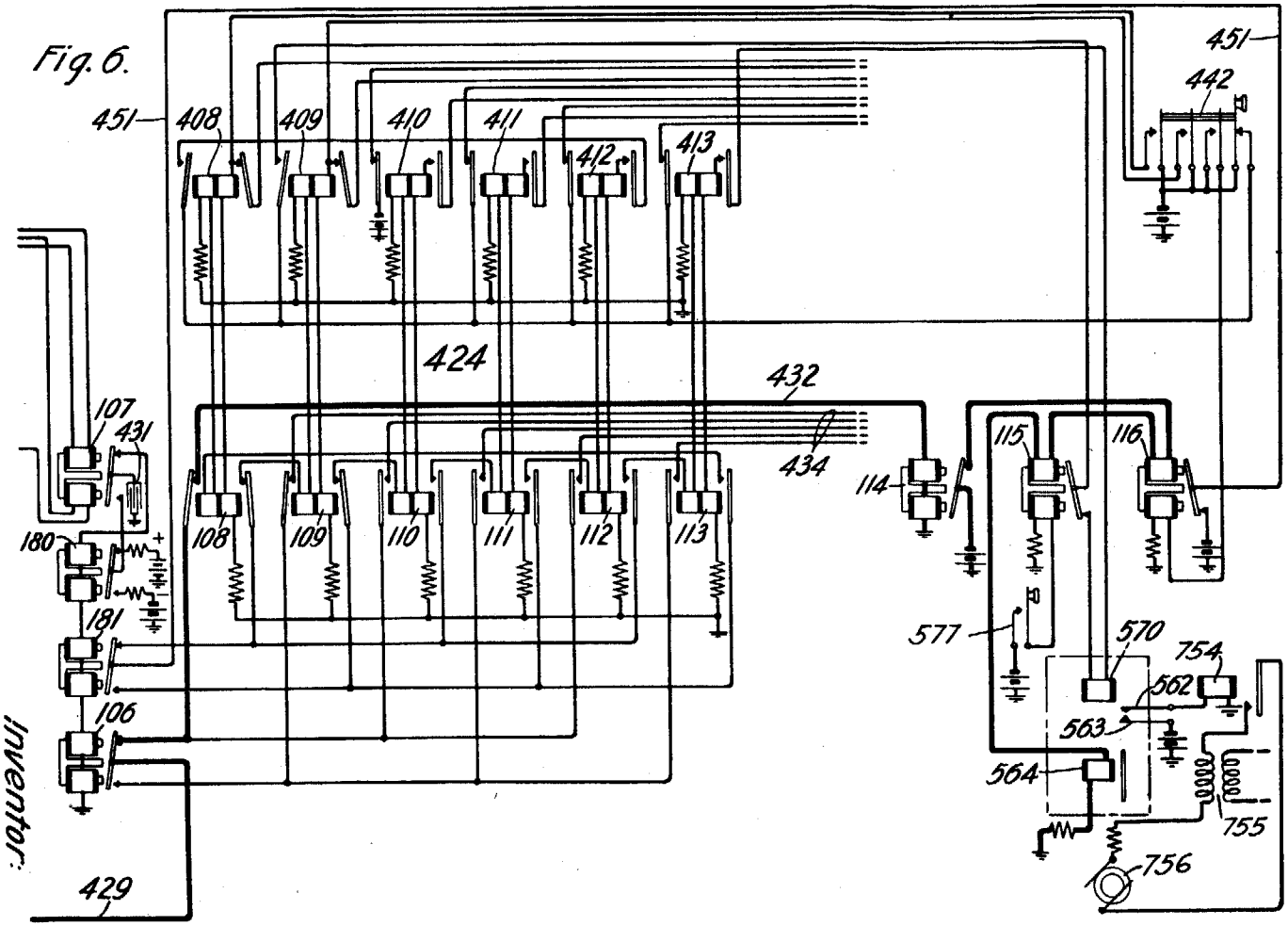

In order that the apparatus at the receiving station, shown in Figs. 4, 5, and 6, may be conveniently started in synchronism and in some definite selected phase with the distributors at the sending office, the phasing keys 440, 441 and 442 are provided. Briefly, the function of the phasing keys is to arrest the operation of the distributors if they are already operating and to set and hold them in a given condition whether or not they are operating.

The key 440 when depressed completes a circuit from battery, through its left contact, winding 277 of the relay 71, to ground. Current flowing through the winding 277 causes the relay 71, which is normally open, to close. A circuit is now traceable from battery, through the relay 71, locking winding 276 of relay 71, thence through the winding 274 of relay 70, to ground. Current flowing through the winding 274 causes the relay 70, which is normally closed, to open. The key 440 may be released and the relays 70 and 71 will remain in this condition. The opening of relay 70 prevents the continued operation of the distributor 422.

Moreover, key 440 when depressed causes the completion of a circuit from battery, through its right contacts, thence through the windings 356 to 363 inclusive, to ground. Current flowing through the windings 357 to 362 inclusive causes the corresponding relays 341, 342, 343, etc., to release. Current flowing through the windings 356 and 363, however, causes the relays 340 and 347 to operate. Thus, the depression of the phasing key 440 sets the distributor 422 in the condition where the two relays are closed and all other relays are open.

In like manner, it will be found that the depression of key 441 causes the operation of the first two sets of relays 98, 398 and 99, 399 of the distributor 423 and the release of the last two sets of relays.

Similarly, the depression of the phasing key 442 causes the release of all relays of the distributor 424, except the first two pairs 108, 408 and 109, 409.

With the distributors at the receiving station in this condition, the apparatus is ready to be synchronized with the distributors at the sending station. In order that synchronizing impulses may be transmitted from the sending station to the receiving station, one of the 96 channels shown may be devoted to synchronizing, in which case the left contact of the relay 1 of the distributor 120 would lead to the contact of a switch 770, as shown by the dotted line. Suitable battery is connected to 770. After the distributors 120, 130 and 208 at the sending station have been set in operation by means hereinafter described or otherwise, the switch 770 may be closed to transmit the starting impulses over one channel. Thereafter, each time the distributors 120, 130 and 208 arrive at the proper relative phase relation with each other, a circuit is completed from battery, through the switch 770, over the contact of relay 1, contact of relay 10, contact of relay 11, contact of relay 15, line 416, and thence through the relays 25 and 38 to the line 213. At the receiving station the first impulse after the distributors have been set by the phasing keys, causes current to flow through the winding 275 of the relay 71. Relay 275 releases the relay 71, whereupon current ceases to flow through the winding 274 of relay 70. Therefore, the relay 70 immediately closes and the distributor 422 starts in operation, followed by the initiation and operation of the distributors 423 and 424. Thus, the distributors at the receiving end are started in some definite reproducible phase relation with the distributors at the sending station. Such pulses provided on one or more channels could maintain the oscillator 252 synchronized in the absence of signals.

It is also to be understood that the frequency changer 425 has a similar circuit or path from key 440 with appropriate windings which place its various relays in proper phase condition.

A similar circuit may also be provided at the sending end to facilitate the start at that station. Such circuit may have the same kind of key circuits and windings to operate selected relays.

To illustrate such starting at the sending end using a key corresponding to key 440 and windings functioning as 356 to 363, inclusive, we may assume start windings rendering tubes 135, 136, 33 and 34 operative; assume tube 20 operated, and tube 40 held operated; oscillator 202 is operating but tubes 39, 40 are held open. Relays of distributor 130 as well as distributor 120 may be set manually or otherwise by keys similar to keys 441 and 442 in the position shown. Relays of any other distributors which it is desired to start at the initial starting may likewise be set manually or by keys in appropriate positions. When ready to start tubes 39, 40 are released and tubes 135, 136, 33 and 34 are simultaneously released and the distributors 208, 130 and 120 begin stepping.

It will be understood that the other distributing mechanisms similar to 423 and 424 operate a definite amount out of phase with the mechanism shown in the drawing. That is to say, there may be a definite phase relation between the successive distributing mechanisms 423 and successive distributing mechanisms 424, all of which are controlled by the sending distributor 422. Accordingly, in order that all distributing mechanisms may start at the proper point, the phasing keys may be arranged to cause the different distributing mechanisms to take different settings. For instance, the next distributing mechanism following the distributor 423 may be set such that relays 99 and 100 are operated and the remaining relays are released. Some other distributing mechanism would be set such that relays 100 and 101 are operated, whereas the remaining relays are released.

Manual setting up of the relays may be employed and the operativeness of the system will not be impaired after starting if there is not the same correspondence of channels at the transmitting and receiving end on different starts because for a given period of run it will only be necessary to identify and use together whatever channel at the receiving end and whatever channel at the sending end correspond.

Any number of channels may be idle or unequipped provided such parts of their circuits as are necessary for the operation of the others are provided. One such idle channel is indicated on distributors 120 and 424; the stepping circuit of such distributors being closed without extending through a start magnet 46 or 570, respectively. In this system it is preferred that code combinations of five similar impulses corresponding to a closed condition of contacts 47 be not used for intelligence transmission.

Magnet 46 may be connected to a circuit connected to any distributor relays necessary to start it at the proper time; the proper time is a function of the operating time of several elements and is only determinable by measurement or observation upon actual apparatus; the time will vary with the apparatus. The relays to which each start magnet is connected in the drawing is illustrative only.

Likewise magnet 570 should be timed as circumstances require. Moreover, this magnet may start its translator at any one of five positions with respect to the code received over its channel, the correct one may be selected manually or otherwise after which it continues to operate properly; this adjustment affects no other apparatus and no other translator. In starting, key 577 may be used to set relay 115; if the other translators of a distributor 424 have their stepping paths closed one may be opened at relay 115 by an individual key 577 whereupon a pulse in the particular channel to close the lower contact of relay 115 will start the stepping action. Selection of a proper code having its first marking pulse in the first to the fifth element of the code will start the individual translator to receive the first impulse of a code on the first rod but, in general, the individual receiving translators will be individually phased. Keys 442 and 577 may be manipulated to take a distributor 424 with all its translators out of service and to restore such apparatus to service without disturbing other channels.

What is claimed is:

1. In an exchange system, a central office, a plurality of subscribers' lines leading to said office, transmitters at each of the subscribers' stations, a multiplex distributor at the central office having a plurality of channels incoming thereto, operators' connecting circuits for interconnecting said lines and also for connecting simultaneously a plurality of said lines to respective ones of said channels, signal receiving and storing devices associated with each channel and operable independently of each other in response to said transmitters to store the message signals sent over said lines, and a single transmission line outgoing from the central office, said multiplex distributor arranged to receive the message signals stored in all of said channels and to deliver them in a definite sequential order to the transmission line.

2. In an exchange system, a central office, a plurality of subscribers' lines leading to said office, transmitters and receivers at each of the subscribers' stations, a transmitter at any station serving to operate the receiver at any other station, a multiplex distributor at the central office having a plurality of channels incoming thereto, operators' cord circuits for interconnecting any two of said lines and also for connecting simultaneously a plurality of said lines to respective ones of said channels, signal receiving and storing devices associated with each channel and operable in response to said transmitters to store the message signals sent over said lines, and a transmission line outgoing from the central office, said multiplex distributor arranged to receive the message signals stored in all of said channels and to deliver them in a definite order to the transmission line.

3. In an exchange system, a central office, a plurality of subscribers' lines leading to said office, telephone and telegraph equipment at each subscriber's substation connected to one of said lines, operators' cord circuits at the central office for interconnecting any two of said lines for communication thereover with either said telephone or said telegraph equipment, a multiplex distributor, a transmission line outgoing from the central office, and means including said cord circuits for associating a plurality of subscribers' lines with said distributor for distributing to said transmission line a signaling current representing all messages simultaneously transmitted over said subscribers' lines.

4. In an exchange system, a central office, subscribers' lines leading to said office, a transmitter at each substation for sending signaling currents having a frequency of the order of voice currents, operators' connecting circuits for interconnecting a calling and a called line, message receiving means at each substation responsive to said transmitters, a transmission line outgoing from the central office, a multiplex distributor, means included in said connecting circuits for connecting a plurality of said lines to said multiplex distributor, and means responsive to signaling currents transmitted over said lines for operating said distributor to deliver to the transmission line a signaling current representing all messages sent over said subscribers' lines.

5. In an exchange system, a central office, a plurality of calling subscribers' lines leading to said office, transmitters at each of the subscribers' stations, a multiplex distributor at the central office having a plurality of channels incoming thereto, operators' connecting circuits for interconnecting said lines and also for connecting simultaneously a plurality of said lines to respective ones of said channels, a transmission line outgoing from the central office, said multiplex distributor arranged to receive the message signals in all of said channels and to deliver them to the transmission line, a plurality of called subscribers' lines, and a multiplex distributor responsive to signals in said transmission line to distribute to said called lines signal impulses representing the messages sent over the respective calling subscribers' lines.

6. In an exchange system, a central office, a plurality of subscribers' lines terminating in said office, transmitters at each of the subscribers' stations, a plurality of start-stop distributors at the central office, operators' cord circuits for interconnecting said lines and also for connecting a plurality of said lines to respective ones of said start-stop distributors, said start-stop distributors being responsive to the transmitters at the substation for storing message signals, a multiplex distributor, a transmission line outgoing from the central office, and means for delivering to the multiplex distributor the message signals stored in said start-stop distributors, said multiplex distributor serving to combine the several message signals into a single current for transmission over the transmission line.

7. In an exchange system, a central office, a plurality of subscribers' lines leading to said office, transmitters at each of the subscribers' stations, a multiplex distributor at the central office, a plurality of storing distributors, operators' cord circuits for interconnecting said lines and also for connecting simultaneously a plurality of said lines to respective ones of said storing distributors, said storing distributors being responsive to the transmitters at the substations for storing message signals, a transmission line, means whereby said multiplex distributor receives the message signals stored in said storing distributors and combines them into a single signaling current for transmission over said line, and means controlled jointly by the transmitting subscriber's line and the multiplex distributor for determining the instant when the storing distributor commences to deliver signals to the multiplex distributor.

8. In a signaling system, a plurality of transmission channels, a single transmission line common to said channels, means for sending signals of a given frequency in each of said channels, and distributing equipment arranged to receive the signals from all channels and by a number of steps of successively increasing frequency to combine said signals into a single signaling current of higher frequency for transmission over said line.

9. In a signaling system, a plurality of transmission channels, a transmission line common to said channels, means for sending signals of a low frequency in each channel, the frequency in all channels being the same, and distributing mechanisms arranged to receive the signals from all channels and by a number of steps of successively increasing frequency to combine said signals into a single signaling current of high frequency for transmission over said line.

10. In a signaling system, a plurality of channels divided into groups, a single transmission line, means for sending signal currents of a given frequency in each of said channels, means for combining the signal currents in each group of channels into a single current of higher frequency, and means for combining all of said higher frequency currents into a single current of still higher frequency for transmission over said line.

11. In a signaling system, a plurality of channels, a transmission line common to all channels, means for sending signals of a given frequency in each of said channels, and a distributor comprising a plurality of sections each operating at a speed greater than the preceding section for receiving the signals from all channels and by successively increasing the frequency to combine said signals into a single signaling current of higher frequency for transmission over said line.

12. In a signaling system, a plurality of transmission channels, a transmission line common to said channels, means for sending in each of said channels at a given frequency signal impulses having a given duration, and distributing equipment arranged to receive signals from all channels and by a number of steps of successively increasing frequency to successively decrease the duration of said impulses and combine them into a single impulse signaling current of higher frequency for transmission over said line.

13. In a signaling system, a plurality of subscribers' lines, a storing distributor for each line operable to store signaling currents transmitted over said lines, a transmission line, and a multiplex distributing mechanism arranged to receive the signals stored in said first mentioned distributors and operable by progressively increasing the frequency of said signals to combine them into a single signaling current of higher frequency for transmission over said line.

14. In a signaling system, a plurality of receiving channels, a transmission line, means for sending over said line a signaling current of high frequency representing a plurality of separate messages, and distributing mechanism arranged to receive said current and by a number of steps of successively decreasing frequency to separate the same into signaling currents of a low frequency each of which represents a respective one of said messages and is distributed to a separate one of said receiving channels.

15. In a signaling system, a plurality of receiving channels divided into groups, a transmission line, means for sending over said line a signaling current of high frequency representing a plurality of separate messages, means for separating said high frequency signaling current and combining all the signaling currents pertaining to each of said groups of channels into a single current of lower frequency, means for separating each of these lower frequency signaling currents into signaling currents of still lower frequency, and means for delivering said last mentioned currents to the respective receiving channels.

16. In combination, a plurality of signaling channels, a transmission line, means for sending signaling current of a given frequency in each of said channels, means for combining the currents in all channels into a single current of higher frequency, a source of carrier current of still higher frequency, and means for modulating the carrier current in accordance with said single high frequency signaling current for transmission over said line.

17. In combination, a plurality of signaling channels, a transmission line, means for sending signaling current of a given frequency in each of said channels, means for combining the currents in all channels into a single current of higher frequency, a source of carrier current of still higher frequency, means for modulating the carrier current in accordance with said single high frequency signaling current for transmission over said line, means for demodulating the carrier current transmitted over said line, a plurality of receiving channels, and means for reducing the frequency of the signaling current after demodulation and delivering the same to said receiving channels.

18. In a telegraph system, means for generating high frequency signals, a multiplex distributor comprising slow-acting electro-magnetic relays and quick-acting thermionic relays said thermionic relays being arranged to distribute said high frequency signals to said electromagnetic relays.

19. In an exchange system, subscribers' stations, a central office, lines between the central office and substations, means to connect one substation line to another, means to transmit over the line direct current from the central office, telegraphic transmitting apparatus at the substation responsive to said direct current and adapted to generate alternating current signals of voice frequency, means to transmit said signals over the established connection to a distant subscriber's station, and means at the distant subscriber's station to receive said code signals.

20. In combination in a single system, two subscribers' stations and two alternative paths over which said stations may be connected to each other, one of said paths containing audio frequency repeating apparatus and the other of said paths containing audio frequency repeating apparatus and telegraph repeating apparatus, and a switchboard intermediate to said stations and common to said paths for permitting telegraph communication over either of said paths.

21. In a signaling system, subscriber lines equipped for telephone signaling and for telegraph signaling, other lines suitable for the propagation of telephonic or telegraphic signals, switching means for directly connecting said subscriber lines to said other lines for either telephone or telegraphic communication, and other switching means containing telegraphic repeating apparatus for connecting said subscriber lines through said repeating apparatus to said other lines solely for telegraphic communication.

22. In a switching system, a central switching station, a substation, a subscriber line connecting said switching station and said substation, telephonic signaling equipment at said substation, telegraphic signaling equipment at said substation, switching means at said substation for connecting said subscriber line either to said telephonic equipment or to said telegraphic equipment, telephone lines terminating at said switching station, telegraphic equipment at said central switching station, and switching means at said central switching station for connecting said subscriber line either to one of said telephonic lines or to said telegraphic equipment.

23. In a communication exchange system, a central office, a second central office, a transmission line extending between said first and said second central offices, a plurality of subscriber stations associated with each of said central offices, a plurality of lines connecting said subscriber stations with their associated central offices, telephone and telegraph equipment at each station, means at each of said subscriber stations for connecting either the telegraph or telephone equipment thereat to the transmission line associated therewith, and cord circuits at each of said central offices for interconnecting any two of said subscriber lines terminating thereat for telephone or telegraph communication thereover or for connecting a subscriber line with the transmission line extending between both of said central offices.

24. In an exchange system, two central stations, a plurality of subscriber stations associated with each central station, a transmission line extending between said two central stations, circuits connected to said transmission line and adapted to transmit telephone currents, other circuits connected to said transmission line and adapted to transmit telegraph signals, subscriber line circuits connecting each subscriber station with its associated central station and arranged to transmit alternatively telephone or telegraph signals, and means at the central stations for interconnecting a subscriber line circuit either with one of the circuits connected to said transmission line for transmitting telephone currents or with one of the other circuits connected to said transmission line for transmitting telegraph currents.

25. In a telegraph exchange system, a subscriber's line, a telephone circuit, a circuit equipped for telegraph signaling, a link circuit for connecting the subscriber's line to the telephone circuit or for connecting said subscriber's line to the telegraph circuit, means to signal over said telephone circuit in conjunction with said link circuit telephonically, and means to signal over said telegraph circuit in conjunction with said link circuit telegraphically.

26. In a signaling system, a plurality of stations, switching equipment, a signaling line connecting said stations and said switching equipment, means for variably operating said switching equipment to effect a connection between two of said stations for telegraph communication, means operative following completion of said connection for translating the marking and spacing signals originating at one of said stations into alternating current for transmission over said signaling line, and means at the receiving end of said line for retranslating said alternating current into direct current marking and spacing signals for operating the receiving station apparatus.

27. In a telegraph system, two central offices, a terminal station individual to each office and connected thereto, telegraph apparatus at each terminal station, a channel extending between said central offices and provided with audio frequency propagation apparatus, a second channel extending between said central offices and provided with telegraphic signal propagation apparatus, and means to connect the telegraphic apparatus at the terminal station with either of said channels.

28. In a signaling system, a switching station, terminal stations, lines individually connecting said terminal stations to said switching station, telephonic signaling equipment at each of said terminal stations, telegraphic signaling equipment at each of said terminal stations, switching means at said switching station for connecting together two of said lines, and means at each of said terminal stations for connecting its telephonic or telegraphic signaling equipment to its associated line, said last means, said telephonic equipment and said telegraphic equipment being operable during the period of connection of said lines and independently of any operation at said switching station subsequent to the connecting operation.

29. In a telegraph system, two substations, a central station, a circuit connecting said substations through said central office, a sole source of potential connected to said circuit at the central office, said circuit being closed for both marking spacing conditions, and means to transmit over said circuit signals from each substation to the other in both directions.

30. In a telegraph system, a central station, two substations, metallic circuits connecting each substation to the central station, each of said circuits being closed for both marking and spacing conditions, a source of potential located at said central station and bridged from wire to wire of said metallic circuits, and means for using said potential to send the telegraph signals in either direction between said substations.

31. In a signaling system, a switching station, substations, lines individually connecting said substations to said switching station, telephonic signaling equipment at each of said substations, telegraphic signaling equipment at each of said substations, switching means at said switching station for connecting together two of said lines for communication purposes, said switching means including a source of electrical energy for conditioning telegraphic signaling equipment for signaling.

32. In a telegraph exchange system, a central station, a plurality of subscribers' stations connected to said central station, transmitting and receiving apparatus at each subscriber's station, a source of direct current at said central station, means at said central station for associating said direct current with any subscriber's station, said transmitting apparatus at a subscriber's station comprising key means, and means responsive to said direct current for transmitting signal impulses, each unit of said signals comprising a plurality of current fluctuations of a frequency within the voice frequency range, and said receiving apparatus at a subscriber's station comprising circuit means responsive to such signal impulses.

33. In a telegraph system, synchronous multiplex channel receiving apparatus, a permutation selecting device, a single magnet controlled by all the impulses transmitted over one channel of said multiplex apparatus and controlling said selecting device in accordance with the signal impulses received over said channel, the frequency of operation of said magnet being substantially the frequency of the multiplex line signal impulses divided by the number of channels.

34. A system in accordance with claim 33, characterized in that mechanical means are provided for connecting said magnet and said permutation selecting device.

35. In a telegraph exchange system, a plurality of branch lines, a plurality of main lines, said branch lines being equipped with start-stop telegraph apparatus, said main lines being equipped with synchronous multiplex channel apparatus, a connecting circuit, said connecting circuit being adapted to receive signal impulses from any multiplex channel and deliver corresponding start-stop signal impulses to any branch line.

36. In a telegraph exchange system, a plurality of branch lines, a plurality of main lines, said branch lines being equipped with start-stop telegraph apparatus, said main lines being equipped with synchronous multiplex channel apparatus, a connecting circuit, said connecting circuit being adapted to receive start-stop signal impulses from any branch line and control the transmission of corresponding signal impulses on any of the multiplex channels.

37. In a telegraph system, a plurality of stations, a multiplex synchronous telegraph circuit extending at least part way between two of said stations, a single channel extension circuit operatively connecting one of said two stations to said multiplex circuit, a repeater intermediate said single channel circuit and one channel of said multiplex circuit, and a single contact variably operated in accordance with signal impulses transmitted over said single channel extension circuit, said contact directly controlling the transmission of all the impulses on one channel of a multiplex.

38. In a telegraph system, a plurality of stations, a multiplex synchronous circuit extending between two of said stations, a start-stop telegraph circuit intermediate said two stations, a storage repeating device, a single magnet controlled by the signals received over said start-stop circuit for storing the signals in said storage device, a single contact adapted to control the signals on one channel of the multiplex and a start-stop control mechanism started into operation by the multiplex system and controlled by the storage signals to operate said contact.

39. In a telegraph system, a storage device, means including a single magnet to start said storage device into operation and to store in said storage device a plurality of code signal impulses, the connection being entirely mechanical between the starting means, the storage control means and said magnet, a constantly operating distributor, said stored signal impulses controlling corresponding signal impulses transmitted by the constantly operating distributor independent of the phase relationship between the operation of the magnet and the angular position of the distributor.

40. In a telegraph system, a synchronous multiplex transmission circuit, a signal impulse storage device, start-stop mechanism to determine the signal impulses stored in said storage device, and additional start-stop mechanism to control the transmission of signal impulses according to the stored signals on one channel of said synchronous multiplex circuit.

41. In a telegraph system, two central offices, a main line connecting said central offices, a plurality of sub-stations associated with each central office and connected thereto by branch lines, synchronous multiplex channel apparatus on the main line, start-stop apparatus and circuits for association with a subscriber's branch line, means to repeat signal impulses from any subscriber's station to any channel of said multiplex, said multiplex channel apparatus being operated for the transmission of signal impulses at a rate in words per minute per channel between a maximum limit and a minimum limit, said start-stop apparatus being limited to a maximum rate of transmission of signal impulses in words per minute slightly under the minimum limit of the multiplex channel apparatus.

42. In an exchange system, two central offices, a branch office individual to each central office and connected thereto, a telegraph circuit connecting said two central offices, repeating apparatus at each central office for repeating telegraph signals, and means at each branch office to transmit and receive signal impulses over said telegraph circuit, one of said repeaters being adapted to break transmission in one direction between branch offices and the other repeater being adapted to break transmission in the other direction between branch offices.

43. In a telegraph system, telegraph stations equipped for transmitting and receiving signal impulses by alternating current transmission, at least two sets of telegraph signal impulse repeating apparatus, each set being removed from the other by conductors, each set of said apparatus having a first terminal for incoming signals only, a second terminal for outgoing signals only and a third terminal for both incoming and outgoing signals, and switching means to connect a telegraph station with the third terminal of said repeating apparatus, other switching means to connect said first and second terminals to said conductors, the first and second terminals of one repeater being connected over two of said conductors to the second and first terminals, respectively, of another repeater, said repeaters being responsive to the signals from each connected conductor and delivering to each conductor signal impulses similar in nature to the signal impulses received from that conductor.

44. In a switching system, subscriber lines equipped for telegraphic signaling, other lines suitable for the propagation of telegraphic signals, apparatus having first, second and third connective terminals, said first terminal for incoming signals only, said second terminal for outgoing signals only, and said third terminal common to incoming and outgoing signals, and switching means to connect one of said subscriber lines to said third terminal and two of said other lines to said first and second terminals, respectively.

45. In an exchange system, a plurality of telegraph line circuits, one group of said line circuits comprising means adapted to function on signals having a certain characteristic, a second group of said line circuits comprising means adapted to function on signals having a different characteristic, a link circuit for connecting any of said first group of lines to any line of said other group, said link circuit including a translator adapted to translate telegraphic signals having one characteristic into signals representing corresponding information and having a different characteristic.

46. In a telegraph intercommunication signaling system, a middle line section, two end line sections and two repeaters connecting said middle line section to said two end line sections, respectively, said repeaters each adapted to operate in response to alternating current signal impulses from one connected section and adapted to operate in response to direct current signal impulses from the other connected section and arranged to deliver to each section signal impulses of the nature of the signal impulses received from that section.

47. In a telegraph exchange system, a central office, a plurality of branch offices, a line connecting each branch office to the central office, an alternating current generator at the central office adapted to supply current to any branch line, and circuit means at the central office to control the transmission on any branch line of said alternating current in accordance with telegraph signals received at said central office, each unit of said signals being comprised of a plurality of alternating current fluctuations.

48. In a telegraph exchange system, a central station, a plurality of subscribers' stations, a line connecting each subscriber's station to the central station, a source of direct current at the central station, a source of alternating current at the central station, means to utilize the direct current for transmitting signal impulses from the substation to the central station, and means to use the source of alternating current for transmitting telegraph signal impulses away from the central station.

49. In an exchange system, a plurality of central stations, a plurality of subscribers' stations associated with each central station, a main telegraph circuit connecting a pair of said central stations, a branch line connecting each subscriber's station with its associated central station, means at each subscriber's station to transmit telegraph signal impulses, each of the units of said signal impulses being comprised of alternating current fluctuations, means controlled by said signal impulses to transmit on said main telegraph circuit other telegraph signal impulses, each unit of said main line signal impulses being comprised of unidirectional currents, and means controlled by said main line signal impulses to transmit on a distant branch line other telegraph signal impulses, each unit of said distant branch line signal impulses being comprised of a plurality of alternating current fluctuations, and means to make a record according to the last mentioned signal impulses.

50. In a signaling system, two telegraph stations operatively connected and adapted for transmission by alternating current, telegraphic repeater apparatus intermediate said stations and comprising two supplemental halves, each of said halves being adapted to cooperate with one of said stations in two-way transmission by alternating current, said two halves being adapted to cooperate with each other in two-way transmission by direct currents.

51. In a telegraph repeater, an incoming circuit, an outgoing circuit, said incoming circuit carrying signals composed of a start and a stop impulse and a group of code impulses, and means controlled by said signals to transmit to the outgoing circuit signal impulses corresponding to the code impulses only and at a frequency less than the frequency of the incoming signals.

52. In a telegraph repeater, an incoming circuit, an outgoing circuit, said incoming circuit carrying signals comprised of groups of code impulses only, and means to transmit to the outgoing circuit signals corresponding to said incoming signals and comprised of code impulses, a start impulse and a stop impulse, the frequency of the first mentioned impulses being lower than the frequency of the last mentioned impulses.

53. In a telegraph repeater system, a telegraph circuit, means to transmit over said telegraph circuit start-stop code signal impulses, means to store said signal impulses, a master transmitter, a secondary transmitter started into operation by said master transmitter only when signal impulses are stored and adapted to transmit signal impulses corresponding to the stored signal impulses, said master transmitter being adapted, in turn, to transmit other corresponding signal impulses under the control of said first mentioned retransmitted signal impulses.

54. In a signaling system, a switching link having a first, a second and a third connective terminal, two line circuits connected to said switching link, said first terminal for signals incoming over one of said line circuits, said second terminal for signals outgoing over said same line circuit and said third terminal common to signals incoming and outgoing over said other line circuit, said second terminal arranged to be disabled when said first terminal is receiving signals.

55. In a signaling system, a switching link connected intermediate to two line circuits having a first, a second and a third connective terminal, said first terminals for signals incoming over one of said line circuits, said second terminal for signals outgoing over said one line circuit and said third terminal common to signals incoming and outgoing over said other line circuit.

56. In a telegraph system, a stationary storage device, means including a receiving magnet to store in said storage device a plurality of code signal impulses, and a mechanically operative connection between the magnet and the storage device.

57. In a telegraph system, a stationary storage device, means including a single receiving magnet to store in said storage device a plurality of code signal impulses, and a mechanically operative connection between the magnet and the storage device, a single contact adapted to transmit signal impulses corresponding to the signal impulses stored, control means for said contact actuated by said storage device, and means for advancing said control means and said storage device with respect to each other to transmit the last stored controlled impulse.

58. In a mechanical storage device, means for storing a complete code of signal impulses, and a magnet operable by the successive signal impulses of the code to control said means for storing the signal impulses together with transmitting contact means, means for controlling said transmitting contact means, and means for moving said means for storing with respect to said means for controlling to transmit said impulses in succession.

59. In a mechanical storage device, a stationary storage member, a series of movable elements carried by said member, a rotary member adapted to successively go into operative engagement with said elements and set the elements according to the signals to be stored, and a second rotary member adapted to successively go into operative relation with said elements to transmit signals according to the setting of the elements.

60. In a combined telephone and telegraph exchange system, a plurality of subscribers' stations, a central station, a single metallic circuit connecting each subscriber's station to central, telegraph and telephone apparatus at each subscriber's station, switching equipment at central, means included in the switching equipment to connect any two circuits, and means to operate either the telephone or telegraph equipment over the established circuit.

61. In a communication system, telephone exchanges, subscribers' stations, printing telegraph receiving apparatus at subscribers' stations, means to connect any two subscribers' stations through said exchanges and means to control said printing telegraph receivers by telephone currents transmitted over at least one link intended primarily for telephone communication.

62. In a communication system, a central station, subscribers' stations, a single circuit connecting each subscriber's station to central, switching equipment at central adapted to connect any two subscribers' stations for communications, telegraph recording equipment and telephone equipment at each subscriber's station, and means to operate either the telephone or telegraph equipment over the connection.

63. In a communication system, circuits adapted for telephone communication, circuits adapted for telegraphic communication and a link circuit adapted to join circuits of the first type for telephone communication and also adapted to join a circuit of the first type to a circuit of the second type for telegraph communication.

64. In a telegraph exchange system including a plurality of central offices connected by trunk circuits, the method of operation which comprises the steps of setting a predetermined speed of operation for the system, regulating the maximum possible speed of transmission on all trunk circuits to be above the predetermined value, regulating the maximum possible speed of transmission at all terminal stations to be below the predetermined value and regulating the maximum possible speed of reception at all terminal stations to be above the predetermined value.

65. A telephone system comprising a plurality of subscribers' stations each provided with teleprinter equipment by means of which teleprinter communication can be carried on over telephone circuits associated with said station, and means for transmitting the teleprinter signals as impulses of a single voice frequency carrier current.

66. In a signaling system, subscribers' lines equipped for telephone signaling and for telegraph signaling, trunk circuits equipped for telephone signaling, trunk circuits equipped for telegraph signaling only, and switching means for operatively connecting said subscribers' lines to said telephone signaling circuits or said telegraph signaling circuits acording to the kind of service desired.

67. In a signaling system, subscribers' stations equipped with telegraph apparatus and with telephone apparatus, lines connecting said subscribers' stations with a central office, trunk circuits equipped for telephone signaling, trunk circuits equipped for telegraph signaling only, and common switching means at said central office for operatively connecting said lines to either a telegraph signaling circuit or to a telephone signaling circuit.

68. In a telegraph system, means to transmit a succession of code impulses, a receiving distributor to distribute said impulses to different channels of reception, and electronic means to determine the initial distribution of said impulses.

69. In a telegraph system, a transmitter adapted to combine and transmit a single succession of code signals originating in a plurality of channels, and electronic means for finally combining said impulses into a single channel.

70. In a telegraph system, means to transmit a succession of code impulses, means solely electronic to separate said impulses according to a predetermined sequence for retransmission on separate paths.

71. In combination, a chain of electronic relays, a control circuit for each relay, a controlled circuit for each relay, said control and said controlled circuits being so connected that each relay in the chain controls the controlled circuit of another relay.

72. The method of signaling which comprises providing a series arrangement of electronic paths and closing said paths in an invariable sequence by electronic action.

73. The method of signaling which comprises providing a series arrangement of electronic paths and opening said paths in an invariable sequence by electronic actions.

74. The method of signaling which comprises providing a multiplicity of paths, preparing selected paths for intervals determined by ponderable action and finally closing the selected paths by electronic action.

75. In a signaling system subscriber lines equipped for telegraph signaling, a central office, trunk circuits equipped for telegraph signaling only, trunk circuits equipped for telephone signaling, switching means at the central office adapted to operatively connect the subscriber lines to either a telegraph trunk or a telephone trunk for telegraph signaling.

76. In a communication system, a plurality of substations each including telegraphic and telephonic terminal apparatus, a central station, switching means located at the central station and adapted to connect any two stations for intercommunication, and means located at a substation operable subsequent to the establishment of the connection to connect either the telegraphic or the telephonic terminal apparatus in circuit with the switching means at the central station and thereby to determine whether the communication shall be telegraphic or telephonic.

77. In a telegraph system, a mutiplex transmission circuit in which the signals transmitted comprise equal-impulse code combinations, a distributor for separating the successive combinations into separate channels, means in each channel for storing the received combinations, a simplex printer for each channel, means controlled by the distributor for producing start impulses for the printers after each combination stored, means associated with the distributor for supplying the stored combinations to the printers, and means controlled by the distributor for transmitting a rest impulse to each printer after the transmission of each combination.

78. In a telegraph system, a multiplex transmission circuit in which signals for the different channels are transmitted in rotation, a receiving distributor for separating the signals into separate channels, means in each channel for storing the received signal, a simplex printer for each channel, means including said distributor for transmitting a start impulse to each printer after a signal is stored, and means including said storing means for preventing the transmission of the starting impulse when no signal is received.

79. In a telegraph system, a multiplex transmission circuit in which the signals transmitted comprise equal-impulse code combinations, a receiving distributor for separating the successive combinations into separate channels, a simplex printer for each channel, and local means including said distributor for generating start and rest impulses for each printer.

80. In a telegraph system, a multiplex system terminating at a main station, a simplex system also terminating at said main station, means for transmitting corresponding marking and spacing conditions over said simplex system when marking and spacing conditions are received over said multiplex system, and means for applying marking conditions only to the simplex system when spacing conditions only are received over the multiplex system.

81. In a telegraph system, a multiplex system terminating at a main station, a simplex system extending from said main station to a distant station, a start-stop distributor at the main station for repeating marking and spacing signal conditions over the simplex system as marking and spacing signal conditions are received over one channel of the multiplex system, said distributor also serving to supply marking conditions only to the simplex system when said multiplex channel is idle and thereby transmitting spacing conditions only.

82. In a telegraph system, a plurality of main stations, a branch station associated with each main station, multiplex circuits extending between said main stations, a single simplex circuit extending between each branch station and its associated main station, and means for establishing two-way through transmission of signals between said branch stations, partially over said single simplex circuits and partially over one channel of said multiplex circuit.

83. In a telegraph system, a plurality of main stations, a branch station associated with each main station, multiplex circuits extending between said main stations, a single simplex circuit extending between each branch station and its associated main station, and means for establishing through two-way transmission of signals between any of said branch stations associated with one main station and any branch station associated with the other main station.

84. In a telegraph system, a branch station, a main station, simplex transmitting apparatus at the branch station, a multiplex transmitting apparatus and simplex receiving apparatus at said main station, a line connecting said main and branch stations, means for repeating signals from said simplex receiving apparatus to the multiplex apparatus, said latter apparatus completing each cycle of operation in a time not greater than that required to transmit a single character combination of impulses by said simplex transmitting apparatus.

85. In a telegraph system, a branch station, a main station, a line connecting said stations, simplex transmitting apparatus at the branch station, a multiplex transmitting apparatus and a simplex receiving apparatus at said main station, means for repeating signals from the simplex receiving apparatus to one channel of the multiplex apparatus, the character frequency of the multiplex channel being not less than the maximum character frequency of said simplex transmitting apparatus.

86. In a telegraph system, a branch station, a main station, a line connecting said stations, simplex transmitting apparatus at the branch station, a multiplex transmitting apparatus and a simplex receiving apparatus at said main station, means for repeating signals from the simplex apparatus to one channel of the multiplex apparatus, the character frequency of the multiplex channel being up to about 10% greater than the maximum character frequency of said simplex transmitting apparatus.

87. In a telegraph system, a main station, a multiplex transmitting distributor at the main station, a receiving distributor also at said main station, said multiplex transmitting distributor operating at a speed sufficient to make at least one complete revolution during the period of reception of a single code combination of impulses by said receiving distributor, and means for repeating signals from said receiving distributor to said transmitting distributor.

88. In a telegraph system, a main station, a multiplex apparatus at said station, a simplex system terminating at said station, and means for repeating to one channel of the multiplex apparatus each character combination substantially as soon as received at the main station over said simplex system, said simplex system being independent of control by said multiplex apparatus.

89. In a telegraph system, a main station, a multiplex transmitting distributor at said station, a simplex system terminating at said station, means for applying to one channel of said multiplex distributor each character code combination of impulses during the period of its reception at the main station over the simplex system, said simplex system operating independent of phase relation with said multiplex distributor.

90. In a telegraph system, a main station, a multiplex transmitting distributor at said station, a simplex system terminating at said station, means for applying to one channel of said multiplex distributor each character code combination of impulses substantially as soon as received at the main station over said simplex system, and means for receiving a succeeding character code combination of impulses over said simplex system during the period of transmission of the preceding combination by said multiplex distributor.

91. In a telegraph system, a main station, a multiplex apparatus at said station, a simplex system terminating at said station, a start-stop apparatus for receiving character code combinations of impulses in continuous succession over said simplex system, and means for transmitting each combination over one channel of said multiplex apparatus before a completion of the reception of the succeeding code combination over the simplex system.

92. In a telegraph system, a main station, a multiplex apparatus at the main station, a simplex system terminating at the main station, a start-stop receiving distributor for the simplex system having two groups of receiving elements, means for causing said groups of receiving elements to respond alternately to code combinations of impulses transmitted over the simplex system, and means for repeating said code combinations from said receiving elements to one channel of the multiplex apparatus.

93. In a telegraph system, a main station, a multiplex apparatus at the main station, a simplex system terminating at the main station, a start-stop receiving distributor for the simplex system having a plurality of groups of receiving elements, means for causing one of said groups of receiving elements to respond to each code combination of impulses transmitted over the simplex system, and means for repeating said code combinations from the receiving elements to one channel of the multiplex apparatus.

94. In a telegraph system, a main station, a multiplex apparatus at the main station, a simplex system terminating at the main station, a start-stop receiving distributor for the simplex system, two groups of storage elements operable alternately through the receiving distributor to store up code combinations of impulses received by said distributor, and means for repeating said code combinations of impulses from the storage element over one channel of said multiplex apparatus.

95. In a telegraph system, a main station, a multiplex apparatus at the main station, a simplex system terminating at the main station, a start-stop receiving distributor for the simplex system, a plurality of groups of storage elements, one of said groups being operable through the receiving distributor in response to each character code combination received over the simplex system to store up said code combination of impulses, and means for repeating said code combinations in proper order from said storage elements over one channel of said multiplex apparatus.

96. In a telegraph system, a main station, a multiplex distributor at the main station, a simplex system terminating at the main station, a plurality of groups of storage elements, one of said groups being operable in response to each character code combination of impulses received over the simplex system to store up said code combination, and means for selectively associating said storage elements in proper order with one channel of said distributor for repeating said code combination over said channel.

97. In a telegraph system, a main station, a multiplex transmitting distributor at said station, a simplex system terminating at said station, means for applying to one channel of said multiplex distributor each character code combination of impulses during the period of its reception at the main station over the simplex system, said simplex system operating independent of phase relation with said multiplex system, said multiplex distributor operating at a slightly higher character frequency than said simplex system, and means for permitting said multiplex channel to idle at required intervals to restore the proper phase relation with said simplex system.

98. In a telegraph system, a main station, a multiplex line extending from said main station, a multiplex distributor associated with said line, a simplex system terminating at the main station, means for applying a code combination received over said simplex system to one channel of said multiplex distributor for transmission to said line, and means for applying spacing conditions to said multiplex channel after the transmission of said code combination.

99. In a telegraph system, a multiplex system terminating at a main station and having a multiplex distributor, a simplex apparatus at said main station, means for operating said simplex apparatus independently of said multiplex system, a storage element operable by said simplex apparatus for storing up code combination of impulses, means for applying said code combination from the storage element to one channel of the multiplex distributor in proper phase relation thereto, for transmitting said code combination over said multiplex system, and means for removing said combination from the distributor after transmission thereof.

100. In a telegraph system, a main station, a multiplex system terminating at said station, a simplex system also terminating at said station and having a receiving distributor and a transmitting distributor, means for repeating code combinations of impulses in either direction between said simplex and multiplex systems, said transmitting distributor being arranged to send signals at a rate slightly greater than the rate of reception of signals by said receiving distributor.

101. In a telegraph exchange system, a plurality of main stations, multiplex circuits extending between said main stations, a plurality of branch stations associated with each main station over simplex circuits, means for making connections between a branch station associated with one main station and a branch station associated with another main station whereby signals transmitted from apparatus at one of said branch stations will be communicated partially over a simplex circuit and partially over a multiplex circuit and received upon simplex recording mechanism at the other branch station, said recording mechanism being operable with a slightly shorter signal period than said transmitting apparatus.

102. Telegraphic reproducing apparatus comprising signal reproducing means adapted to remain in the position into which it was last moved, independent means positioned in accordance with received signals, and means subsequently acting once in each signal period to cause the said independent means to act on the signal reproducing means.

103. Telegraphic reproducing apparatus comprising signal reproducing means, signal responsive means, and mechanical means for actuating said signal reproducing means according to the position of said signal responsive means at the middle of each signal period.

104. Telegraphic reproducing apparatus comprising signal reproducing means adapted to remain in the position into which it was last moved, independent means moved in one direction in accordance with received signals, and means acting once in each signal period to cause the said independent means to move in a second direction to act on the signal reproducing means.

105. Telegraphic reproducing apparatus comprising signal reproducing means, signal responsive means, and mechanical means for actuating said signal reproducing means through said signal responsive means at the middle of each signal period.

106. In a synchronous telegraph system a rotating shaft, a first member moved in a continuous manner by said shaft, and a phase indicating member moved by said first member only at certain phases of rotation of said shaft.

107. Telegraphic reproducing apparatus comprising signal reproducing means, signal responsive means, and mechanical means for actuating said signal reproducing means according to the position of said signal responsive means during a short time of each signal period.

108. Telegraphic reproducing apparatus comprising a rotating shaft, means for synchronizing the speed of the shaft, a cam on said shaft, signal responsive means, signal reproducing means, and means operable by said cam at a predetermined time of each signal period for momentarily bringing said signal responsive means into operable relation with said signal reproducing means, and means for retaining said signal reproducing means in the position thus taken.

109. Telegraphic reproducing apparatus comprising a member movable into either of two positions and having a first knife edge thereon, a second knife edge having its axis in line with that of the first knife edge, a signal responsive relay, means under the control of said relay for moving the said second knife edge at right angles to its axis and means for periodically moving the said second knife edge in the direction of its axis and against the said first knife edge to move the said member into one or other position according as the said second knife edge is on one or other side of the axis of said knife edges, means for reproducing one or other signal according to the position of said member, and means for retaining said member in the position last taken.

110. Telegraphic reproducing apparatus comprising signal reproducing means, signal responsive means, and mechanical means for actuating said signal reproducing means through said signal responsive means during a short time of each signal period.

111. In a signaling system, an electric discharge device, means for applying telegraph code signal impulses to said device to produce a discharge therethrough, an output circuit for said device, a plurality of receiving elements and means for connecting said receiving elements in succession in said output circuit.

112. In a signaling system, an electric discharge device, means for applying telegraph code signal impulses to said device to produce a discharge therethrough, the magnitude of which is independent of the amplitude of the impressed signals, an output circuit for said device, a plurality of receiving elements and means for connecting said receiving elements in succession in said output circuit.

113. In a signaling system, an electric discharge device, means for applying telegraph code signal impulses to said device to produce a discharge therethrough, an output circuit for said device, a plurality of receiving elements and a distributor in said output circuit for determining the period of operation of said device in response to each signal impulse applied thereto and for connecting said receiving elements in succession in said output circuit.

114. In a signal system, apparatus for increasing the effective length of signal impulses comprising an electric discharge device responsive to signal impulses, said device being characterized by continued operation unaffected by signal impulses after being started by a signal impulse applied thereto, an output circuit for said device, and a distributor over which impulses corresponding to the impulses in said output circuit are distributed.

115. In a telegraph system, a source of code signal impulses of varying polarity, a pair of electric discharge devices having controlling and controlled circuits, means in said controlling circuit for applying said signal impulses alternately to said devices to create a discharge therethrough and current responsive means in said controlled circuit.

116. A regenerative repeater comprising an electrical discharge device, an output circuit therefor, a plurality of storage elements, means for creating discharges through said device in accordance with received signals and means for connecting said storage elements in succession in said output circuit in synchronism with said received signals.

117. A regenerative repeater comprising an electric discharge device, an output circuit therefor, a plurality of storage elements, means for creating discharges through said device in accordance with received signals, means for connecting said storage elements in succession in said output circuit in synchronism with said received signals, an outgoing line, one of said storage elements serving to repeat a received signal impulse over the outgoing line during the time of connection of the succeeding storage element in the output circuit.

118. A telegraph system comprising a source of signals, a circuit interrupting device operating in substantial synchronism with said signals, a corrector mechanism for said device, an electric discharge tube responsive to received signal impulses, and a second electric discharge tube, normally non-responsive to signal impulses, but responding to said signals when an out of phase condition of said device occurs, said second discharge device, upon operation thereof, actuating said corrector mechanism to restore the phase relation of said device, relative to the signals.

119. A signal squaring and lengthening device comprising an electric discharge tube of the type in which the discharge may be started by momentary application of a signal condition thereto and continued at a uniform magnitude independently of signal conditions, and a timing device for interrupting the discharge.

120. In a telegraph system, a multiplex circuit terminating at a main station, a simplex circuit arranged for non-duplexed or single line operation only, also terminating at said station, means for transmitting corresponding marking and spacing conditions over said multiplex circuit when marking and spacing conditions are received over the simplex circuit, means for transmitting corresponding marking and spacing conditions over said simplex circuit when marking and spacing conditions are received over said multiplex circuit and means for preventing the repeating of said last marking and spacing conditions back over said multiplex circuit.

121. In a telegraph system, a multiplex circuit terminating at a main station, a simplex circuit arranged only for non-duplexed or single line operation, extending from the main station to a distant station, means for transmitting corresponding marking and spacing conditions over said multiplex circuit when marking and spacing conditions are received over said simplex circuit, a start-stop distributor at the main station, means for setting up in said distributor signals received over one channel of the multiplex system, means for transmitting said signals from said distributor to the distant station and means for preventing the repeating of said last signals back over the multiplex circuit.

122. In a telegraph system, a multiplex circuit terminating at a main station, a non-duplexed circuit also terminating at said main station, means for transmitting corresponding marking and spacing conditions over said multiplex circuit when marking and spacing conditions are received over said simplex circuit, means for transmitting corresponding marking and spacing conditions over said simplex circuit when marking and spacing conditions are received over the multiplex circuit, a line relay in said simplex circuit, said relay being responsive, when both marking and spacing conditions are repeated from the multiplex circuit to the simplex circuit, to hold the relay tongue in a predetermined position.

123. In a telegraph system, a multiplex circuit terminating at a main station, a non-duplexed circuit also terminating at said main station, means for transmitting corresponding marking and spacing conditions over said multiplex circuit when marking and spacing conditions are received over said simplex circuit, means for transmitting corresponding marking and spacing conditions over said simplex circuit when marking and spacing conditions are received over the multiplex circuit, a relay in said simplex circuit, said relay being responsive when either marking or spacing conditions are repeated from the multiplex circuit to the simplex circuit, to hold the relay tongue in a predetermined position.

124. In a telegraph system, a main station, a pair of telegraph circuits terminating at said main station, at least one of said circuits being arranged for non-duplexed or single line operation only, a receiving distributor and a sending distributor at said station for each circuit, means for transferring signals received over either circuit from its receiving distributor to the sending distributor of the other circuit and means for preventing the repeating of said signals back over the circuit from which they were orig[illegible] received.

125. In a signaling system, a source of [illegible]e-graph signals, a receiving apparatus com[illegible]sing one or more discharge tubes responsive to said signals for performing signaling functions, and an auxiliary tube operable concurrently with one or more of said tubes for performing auxiliary or non-signaling functions.

126. In a translating or selecting mechanism for start-stop apparatus, a continuously rotatable driving means, operating cam means, a clutch therefor, and separate cam means effecting the release of said clutch after a predetermined portion of a revolution.

127. In a transmitting or selecting mechanism for start-stop telegraph apparatus, continuously rotatable driving means, operating cam means, a clutch therefor, separate cam means released at the commencement of each signal, and an arm actuated by said separate cam means and controlling said clutch.

128. In a transmitting or selecting mechanism for start-stop telegraph apparatus, a common driving shaft, an operating cam sleeve, a clutch therefor, a stationary pivoted arm engageable with said clutch at each revolution, an independent controlling cam sleeve and an independent clutch therefor, a pivoted controlling arm engageable with said independent clutch at each half-revolution, and cam means on said independent controlling cam sleeve effecting the actuation of the first said stationary pivoted arm during rotation.

129. In a start-stop signal transmitter, signal transmitting cam means, clutch driving means therefor, independent controlling cam means, yielding friction clutch driving means, means for controlling the rotation of said independent controlling cam means by said friction clutch, and means operable during rotation of the controlling cam means for controlling the rotation of said signaling cam means.

130. In a start-stop signal transmitter, signal transmitting cam means, clutch driving means therefor, controlling cam means having independent clutch driving means, a controlling arm for releasing said independent clutch means for rotation from one position to another, means operable during said rotation for releasing said signal transmitting means for rotation from one position to another, and means operable during rotation of said signal transmitting means for intercepting the rotation of said independent clutch means.

131. In a telegraph system, a rotating shaft, a plurality of sleeves frictionally mounted on and driven by said shaft, electro-magnetic means effective upon the reception of signals for releasing one of said sleeves for rotation, and means actuated after said first sleeve has completed a predetermined portion of a revolution for releasing another sleeve for rotation, and signal reproducing means actuated by said last-mentioned sleeve.

132. In a regenerative repeater, the combination of a relay for receiving signals, a rotatable device provided with a plurality of slides adjustable to one of two operating positions, means for positioning said slides intermediate said operating positions, switching means associated with said receiving relay and placed immediately subsequent to said slide positioning means w[illegible] respect to the rotation of said rotatable de[illegible] position said slides in one of said operati[illegible] positions, a set of transmitting contacts, and [illegible]ns associated with said slides to operate said co[illegible]cts immediately following the positioning of said slides.

133. In a regenerative repeater for operation with start-stop signals, the combination of a rotatable member having mounted thereon a number of slides equal to the number of signal elements of the code employed, relay means for receiving signals of two different characters, means operated by said relay means to start the rotation of said rotatable member, means controlled by said relay means for setting said slides in accordance therewith, a set of contacts adapted to transmit signals, and means associated with said slides for operating said transmitting contacts.

134. In a start-stop regenerative repeater, the combination of means for receiving signals of two different characters, a rotatable member carrying movable slides, means controlled by said signal receiving means to cause a single rotation of said rotatable means, a positioning member moved to one or the other of two positions of said receiving means in accordance with the character of each signal thereby to control the positioning of said slides during said rotation according to the character of the received signals, and a set of contacts operable by said slides to transmit signals similar in character to those received but of regenerated shape and duration.

135. In a signaling system, a source of signal impulses, a receiver comprising an electric discharge device having a starting element, an output circuit for said device, means for momentarily applying a signal condition to the starting element to initiate a discharge through the device whereby current flow is produced in the output circuit, means for maintaining said discharge beyond the period of application of said signal condition to the starting element, and means independent of said device for interrupting a discharge through the device.

136. In a telegraph signaling system, an electric discharge device, means for applying a signal condition to said device to initiate a discharge therethrough, means independent of energy supplied by said signal condition for maintaining the discharge and means operating independently of the energy applied to or supplied by said device for terminating the discharge.

137. In a signaling system, a source of telegraph signals comprising two different line conditions occurring in irregular succession, an electric discharge device responsive solely to one line condition, a second electric discharge device responsive solely to the other line condition, an output circuit for each device and separate current responsive means in each output circuit.

138. In a signaling system, a source of signals, a plurality of electric discharge paths, means responsive to said signals for selecting a discharge path for operation and separate means for timing the starting of the discharge in said path.

139. In a signaling system, a source of signals of mixed marking and spacing conditions, a plurality of electric discharge tubes, means responsive to said signals for selecting a tube for operation and separate means operating synchronously with said signals for applying a starting condition to the selected tube.

140. In a signaling system, a source of signals, a plurality of electric discharge tubes, means responsive to said signals for selecting a predetermined tube for operation, separate means for starting a discharge through the selected tube and further means for determining the period of operation of said discharge.

141. In a telegraph system, a synchronously operating distributor, a phase correcting mechanism therefor, a discharge tube, means for applying a starting potential to said tube in response to a predetermined signal condition, means for operating said phase correcting mechanism when a discharge occurs in said tube and means for preventing a discharge therein when a correction is not required.

142. In a signaling system, a source of signals, a distributing mechanism, a plurality of discharge tubes, means individual to each tube for applying starting conditions thereto, each of said individual means being controlled in part by a common signal condition and in part by said distributor mechanism, whereby either one or both of said tubes is operated depending on the phase condition of the distributing mechanism.

143. In a signaling system, a source of telegraph signals, a receiving apparatus comprising a plurality of discharge tubes, and means individual to each tube for applying starting conditions thereto, each of said means being operated by a common signal condition.

144. In a signaling system, a source of telegraph signals, a receiving apparatus comprising a plurality of discharge tubes, means individual to each tube for applying starting conditions thereto, each of said means being operated by a common signal condition, and means in the output circuit of each tube for performing independent functions.

145. The method of controlling a start-stop printer, of the type which requires a line impulse for starting, from a rotating distributing device which comprises timing successive start impulses under the control of the distributor device and controlling the supplying or not supplying of the start impulse to the printer through the control of code selections.

146. In a start-stop telegraph system, means for actuating a start-stop printer from an automatically controlled mechanical storage transmitting unit in combination with means for controlling the action of the transmitting unit to send rest impulses to the printer when no intelligence impulses are to be transmitted.

147. In a telegraph system, a storage device operable to store code combinations in mechanical form, means including a magnet to store in said storage device a plurality of code signal impulses, means for retransmitting impulses under the control of said storage device, and means to transmit out of said device all said stored signal impulses including the last at such times as further storage does not occur.

148. A mechanical storage device comprising means for storing a complete code of signal impulses, said means including a single line controlled element operable for successive signal impulses, a single line controlling retransmitting element, control means for said element, and means for moving said control means relative to said means for storing, whereby successive stored impulses are retransmitted.

149. In a system for simultaneously operating a plurality of start-stop telegraph channels in connection with a single multiplex channel operating on a time-division basis, the method which comprises dividing the signaling time on the multiplex channel into unitary elements each of which is a fractional length in time of a start-stop character code element, controlling the transmission of the elements upon the multiplex channel in accordance with the start-stop codes arriving over their respective channels, and causing the transmission of successive elements controlled by one start-stop channel over the multiplex channel in interleaved relation with respect to the elements controlled by other start-stop channels.

150. A multiplex telegraph system comprising a continuously operating distributor, a recorder, means to control a single operation of the recorder by impulses received on a plurality of cycles of operations of the distributor, means to initiate the operation of the recorder during only selected cycles of the distributor.

151. In a multiplex telegraph system, a distributor operating continuously in cycles, a transmitter operating in cycles, each cycle of the distributor corresponding to the transmission of a single code impulse, means whereby one impulse of the signal is transmitted during each of a plurality of cycles of the distributor, and means to initiate the operation of the transmitter during a predetermined cycle of the distributor.

152. In a telegraph system, a cyclically operating transmitting distributor, a transmitter, means responsive to a single operation of the transmitter to control the transmission of a group of impulses one in each of a predetermined number of successive cycles of the distributor.

153. In a telegraph system, a cyclically operating receiving distributor, a storage device, means to store in the storage device a code signal determined during a predetermined number of successive cycles of the distributor, a recording device, means to control a single operation of the recording device by the stored signal.

154. In a multiplex impulse transmission system, a plurality of recorders controlled by permutation code signals, a cyclically operating distributing device, means to transmit, during a single cycle of the distributing device, an impulse corresponding to one element of the code for each recorder, means to transmit in succeeding cycles of the distributor the remaining elements one for each recorder for each cycle of the distributor.

155. In a multiplex transmission system, a distributing device operating in cycles, means for transmitting a single unit impulse per channel per cycle, a plurality of single magnet receiving devices one for each channel, and means to control the energization of each magnet in each cycle according to the corresponding impulse in that cycle.

156. In a signaling system, an electric discharge device, means for applying telegraph code signal impulses to said device to produce a discharge therethrough, an output circuit for said device, a plurality of receiving elements and means for placing said receiving elements in succession under the control of said output circuit.

157. In a signal system, apparatus for increasing the effective length of signal impulses comprising an electric discharge device responsive to signal impulses, said device being characterized by continued operation unaffected by signal impulses after being started by a signal impulse applied thereto, a circuit controlled by the output of said device and a distributor in said circuit.

158. A regenerative repeater comprising an electrical discharge device, an output circuit therefor, a plurality of storage elements, means for creating discharges through said device in accordance with received signals and means for connecting said storage elements in succession to be controlled by said output circuit in timed relation to said received signals.

159. In a telegraph system, an electronic space discharge device comprising a control part and a controlled part, means to transmit to the control part short impulses separated by intervals of no impulses, means to determine the character of the control impulse according to signals to be transmitted and means to cause the controlled part to transmit signals the impulses of which last for an interval from one of said short impulses to the next.

160. In a telegraph system, an electronic space discharge device comprising a control part and a controlled part, means to transmit code signals each composed of a plurality of elementary units, means to send to the controlled part impulses short with respect to the arrangements of the code signals, means to control the character of the short impulses according to the character of the transmitted signals and means to cause the controlled part to transmit corresponding code signals, the separate impulses of which retain the character corresponding to one short impulse until the next short impulse is received.

161. In a signaling system, a space discharge tube, means operative or not operative, upon said tube, dependent upon the nature of received signal pulses applied thereto to initiate successive discharges in said tube, the circuits of said tube being such that each said discharge, once initiated, continues for a substantially longer time than the duration of application of the discharge initiating pulse.

162. In a signaling system, tube means having a controlled path, means for initiating a discharge through said tube means in response to a signal of one of a plurality of characteristics, and conditioning means operating in a definite phase relation with signals for intermittently conditioning said controlled path to a condition permitting a proper signal to initiate a discharge through said tube means.

163. In combination, a plurality of space discharge tubes, means for selectively initiating a discharge through one thereof dependent upon the polarity or characteristic of a signal pulse, and distributor means phased in relation to signals for intermittently creating a condition to permit the selective initiation of a discharge.

164. The method of signal transmission in a system which comprises a plurality of start-stop code sending instrumentalities, and a line time-division multiplex system having a plurality of channels, which method comprises transmitting successive code units over said multiplex system, and controlling said units in such order by codes from said start-stop instrumentalities that the units controlled by one start-stop sending instrumentality are interleaved with respect to the units controlled by one or more other start-stop channels.

165. In a method in accordance with claim 164, the method of receiving the interleaved units from said multiplex channel and segregating those belonging to individual start-stop channels for retransmission over individual paths to individual start-stop receiving instruments.

166. In a telegraph system, the combination of a multiplex transmission circuit, a continuously operating distributor for separating the signals into separate channels, means in each channel for storing the received signal, a simplex printer for each channel and means operated by said distributor for supplying the stored signals to the printers during revolution of the distributor.

167. The method of operating a start-stop system employing a continuously cycling sending distributor device, which consists in controlling the start pulse by the character of the selected intelligence impulses about to be transmitted.

LOUIS M. POTTS.

Certificate of Correction

Reissue No. 21,778. April 22, 1941.

LOUIS M. POTTS

It is hereby certified that errors appear in the printed specification of the above numbered patent requiring correction as follows: Page 13, the portion of Table 1 designated as Period 27 and 90 should appear as shown below instead of as in the patent—

| | | | | | | | | | | | | | | | | | | |
|---|---|---|---|---|---|---|---|---|---|---|---|---|---|---|---|---|---|---|
| 27 | 20 | 38 | 27 | 28 | 17 | 18 | L | 14A | 11A | | U | | | | U | — | |
| • | • | • | • | • | • | • | • | • | • | • | • | • | • | • • | • | • | • |
| 90 | | 37 | 26 | 27 | 16 | 17 | | | | | U | | | | | | |

page 15, the portion of Table 2 designated as Half period 60 and 180 should appear as shown below instead of as in the patent—

| | | | | | | | | | | | | | | | | | |
|---|---|---|---|---|---|---|---|---|---|---|---|---|---|---|---|---|---|
| 60 | 262 | | | | | | | | | | | | | | U | L | U |
| • | • | • | • | • | • | • | • | • | • | • | • | • | • | • • | • | • | • |
| 180 | 261 | 61 | 89 | 91 | 90 | 82, 83 | | | | | | | | | L | U | |

and that the said Letters Patent should be read with these corrections therein that the same may conform to the record of the case in the Patent Office.

Signed and sealed this 1st day of July, A. D. 1941.

[SEAL]

HENRY VAN ARSDALE,
*Acting Commissioner of Patents.*